United States Patent [19]

Elms

[11] Patent Number: 5,007,013

[45] Date of Patent: Apr. 9, 1991

[54] BIDIRECTIONAL COMMUNICATION AND CONTROL NETWORK WITH PROGRAMMABLE MICROCONTROLLER INTERFACING DIGITAL ICS AND CONTROLLED PRODUCT

[75] Inventor: Robert T. Elms, Monroeville Boro, Pa.

[73] Assignee: Westinghouse Electric Corp., Pittsburgh, Pa.

[21] Appl. No.: 847,404

[22] Filed: Apr. 1, 1986

[51] Int. Cl.[5] .................... G06F 13/36; G06F 13/42; G06F 15/46; G06F 15/56

[52] U.S. Cl. .................... 364/900; 364/919; 364/919.4; 364/935; 364/935.2; 364/935.3; 364/926.9; 364/935.6; 364/940; 364/940.2; 364/940.81; 364/940.92; 370/85.1

[58] Field of Search ............ 340/825.06, 310 R; 370/85; 364/200 MS File, 900 MS File, 474.11

[56] References Cited

U.S. PATENT DOCUMENTS

| | | | |
|---|---|---|---|
| 3,715,725 | 2/1973 | Kievit et al. | 364/200 |
| 3,909,790 | 9/1975 | Shapiro et al. | 364/200 |
| 4,069,488 | 1/1978 | Fiorenza et al. | 364/474 |
| 4,071,887 | 1/1978 | Daly et al. | 364/200 |
| 4,085,449 | 4/1978 | Walsh et al. | 364/900 |
| 4,091,631 | 5/1978 | Eichelberger et al. | 340/168 R |
| 4,159,516 | 6/1979 | Henrion et al. | 364/200 |
| 4,167,768 | 9/1979 | Miller et al. | 364/493 |
| 4,168,531 | 9/1979 | Eichelberger et al. | 364/900 |
| 4,173,754 | 11/1979 | Feiker | 340/310 R |
| 4,183,089 | 1/1980 | Daughton et al. | 364/900 |
| 4,185,272 | 1/1980 | Feiker | 340/168 R |
| 4,209,840 | 6/1980 | Berardi et al. | 364/200 |
| 4,213,182 | 7/1980 | Eichelberger et al. | 364/493 |
| 4,234,926 | 11/1980 | Wallace et al. | 364/200 |
| 4,319,338 | 3/1982 | Grudowski et al. | 364/900 |
| 4,326,264 | 4/1982 | Cohen et al. | 364/900 |
| 4,346,440 | 8/1982 | Kyu et al. | 364/200 |
| 4,357,605 | 11/1982 | Clements | 340/825.14 |
| 4,366,479 | 12/1982 | Mori et al. | 340/825.05 |
| 4,367,414 | 1/1983 | Miller et al. | 307/38 |
| 4,396,844 | 8/1983 | Miller et al. | 307/39 |
| 4,418,382 | 11/1983 | Larson et al. | 364/200 |
| 4,433,378 | 2/1984 | Leger | 364/200 |
| 4,446,458 | 5/1984 | Cook | 340/825.06 |
| 4,449,202 | 5/1984 | Knapp et al. | 364/900 |
| 4,453,229 | 6/1984 | Schaire | 364/900 |
| 4,456,867 | 6/1984 | Mallick, Jr. et al. | 318/778 |
| 4,459,655 | 7/1984 | Willemin | 364/132 |
| 4,535,401 | 8/1985 | Penn | 364/132 |
| 4,564,838 | 1/1986 | Boulogne et al. | 340/825.05 |
| 4,635,195 | 1/1987 | Jeppersen, III et al. | 364/200 |
| 4,644,547 | 2/1987 | Vercellotti et al. | 364/200 |
| 4,656,593 | 4/1987 | Gleba et al. | 364/492 |
| 4,675,865 | 6/1987 | DeVries et al. | 370/85 |
| 4,680,753 | 7/1987 | Fulton et al. | 370/85 |
| 4,837,677 | 6/1989 | Burrus, Jr. | 364/200 |

OTHER PUBLICATIONS

Joseph D. Greenfield, "Microprocessor Handbook", John Wiley & Sons, Inc., 1985, pp. 142-151, 160-179, 182-183.

Sliger et al., "Remote Data System Need Just One Twisted Pair to Link Analog Sensor with Host Computer", Electronic Design, vol. 27, No. 25, Dec. 6, 1979.

Holcomb et al., "Serial Bus Ring Protocol for Single--Chip Microcomputers", IBM Technical Disclosure Bulletin, vol. 26, No. 7A, Dec. 1983.

Primary Examiner—Archie E. Williams, Jr.
Assistant Examiner—Emily Y. Chan
Attorney, Agent, or Firm—M. J. Moran

[57] ABSTRACT

A bi-directional communication and control system includes a common network line over which messages are transmitted in a specific message format and a plurality of hardware based digital IC's which are coupled to the common network line and are arranged to receive messages from and transmit messages to the network line in the specific format is taught. Specifically, a multipurpose two-way communication device is taught which is connected to one of the digital ICs, the device being operable in a master mode in which the device interfaces an external controller to the network line through the connected digital IC so that the external controller can act as the master controller for the plurality of digital ICs coupled to the common network line. The multipurpose device is also operable in an expanded slave mode in which a controlled product connected to the multipurpose device is interfaced to the network line through the connected digital IC so that a master controller on the network line can transmit messages to and receive messages from the product through the series combination of the digital IC and the multipurpose device.

42 Claims, 64 Drawing Sheets

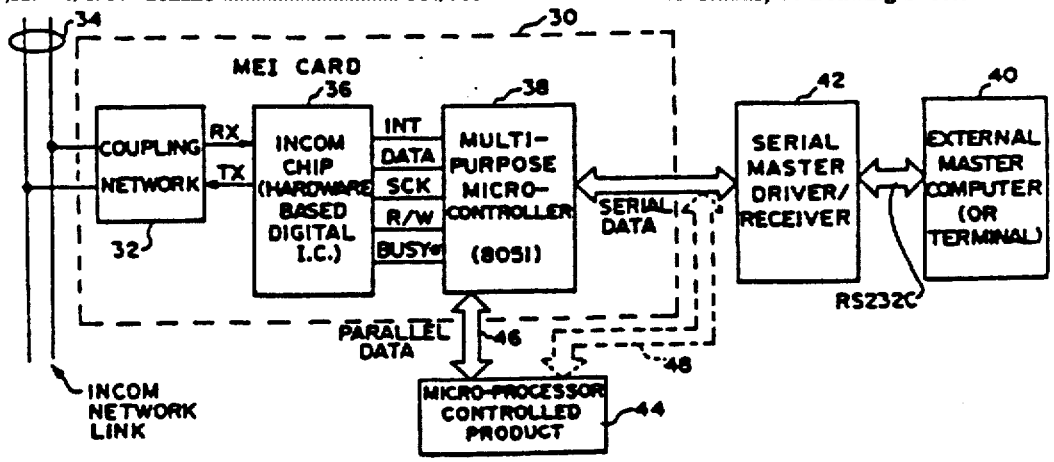

United States Patent Office 

PTO - BOYERS, PA Duty Station

MISSING PAGE TEMPORARY NOTICE

PATENT # 5007013 FOR ISSUE DATE 4-9-1991

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

All Drawings

N/A at Boyers
7/8/92

Data Conversion Operation
Boyers, Pa

BIDIRECTIONAL COMMUNICATION AND CONTROL NETWORK WITH PROGRAMMABLE MICROCONTROLLER INTERFACING DIGITAL ICS AND CONTROLLED PRODUCT

CROSS REFERENCE TO RELATED APPLICATIONS

The invention disclosed herein relates to two-way communication and control systems. The following four commonly assigned United States patent applications were all filed in the United States Patent and Trademark Office on June 28, 1984 and relate to such communication and control systems: Ser. No. 625,747 filed by William R. Verbanets and entitled Multipurpose Digital IC for Communication and Control Network (W.E. Case No. 51930); Ser. No. 625,863 filed by William R. Verbanets and Theodore H. York and entitled Improved Digital IC-Microcomputer Interface (W.E. Case No. 51931); U.S. Pat. No. 4,653,072, issued Mar. 24, 1987 to Leonard C. Vercellotti and William R. Verbanets and entitled Low Error Rate Digital Demodulator (W.E. Case No. 51929) and U.S. Pat. No. 4,644,566, issued Feb. 17, 1987 and U.S. Pat. No. 4,653,073 which issued on divisional applications for U.S. Pat. No. 4,653,072; and U.S. Pat. No. 4,644,547, issued to Leonard C. Vercellotti, William R. Verbanets and Theodore H. York entitled Digital Message Format for Two-Way Communication, and Control Network (W.E. Case No. 51,933). U.S. Pat. No. 4,656,593, issued on Apr. 7, 1987 to James A. Stamatien, Gregory B. Fortune and James S. Gleba entitled "Multi-Function Load Controller For Carrier Load Control Subsystem" is directed generally to such communication and control systems.

BACKGROUND OF THE INVENTION

A. Field of the Invention

The present invention relates generally to two-way communication and control network systems, and, more particularly, to communication and control networks of the type disclosed in the above-identified related applications wherein a communication and control network provides communication between a variety of control devices such as circuit breakers, motor starters, protective relays, remote load controllers, lighting systems, and the like, to communicate with and be controlled by a central or master controller over a common network line. Specifically, the present invention is directed to certain aspects of a communication and control system which employs a multipurpose software based microcontroller which can be operated in a master mode in which the micro-controller interfaces an external host computer, or terminal, to the communication and control network through a hardware-based digital IC of the type disclosed in said above-identified related applications, said microcontroller also being operable in an expanded slave mode in which a controlled product connected to the microcontroller is interfaced to the common network line through the same or similar hardware-based digital IC.

B. Description of the Prior Art

In the communication and control system disclosed in the above-identified related applications control and monitoring is carried out over a network consisting of either the existing power lines or a dedicated twisted pair of lines. The hardware-based digital integrated circuit described in detail in the Verbanets application Ser. No. 625,747 identified above forms the basic building block for such a communication and control network. This digital IC is a twenty-eight pin semi-custom integrated circuit implemented by complementary metal oxide semiconductor (CMOS) technique which provides a simple, low cost interface to the communication and control network. This digital IC, which may also be referred to as an industrial communication (INCOM) integrated circuit, or chip, provides the network interface functions of address recognition, detection and storage of an on-off keyed carrier multi-bit message received from the network, carrier generation and transmission of an on-off keyed carrier message to the network in accordance with the information stored therein, generation and checking of a five bit BCH error checking code, and framing of the received and transmitted messages.

The digital IC, or INCOM chip, may be configured for one of three operating codes: stand alone slave, expanded-mode slave and expanded-mode master. Arbitration of the network is accomplished in a master-slave fashion. The stand alone slave mode is used by simple devices and provides control of a single output line and the return of two status bits from the slave device. The expanded-mode slave is used to interface microprocessor based equipment to the network and will support far more complex communications between the master and the expanded-mode slave. When the INCOM chip is operated in an expanded master mode, the INCOM device may be used as a direct interface to the master or central controller of the network. However, in many instances it is desirable that the network master use a conventional RS232C serial link or equivalent, to communicate with the stand alone slaves and enabled mode slaves on the network. The ASCII protocol normally used with such a serial link is, however, not compatible with the 33 bit message format employed by the INCOM network. Accordingly, this severely limits the types of computers or terminals which can be used as a master or central controller for the INCOM network.

When the INCOM chip is operated in the expanded slave mode it may be used as a direct interface to a microprocessor controlled product. However, in many instances the microprocessor associated with the controlled product may be quite busy and hence cannot be directly coupled to the network through the INCOM chip. This is particularly true of products such as motor starters and controllers in which many different variables, such as rotor winding temperature, bearing temperature, ground fault, overcurrent, locked rotor current, and underload and overload voltages may be monitored and/or controlled. Furthermore, even if the microprocessor associated with a controlled product is relatively inactive, it is in many instances desirable to provide an intermediate buffer interface between the INCOM chip and the controlled product so that a major design change or reprogramming of the microprocessor associated with the product is not required in order to utilize the INCOM network.

SUMMARY OF THE INVENTION

Briefly considered, the present invention is directed to certain aspects of a micro-controller based expanded mode interface (MEI) unit which can be readily adapted to act either as a master interface between an INCOM chip operating in the expanded master mode and a host computer or terminal, or to act as an intermediate interface between an INCOM chip operating in the expanded slave mode and a microprocessor based controlled product. This multipurpose microcontroller can then be used as a universal interface for the INCOM network chip operating in either the expanded master mode or the expanded slave mode.

In order to provide a low cost multipurpose unit, the universal interface preferably comprises a single microcomputer, such as an INTEL 8051, or equivalent, which is suitably programmed by selectable software programs to operate in either the expanded master mode or the expanded slave mode. Since this software is in a single device low cost can be achieved by mask programming this software. Preferably, the microcomputer is physically mounted with an INCOM chip and its coupling network on a suitable printed circuit board or card, this MEI card then being positionable in any desired location relative to either the controlled product or the host computer or terminal by simply connecting it to the existing power lines or a dedicated twisted pair.

When operating in the master interface mode this universal interface receives a message over an RS232C link which complies with all of the mechanical, electrical and protocol requirements of a standard RS232C serial port. This message is then stripped of the RS232C protocol and transferred in segments compatible with the INCOM chip requirements and the 33 bit message format used by the INCOM network. Similarly, messages from the network are in turn translated to ASCII format before being passed to the host computer or operator on a terminal, so that access to the INCOM network is provided through conventionally equipped RS232C equipment. This arrangement thus makes the INCOM network protocol transparent to the host computer or operator who is acting as a network master. When operated in the expanded master mode the MEI card is also capable of adapting to different BAUD rates over the RS232C's serial link, these BAUD rates being selectable in accordance with the particular requirements of the host computer or terminal which is acting as the master device for the INCOM network.

When the universal MEI card is operated in the expanded slave mode it provides information from and to a controlled product at the request of the master device on the INCOM network. The micro-controller in the MEI card processes requests from the network master and performs all exchange procedures with the controlled product. Information from the controlled product is taken continuously by the expanded slave mode MEI card and stored in the 8051's RAM. A parallel data interface to the controlled product is accomplished by using one of the micro-controller's 8 bit bidirectional ports. Segments of the other ports are used as control and status lines between the MEI card and the controlled product. The protocol between the MEI card and the controlled product is based on the MEI card initiating all interactions with the product. The MEI card may process any one of sixteen separate product buffers at any instant, as selected by the network master. The information obtained by the MEI card is passed to the master only upon request from the master. The MEI card may thus be used with different microprocessor controlled products and permits these products to utilize the INCOM network by buffering the data from the various control parameters of the product and adding the necessary protocol.

BRIEF DESCRIPTION OF THE DRAWINGS

The invention, both as to its organization and method of operation, together with further objects and advantages thereof, will best be understood by reference to the accompanying specification taken in connection with the accompanying drawings in which:

FIG. 1 is an overall block diagram of the universal microcontroller-based expanded-mode interface arrangement of the present invention;

FIG. 2 is a more detailed block diagram of this interface when operating in the expanded master mode;

FIG. 3 is a block diagram of this interface when operating in the expanded slave mode and interfacing the controlled product in a parallel data format;

FIG. 4 is a block diagram of this interface when operating in the expanded slave mode and interfacing the controlled product in a serial data format;

FIGS. 5 and 6 when placed side by side comprise a schematic diagram of the hardware components of this interface.

FIG. 7 shows the pin connections of the interface-product connector;

FIG. 8 shows the pin connections of the interface card edge connector which is employed in the expanded master mode of the interface;

FIG. 9 is the message bit format of the control message sent by the INCOM master to any one of the stand alone slaves or expanded mode slaves on the INCOM network;

FIG. 10 is the message bit format of a data message sent over this network;

FIG. 11 is the message bit format of a control message from the INCOM master as read from the internal shift register of the INCOM chip;

FIG. 12 is the message bit format of a data message as read from the internal shift register of the INCOM chip;

FIG. 13 is a timing diagram for a typical transfer from the multi-purpose interface to a controlled product;

FIG. 14 is a timing diagram for the passage of a control byte from the interface to the controlled product when a response is expected from the product;

FIG. 15 is a timing diagram of a typical transfer from the controlled product to the interface;

FIG. 16 is a timing diagram of a control byte which is passed from the controlled product to the interface indicating that the controlled product is returning mastership to the interface.

FIG. 17 is the message bit format for a status message returned to the interface by the controlled product;

FIG. 18 is a diagram of the Data Table storage arrangement of a type IQ2000 controlled product;

FIG. 19 is a schematic diagram of the RS232C serial master driver/receiver card of FIG. 1;

FIG. 20 is a block diagram of a typical IQ2000 control system using an external master-to-INCOM interface and INCOM slave-to-parallel-product interfaces;

FIG. 21 shows several message byte formats in a limited ASCII protocol, these formats being utilized in the RS232C serial master arrangment of FIG. 20;

FIG. 22 shows the bit formation in a typical byte format shown in FIG. 21;

FIG. 23 shows the message byte format for a typical specific control message;

FIG. 24 is a table of the limited ASCII characters employed in the RS232C serial master arrangement of FIG. 20;

FIGS. 25-32 are event transmission tables illustrating typical byte formats utilized in message transmissions in the system of FIG. 20;

FIGS. 33 and 34, when placed in vertical alignment, and FIG. 35 comprise a flow chart of the logic flow during the initialization phase of the INCOM software program of the multi purpose interface;

FIG. 36 is a flow chart of the logic flow during a portion of the multi purpose interface program which is used by all three configurations of this interface;

FIGS. 37 and 38, when placed in vertical alignment, FIGS. 39 and 40, when placed sidewise in vertical alignment, and FIG. 41 comprise flow charts of the logic flow during the INCOM slave-to-parallel-product configuration software program of the multi purpose interface;

FIGS. 42 and 43, when placed side by side, comprise a flow chart of the logic flow during a product acknowledge interrupt routine employed during output from the interface to a controlled product in this program;

FIGS. 44, 45 and 46, when placed side by side, comprise a flow chart of the logic flow during an INCOM interrupt routine employed in the software program of the multipurpose interface;

FIGS. 47 and 48, when placed side by side, and FIG. 49, comprise flow charts of the logic flow during the INCOM receive control portion of the INCOM interrupt routine in decoding a command message from the INCOM network;

FIGS. 50-59 are generalized flow charts giving an overview of the logic flow when the multi purpose interface is in a master/product configuration;

FIG. 60 is a flow chart of the initialization portions of the master/product and master/INCOM programs;

FIG. 61 is a flow chart of the main polling loops of the master/product and master/INCOM programs;

FIGS. 62, 63 and 64 comprise a detailed flow chart of the POLL-RCV-INT routine used in both the master/product and master/INCOM programs;

FIG. 65 is a detailed flow chart of the TX-FMT-MSG routine used in both the master/product and master/INCOM programs;

FIGS. 66-75 comprise a detailed flow chart of the POLL-RCV-MSG routine used in the master/product program;

FIG. 76 is a detailed flow chart of the POLL-TX-DAT routine used in the master/product program;

FIG. 77 comprises a detailed flow chart of the POLL-TX-INT routine used in both the master/product and master/INCOM programs;

FIG. 78 is a detailed flow chart of the POLL-TX-PROD routine used in the master/product program;

FIG. 79 is a detailed flow chart of the TX-CAEF-MSG routine used in the master/product programs;

FIGS. 80 and 81 comprise a detailed flow chart of the RITI-INT routine used in the master/product program;

FIG. 82 is a detailed flow chart of the SETUP-SUBS routine used in the master/product program;

FIG. 83 is a detailed flow chart of the GET-BUF subroutine used in the master/product program;

FIG. 84 is a flow chart of the CHK-QUEUE subroutine used in the master/product program.

FIG. 85 is a detailed flow chart of the POLL-MEI-CMD routine which is the main polling loop of the master/INCOM program;

FIG. 86 is a detailed flow chart of the POLL-RCV-INCOM routine which is in the main polling loop of the master/INCOM program;

FIG. 87 is a detailed flow chart of the POLL-TX-INCOM routine which is in the main polling loop of the master/INCOM program;

FIG. 88 is a detailed flow chart of the INT-INCOM subroutine used in the master/INCOM program;

FIG. 89 is a detailed flow chart of the INT-TIMER interrupt routine which is used in the master/INCOM program;

FIG. 90 is a detailed flow chart of the INCOM-IN subroutine which is used in the master/INCOM program; and FIG. 91 is a detailed flow chart of the INCOM-OUT subroutine which is used in the master/INCOM program.

DESCRIPTION OF THE PREFERRED EMBODIMENT

Referring now to the drawings, and more particularly to the block diagram of FIG. 1, the microcontroller based expanded mode interface (MEI) card 30 is illustrated therein as comprising a coupling network 32 which is employed to couple the common INCOM network link lines 34 to an INCOM chip, or hardware based digital integrated circuit 36, which is preferably of the type described in detail in Verbanets application Ser. No. 625,747 now U.S. Pat. No. 4,912,723 referred to heretofore. The five interface lines of the INCOM chip 36 are connected to a multipurpose micro-controller 38 which preferably comprises an INTEL type 8051 8-bit microcontroller.

When the microcontroller 38 is programmed with the specific listing attached hereto it is capable of operating in either an expanded master mode or an expanded slave mode. In the expanded master mode the microcontroller 38 is arranged to receive serial data from the RS232C output port of an external master or host computer 40 through a serial master driver/receiver 42 which provides the required electrical isolation and level conversion for coupling the RS232C output of the computer 40 to the microcontroller 38.

When the microcontroller 38 is operated in the expanded slave mode it supplies data to and receives data from an external microprocessor controlled product 44. Data transmission between the microcontroller 38 and the controlled product 44 can take place either in a parallel data format over the parallel data bus 46 or in a serial data format using the full duplex serial channel of the microcontroller 38, as indicated in dotted lines by the serial data bus 48. However, the serial channel 48 is not used when the microcontroller 38 is operated in the expanded master mode.

In accordance with a further aspect of the present invention, when the MEI card 30 is operated in the expanded master mode it is also arranged to provide communication directly between one controlled product, such as the product 44, and a device compatible with RS232C standards such as the external master 40. Such direct communication may be provided independently of the INCOM network in which case the coupling circuit 12 (FIG. 5) is not connected to the common network line 34. The RS232C device may be a programmable controller which can monitor the status of the controlled product. However, the programmable controller must be capable of transmitting and receiving ASCII characters. In the alternative, the RS232C device may comprise an IBM personal computer, or equivalent, which can be used for maintenance or debugging of the MEI card, or a dumb terminal which can generate ASCII characters for this purpose. Preferably, the programs shown in the attached listing are all incorporated in one mask programmed ROM device which can be manufactured at low cost to provide all of the above-described functions of the multipurpose microcontroller 38.

The multipurpose microcontroller 38 is placed in the expanded master mode by means of a control signal supplied from the external master computer 40, or by means of a jumper on the MEI card 30, and interfaces the INCOM chip 36 to the external master or host computer 40 so that the computer 40 can act as the master for the INCOM network and supply command and data messages to any of the stand alone slaves or expanded mode slaves connected to the link 34. In the alternative, when the microcontroller 38 is operated in the expanded master mode, the external master computer 40 can communicate directly with the microprocessor controlled product 44 through the parallel data bus 46 without using the INCOM network link 34.

Preferably, the serial master driver/receiver 42 is not included on the MEI card 30 but instead is connected to a card edge connector on the MEI card 30 whenever it is desired to operate the multipurpose microcontroller 38 in the expanded master mode. With such an arrangement the MEI card 30 may be used in the expanded slave mode with various types of microprocessor controlled products, such as the product 44, without purchasing the serial master driver/receiver 42 which is required only for the expanded master type of operation of the microcontroller 38. To this end, the microcontroller 38 is normally operated in the expanded slave mode and a control signal is supplied from the external master computer 40 (or by means of a jumper on the MEI card 30) to cause the microcontroller 38 to operate in the expanded master mode. More particularly, as shown in the more detailed block diagram of FIG. 2 wherein the MEI card 30 is shown in greater detail, when operated in the expanded master mode, the card edge connector J2, which is provided on the edge of the card 30, includes a pin for the master configuration control line 50 which is supplied from the external master computer 40, the microcontroller 38 responding to this master configuration control signal by selecting the software required for its operation in the RS232C expanded master mode. The microcontroller 38 is also arranged to respond to control signals on the baud rate conductors 52, which signals may be supplied from the external master computer 40 through the serial master driver/receiver 42 to the card edge connector J2, or by means of jumpers on the serial master card 42, so that any one of a number of baud rates can be established at which data can be transmitted in either direction over the serial link between the master computer 40 and the microcontroller 38.

The MEI card 30 is also provided with a product connector J3, having the pin connections shown in FIG. 7, which is employed for the transmission of both control and data messages between the microcontroller 38 and the controlled product when either a parallel data format or a serial data format is employed. The use of either the parallel data format or the serial data format is controlled by the controlled product which supplies a control signal to the microcontroller 38 indicating which data format is to be used. However, in the expanded master mode shown in FIG. 2 the parallel data format must be used between the controlled product 44 and the microcontroller 38 since the serial data channel of the microcontroller 38 is employed for transmitting and receiving signals from the external master 40 over its RS232C port. Accordingly, in the expanded master mode of FIG. 2, the controlled product 44 supplies a parallel configuration signal over the conductor 54 and the microcontroller 38 responds thereto by transmitting and receiving data over the parallel data bus 46 and transmitting and receiving control signals over the control lines 56. In the expanded mode master configuration of FIG. 2 the microcontroller 38 also forces the INCOM chip 36 to operate in its expanded master mode by supplying a control signal over the MASTER*/SLAVE control line 58. The microcontroller 38 also provides an INCOM reset signal over the control line 60 to reset the INCOM chip 36 under certain conditions, as will be described in more detail hereinafter.

In the expanded mode slave configuration the microcontroller 38 is adapted to function with the controlled product 44 in either a parallel data format or a serial data format. The parallel data format connections for the MEI card 30 when operated in the expanded slave mode configuration are shown in FIG. 3. Referring to this figure, the connections between the card edge connector J2 and the microcontroller 38 are omitted for simplification. When no signal is present on the master configuration control line 50 (FIG. 2), the microcontroller 38 pulls the MASTER*/SLAVE control line 58 high so that the INCOM chip 36 is also operated in its expanded slave mode. In this mode the INCOM chip 36 responds to INCOM network messages which include an address portion corresponding responding to the setting of the address select switches 62, as described in detail in said copending Verbanets application Ser. No. 623,747 now U.S. Pat. No. 4,560,462. In this connection it will be understood that the address select switches 62 are physically a part of the MEI card 30 in the expanded mode master configuration of FIG. 2 but the INCOM chip 36 is controlled by the signal on the control line 58 to receive all network messages on the common network line 34, regardless of the address portions thereof and does not respond to the setting of the address select switches 62. In the parallel data format configuration of FIG. 3 the microcontroller 38 responds to a parallel configuration signal on the line 54 from the controlled product 44 by enabling the parallel data bus 46 and parallel data control lines 56 for bidirectional transmission between the microcontroller 38 and the controlled product 44.

In some situations it may be desirable to operate the MEI card 30 in an expanded mode slave configuration and adapt the microcontroller 38 to a serial data format for transmission and reception of data from the controlled product 44. This configuration is shown in FIG. 4 in block diagram form wherein the conductors from the card edge connector J2 are omitted since no master controller is connected to the card edge connector J2 in the expanded mode slave configuration. In the serial data arrangement of FIG. 4 the product connector J3 is arranged to receive bidirectional serial data over the serial lines 64 from the controlled product. Specifically, the serial lines 64 are connected in parallel to the serial transmit and receive lines of the card edge connector J2 so that the serial data transmission channel of the microcontroller 38 is used by the controlled product in the arrangment of FIG. 4. Also, the controlled product supplies a serial configuration signal and baud rate signals over the lines 66 to the microcontroller 38. The microcontroller 38 responds to these signals by enabling its serial data transmission channel and responding to the baud rate signals by accepting the designated baud rate from the controlled product.

MEI CARD HARDWARE

In FIGS. 5 and 6 of the drawings a circuit diagram of the hardware components of the MEI card 30, which is shown in block diagram form in FIGS. 2, 3 and 4, is provided. The following section will describe the hardware components of the MEI card with circuit references to FIGS. 5 and 6. All signal names will be capitalized and terminate with an asterisk if the signal is low-true.

INCOM Coupling Circuit 32

The INCOM coupling circuit 32 on the MEI card is shown in FIG. 5 of the drawings. Referring to this figure, it is first pointed out that a similar coupling circuit is disclosed in Engel application Ser. No. 706,079 now U.S. Pat. No. 4,580,688, filed Feb. 27, 1985 assigned to the same assignee as the present invention, and reference may be had to said Engel application for a detailed description thereof. However, for the purpose of the present invention it may be briefly stated that the INCOM coupling circuit 32 includes a coupling transformer 70 having a primary winding 72 which is connected to the common network line 34 through the capacitor 74, the primary winding 72 and the capacitor 74 being tuned to the carrier frequency of 115.2 kHz. A secondary winding 76 is also tuned to the carrier frequency by means of the capacitor 78, the bottom end of the winding 76 being connected through the 10 ohm resistor 80 to an FET 82 and the upper end of the winding 76 being connected through the resistor 84 and diode 86 to a positive voltage supply of approximately +24 volts which is supplied to either pin 12 of the product connector J3 or pin 2 of the card edge connector J2, as will be described in more detail hereinafter. The INCOM chip 36 develops an on-off keyed carrier signal on its Tx output line which is supplied through the capacitor 88 to the gate electrode of the FET 82 so as to control conduction thereof in connection with the carrier-on portions of the transmitted message. When the FET 82 is rendered conductive, approximately 24 volts is placed across the secondary winding 76 so that a carrier signal is coupled through the transformer 70 and appears on the network line 34 as an on-off keyed carrier signal of approximately 2.5 volts rms across a 10 ohm load which is sufficient to drive approximately 5000 stand alone slaves or expanded mode slaves connected to the line 34.

The transformer 70 is also provided with a tertiary winding 90 across which a message received from a network link 34 is developed and is supplied through a resistor 92 to a comparator 94 which acts as a high gain amplifier for the received signal so that a received on-off keyed carrier signal of approximately 5 volts amplitude is developed in the output of the comparator 94. This amplified and limited received carrier signal is supplied to the Rx input line (pin 6) of the INCOM chip 36.

INCOM Chip 36

The INCOM chip 36 is described in detail in Verbanets application Ser. No. 624,747 now U.S. Pat. No. 4,532,495, filed June 28, 1984, and assigned to the same assignee as the present invention, and reference may be had to this application for a detailed description of the operation thereof. When the INCOM chip 36 is used on the MEI card 30 it may be operated in either the expanded master mode, in which pin 27 is grounded and pin 1 is high, or the expanded slave mode in which pin 27 is grounded and pin 1 is low. Control of the mode of operation of the INCOM chip 36 is provided by the MASTER/SLAVE* line connected to pin 1 of the chip 36, this line being high when the INCOM chip 36 is to be operated in the expanded master mode and is low when the chip 36 is operated in the expanded slave mode. More particularly, the MEI card 30 is designed so that the INCOM chip 36 is operated in the expanded slave mode unless a serial master driver/receiver 42 is connected to the card edge connector J2 of the MEI card 30. Insertion of the serial master unit 42 with pin 10 (FIG. 8) set at a logic 0 places the INCOM chip 36 in the network master configuration. Failing to insert a serial master card 42 or inserting one which does not drive pin 10 of the card edge connector J2 to a low logic level places the INCOM chip 36 in the expanded slave mode on the network line 34. More particularly, a logic 0 on pin 10 of the card edge connector J2 (MASTER*/SLAVE input) is supplied to the NAND gate 100 (FIG. 6) to the other input of which the +5 volt supply is connected. The resultant logic "1" output on the MASTER/SLAVE* line is supplied to pin 1 of the INCOM chip 36 so as to force this integrated circuit to operate in the expanded master mode. In the absence of a logic 0 signal on pin 10 of the connector J2, pin 1 is low and the INCOM chip 36 is operated in the expanded slave mode. If desired, the master/slave status of the microcontroller 38 and INCOM chip 36 may be controlled by means of a jumper W4 on the MEI card 30 rather than from the external master 40 through pin 10 on the J2 connector. This jumper, when closed, grounds pin 1 of the INCOM chip 36 and pin 28 on the microcontroller 38 to place these units in the slave configuration, as shown in dotted lines in FIGS. 5 and 6. With the jumper W4 removed, pin 28 of the microcontroller is pulled up internally and +5v. is supplied to pin 1 of the chip 36 so that these units are operated in the master configuration.

When the INCOM chip 36 is operated in the expanded master mode its interface lines to the microcontroller 38 are continuously enabled and the interface to and from the microcontroller 38 is selected as the master controller of the INCOM chip 36. The microcontroller 38 can then, at any time, place information into the serial shift register of the INCOM chip 36 to be transmitted onto the INCOM network link 34. Messages are received from the network only when the microcontroller 38 allows the INCOM chip 36 access to the link 34.

Considered generally, the interface lines of the INCOM chip 36, which are continuously enabled in the master mode, include an interrupt line (INT) which is an active high output signal which is inserted at the end of a network message reception or at the end of a transmission operation by the INCOM chip 36. The INT line is reset and held low by a logic 1 on the serial clock (SCK) interface line of the INCOM chip 36.

The DATA interface line of the INCOM chip 36 is a bidirectional I/O pin whose direction is controlled by the signal on the read/write (R/W) interface line of the chip 36. When the R/W line is a logic high the data line is an output. When an interrupt is asserted on the INT line the DATA pin indicates the cause of the interrupt, the R/W line being held high at this time. A logic high on the DATA line when the INT line is asserted indicates that the interrupt was caused by the receipt of a network message by the INCOM chip 36. A logic 0 on the DATA line indicates the completion of a transmission to the network by the INCOM chip 36. The DATA interface line is also used as a bidirection data transfer line during a data transfer operation to and from the multipurpose microcontroller 38.

The SCK interface line is a serial clock line which is used to clock data into or out of the INCOM chip 36 through the DATA line. The quiescent state of the SCK line should be low. The direction of data flow is controlled by the R/W line. The R/W line is also used to transfer control of the internal shift register of the INCOM chip 36 from the micro-controller 38 to the INCOM network so that the chip U3 can initiate message transmission on this network. The BUSY/ line of the INCOM chip 36 is an active low output that indicates that the INCOM chip 36 is either busy demodulating a 33 bit network receive message or is busy transmitting a similar message onto the network.

When the INCOM chip 36 is operating in the expanded slave mode it is arranged to receive messages from the INCOM network master over the link 34 only when these messages include an address portion corresponding to the address established by the switches 62A–62C which are connected to the address terminals 11–23 of the chip 36. However, when the chip 36 is operated in the expanded master mode, its address decoder portion is bypassed and the chip is able to receive any message impressed upon the INCOM link line 34 regardless of the address portion thereof, the received message being stored in the internal shift register of the chip 36 so that it can be read out by the microcontroller 38 over the bidirectional DATA line of the chip 36.

As discussed generally in the above-identified Verbanets application Ser. No. 625,747, the INCOM chip 36 is designed to operate at several different baud rates so that different types of INCOM network links, such as power lines, twisted pair lines, or fiber optic cables may be employed as the common network link. In the MEI card 30 the jumper JP2 is employed to select a particular baud rate in accordance with a type of common network medium which is employed for the INCOM network. When the jumper JP2 is open the baud rate of the INCOM chip 36 is 300 baud. When the jumper is connected between pins 2 and 3 the baud rate is 1200 and when pins 1 and 2 are connected together the baud rate is 38.4K, this baud rate being normally employed when a low noise INCOM network link such as a fiber optics cable is used.

Multipurpose Microcontroller 38

The multipurpose microcontroller 38 employed on the MEI card 30 is preferably an INTEL type 8051 microcontroller. When the microcontroller 38 is programmed in accordance with the attached listing it can be operated in any one of three configurations, depending upon the logic signals applied to port P2.7 (pin 28) and port P3.7 (pin 17) of the microcontroller 38. P2.7 is the master*/slave choice and P3.7 is the parallel*/serial choice. These pins are pulled up internally in the microcontroller 38 unless grounded by an external signal. Thus, when no serial master card 42 is inserted into the card edge connector J2 and a parallel data controlled product 44 is connected to the J3 connector (as shown in FIG. 3), pin 28 is high and pin 17 is low and the microcontroller 38 is automatically operated in an INCOM slave-to-parallel-product configuration in which the software module on pages A-1 to A-31 of the attached listing is processed.

When the serial master card 42 is connected to the J2 connector and a parallel product 44 is connected to the J3 connector, pin 28 is low and pin 17 is low and the microcontroller 38 is automatically operated in a master RS232C-to-parallel-product configuration in which the software module identified as MEIRS232.SRC on pages A-32 to A-60 of the attached listing is processed. It should be noted that in this configuration the external master communicates directly with only one controlled parallel product independently of the INCOM network. Also, in this configuration portions of the INCOM slave-to-parallel-product module which involve communications between the MEI card 30 and the parallel product 44 are utilized, as will be described in more detail hereinafter.

When the serial master card 42 is connected to the J2 connector and no controlled product is connected to the J3 connector, pin 28 is low and pin 17 is high (because it is pulled up internally in the microcontroller 38) and the microcontroller 38 is automatically operated in a master RS232C-to-INCOM network configuration in which the software module identified as MEIINCOM on pages A-61 to A-71 is processed. In this configuration, portions of both of the preceding modules are also utilized, i.e., the INCOM network to MEI card portion of the INCOM slave-to-parallel product configuration and the RS232C to MEI card portion of the RS232C-to-parallel product configuration, as will be described in more detail hereinafter.

When the MEI card 30 is operated in the master RS232C-to-INCOM network configuration, information between the host computer 40 and the MEI card 30 is passed in an ASCII protocol over the RS232C link from the RS232C port of the host computer 40 through the serial master driver/receiver card 42 which provides a link compatible with RS232C standards both mechanically, electrically and protocolwise. In the microcontroller 38 the message is stripped of its RS232C protocol and transferred in segments compatible with the requirements of the INCOM chip 36 which in turn transmits a corresponding message to the INCOM network which includes the INCOM network protocol. Similarly, messages from the INCOM network are in turn translated to the ASCII format before being passed to the host computer 40. Accordingly, the MEI card 30 makes the INCOM network protocol transparent to the user at the external master computer or terminal 40.

When the microcontroller 38 is selectively operated in the INCOM slave-to-parallel product configuration (the expanded slave mode) the MEI card 30 provides information from and to a controlled product connected to the product connector J3 at the request of the master device on the INCOM network. The microcontroller 38 processes requests from the network master and performs all exchange procedures with the controlled product. Information from the controlled product is taken continuously by the microprocessor 38 when acting as an expanded mode slave and is stored with double buffering in the 8051's RAM As will be described in more detail hereinafter, the microcontroller 38 is specifically arranged to communicate with a type IQ2000 microprocessor-controlled motor starter and controller, such as shown and described, for example, in U.S. Pat. No. 4,456,867. Any data transmitted from the IQ2000 controlled product originates in this unit's Data Table which is an area in memory which contains the most current operating information and system status data of the controlled product. The IQ2000's Data Table may be considered at organized into sixteen separate buffers, such as shown in FIG. 18. Each of these buffers contains 32 bytes of data, these bytes being numbered 0–31. Three adjacent bytes in a particular buffer may be conveniently associated together in what is called a buffer segment. The purpose of such smaller groupings is to allow faster processing of specific data segments in the Data Table. Each of these buffer segments has a unique address which is programmed when the specific data in that area is accessed.

The microcontroller 38 is arranged to access data from only one of the sixteen Data Table buffers of the IQ2000 at a time. More specifically, when requested by the master, data from a single Data Table buffer designated by the master is alternately transferred to one or the other of two product buffers in the microcontroller 38. Each of these product buffers has the same capacity as a Data Table buffer (32 bytes) and is similarly addressed in 3 byte segments, as shown in FIG. 18.

Since the MEI 30 card is intended to operate with many different product lines, the protocol between the MEI card 30 and the controlled product 47 is made as general as possible. Accordingly, the microcontroller 38, when acting as an expanded mode slave, only needs to decipher the command type with minimal knowledge of the data content of the message transferred.

Interface Power Supplies

Power required to drive the MEI card's circuitry is obtained from the product interface connector J3. If the MEI card 30 is configured as a master device to the INCOM network without a local controlled product 44 attached, a power module can be incorporated at this connector to supply power. The power supplies include a +5 V regulated supply for the integrated circuits 36 and 38 and an unregulated +24 V. supply for the coupling circuit 32. These power supplies are also connected to the serial master driver/receiver 42 interface (J2) and can be supplied from the controlled product 44 through the MEI card 30 to the unit 42. If, however, a product is not connected to the MEI card 30 while operating in the master mode, the power can then be supplied through the card edge connector J2 either from the unit 42 or a separate power supply connected to this connector. The responsibility for the power connections to the MEI card 30 from host or separate power supply is thus determined at the application level.

MEI Card Reset And Deadman Circuits

When the MEI card 30 is configured to function as an expanded mode master in conjunction with the external master computer or terminal 40, power up reset control is supplied to the MEI card 30 from the serial master card 42.

When the MEI card 30 is operated as an expanded mode slave, as shown in FIG. 3, the product device must supply power up reset control. More particularly, pin 10 of the product connector J3 and pin 12 of the card edge connector J2 are connected to the Reset* line of the MEI card 30 (FIG. 6). When an active low signal is supplied from either of these connectors, it passes through the NAND gate 110 to the reset pin 9 of the microcontroller 38. This reset signal is also supplied through the inverter 112 to the reset pin 5 of the INCOM chip 36 (FIG. 5).

The MEI card 30 also includes a deadman circuit comprising the two DC triggered multivibrators 114 and 116, which are preferably of the commercial type MC14538B, or equivalent. This deadman circuit allows the MEI card 30 to reset itself if the normal programming sequence of the microcontroller 38 is not followed, i.e. the microcontroller 38 has lost its intelligence. Specifically, the time constant circuit 118, 120 for the multivibrator 114 establishes a timing interval of approximately 100 milliseconds during which a DEADMAN/ signal should be developed by the microcontroller 38 at the port P3.4 which is supplied to pin 5 of the multivibrator 114 to reset this multivibrator and restart the timing interval. If this signal is not developed during the 100 millisecond timing interval the 1Q output of the multivibrator 114 is employed as a reset signal to the multivibrator 116. The time constant circuit 122, 124 of the multivibrator 116 provides a 10 millisecond output signal which is supplied through the OR gate 110 to reset the microcontroller 38 and through the NAND gate 112 to reset the INCOM chip 36. This deadman circuit can be deactivated by removing the jumper JP1 (FIG. 6) on the MEI card 30.

MEI Card - Product Interface

The interface from the MEI card 30 to the controlled product is accomplished through a 26 conductor flat ribbon cable which is connected to the product connector J3, the pin connections of this connector being shown in FIG. 7. When the MEI card 30 is configured as an expanded mode slave the microcontroller 38 can communicate with the controlled product over this cable using either a parallel or serial data format. However, when the MEI card 30 is configured as the network master it can communicate with the controlled product 44 over this cable using only a parallel data format since the serial data channel of the microcontroller 38 is employed for the RS232C interconnection to the host computer 40 in the master configuration. The particular series or parallel format in which data is transferred between the controlled product and the microcontroller 38 is controlled by the product by selecting the polarity or logic level of a status bit defined within this interface. More particularly when pin 8 of the product connector J3 is a logic 0 the microcontroller 38 is conditioned for a parallel mode of operation while a logic level of 1 on pin 8 defines the serial data format. The parallel data interface to the controlled product is accomplished using the P0 8-bit bidirectional port of the microcontroller 38 while segments of the other ports are used as control and status lines. The serial data interface only requires the use of the serial data buffers of the microcontroller 38 and 4 status inputs. One of these status inputs defines the serial data mode of operation and the other three select the baud rate at which serial transfers are performed asynchronously. The baud rate is thus selected by the product device. The protocol between the microcontroller 38 and the controlled product is the same regardless of the parallel or series format mode of operation. This protocol is based on the microcontroller 38 initiating all interactions with the controlled product.

MEI Card - Parallel Format Interface

Considering now in more detail the specific signals transmitted between the microcontroller 38 and the controlled product when operating in the parallel data format, with a parallel data interface pins 14, 16, 18, 20 and 22 of the product connector J3 shown in FIG. 7 are unused. A brief functional explanation of each signal on the active pins of the connector J3 during parallel data transfer follows: Slave Par*/Ser - An active low input from the product device informing the microcontroller 38 that the product interface is set up for parallel mode. Output Cont*/Data - Provides a status indicator from the MEI card 30 informing the product device to interpret the P0 data bus as either control information (active low) or data (active high). Input Cont*/Data Provides a status indicator from the product device informing the MEI card 30 to interpret the data bus as either control information (active low) or data (active high).

- Output Str* - An active low control line from the MEI card 30 informing the product device that the information on the Data Bus (whether control or data) is stable and valid. This signal can only be active when the MEI card 30 is driving the Data Bus.
- Input Str* - An active low control line from the product device informing the MEI card 30 that the information on the Data Bus (whether control or data) is stable and valid. This signal can only be active when the product device is driving the Data Bus.
- Output Ack* - An active low control line from the product device informing the MEI card 30 that the product device has received the information on the Data Bus, thus allowing the MEI card 30 to end this transaction. This signal should be driven only in response to the reception of an Output Str* signal.
- Input Ack* - An active low control line from the MEI card 30 informing the product device that the MEI card is receiving information on the Data Bus, thus allowing the product device to end this transaction. This signal should be driven only in response to the reception of an Input Str* signal.
- Data Bits 0-7 - An 8 bit bidirectional bus transferring either control information or data (qualified by the appropriate Cont*/Data function) from the device driving the Str* control line to the device returning the Ack* control line.
- Reset* - An active low input from the product device which provides a power up reset to the MEI card 30, as described previously.

MEI Card-Product Serial Format Interface

When the serial data channel of the microcontroller 38 is used for the transmission of data between the microcontroller 38 and the controlled product, as described generally heretofore in connection with FIG. 4, only the even numbered pins 4-26 of the product connector J3 are utilized, the other pins of this connector being blank. A brief functional explanation of each of the signals on the active pins of the connector J3 for the serial format interface is as follows:

Slave Par*/Ser - An active high input from the product device in forming the microcontroller 38 that the product interface is set up for serial mode.

Serial Out - An active high signal which outputs serial data from the microcontroller 38 to the controlled product.

Serial In - An active high signal which inputs serial data to the microcontroller 38 from the product.

Baud - A three bit field input from the product device which selects the baud rate for this serial link between the microcontroller 38 and the controlled product. The decode of this field is as follows:

| baud Bits | Baud Rate Selected |
|-----------|--------------------|
| 000 | 100 |
| 001 | 300 |
| 010 | 600 |
| 011 | 1200 |
| 100 | 2400 |
| 101 | 4800 |
| 110 | 9600 |
| 111 | No Connection |

A baud rate setting of 111b when the microcontroller 38 is configured in the slave serial mode will halt the microcontroller 38 since a connection to neither the master host computer nor a slave product device is assumed.

Reset* - An active low input from the product device which provides a power up reset to the microcontroller 38, as described previously.

INCOM NETWORK-MEI CARD INTERFACE PROTOCOL

Since the MEI Card 50 acts as a common interface for the INCOM network, through the INCOM chip 36, the controlled product 47 and the ASCII II master computer 40, there are a number of different interface protocols which the microcontroller 38 must comply with. Considering first the INCOM network/MEI Card interface protocol, two types of messages exist in the INCOM network protocol, i.e. control and data messages. The format and structure of these messages on the INCOM link 34 are described fully in the above identified Verbanets application Ser. No. 625,747. These control and data messages are input to and extracted from the INCOM chip 36 regardless of whether the MEI card 30 is configured for the expanded master mode or the expanded slave mode. While reference may be had to said Verbanets applications for a detailed description of these control and data messages, the format for control and data messages inputted to the INCOM chip 36 is shown in FIGS. 9 and 10, respectively, while the control and data messages extracted from the INCOM chip 36 are shown in FIGS. 11 and 12, respectively. In FIGS. 9-12, inclusive, the two start bits, stop bit and the five bit BCH error code, which are required to make up the complete 33 bit INCOM control or data message, are eliminated for simplification.

Control Messages Initiated By The Network Master

When the MEI card is configured as the network master, control messages which are initiated by the external master computer 40 are stripped of their RS232C protocol and supplied to the INCOM chip 36 from the microcontroller 38 in the format shown in FIG. 9. If the MEI card 30 is configured as an expanded mode slave, however, these control messages are extracted from the INCOM chip 36 by the microcontroller 38 in the format shown in FIG. 11. Whether input or extracted, the information is handled in serial format, with the least significant bit (0) received first.

As a network master, the MEI card 30 can access both stand-alone mode slaves and expanded mode slaves. A stand-alone mode slave performs a simple one bit control output function and replies to the network master (when requested) with 2 status input bits. The four bit command field and the four bit subcommand field in the control messages of FIGS. 9 and 11 are not used when a control message is received by a stand alone mode slave. The four bit INCOM instruction field is decoded in the INCOM chip 36 to provide a number of instructions which pertain to either a stand alone mode slave or an expanded mode slave, as described in detail in said Verbanets applications Ser. No. 625,747 now U.S. Pat. No. 4,912,723. However, the only valid INCOM instruction received by the microcontroller 38 when operating as an expanded mode slave, is the enable interface instruction (0011B). All other instructions received by the microcontroller 38 will reject the control message from a network master by not accessing the command and returning the INCOM chip 36 interface to the INCOM network link 34.

The command definitions for control messages addressed to the MEI card 30 operating as an expanded mode slave, are given in Tables I and II below. In these tables the most significant bit in the command field indicates whether the microcontroller 38 will be transmitting data back to the INCOM network master (the most significant bit is "0"), or is receiving data from the master (the most significant bit is "1"). More particularly, when an enable interface instruction is received from the network master which is addressed to the INCOM chip 36, as established by the address switches 62A-62C, a transfer sequence is initiated between the master and this INCOM chip. Control of the INCOM chip is passed to the microcontroller 38 along with an interrupt on the INT line, thus allowing the microcontroller 38 to read the information stored in the serial shift register of the INCOM chip 36. The microcontroller 38 then decodes the command and subcommand fields and acts accordingly. Two actions may be taken. First, the microcontroller 38 may return information (either a single control message or a data message or messages followed by an acknowledge control message) to the network master by inputting the information to the INCOM chip 36 and commanding it to transmit the inputted information in the INCOM protocol over the INCOM link 34. Multiple messages may be transmitted because the microcontroller 38 is interrupted following each transmission. When all transmissions are complete, the microcontroller 38 returns control to the INCOM network interface. The network master will then provide the INCOM chip 36 with a disable interface instruction. In this first action the microcontroller 38 may send information stored in its buffer or information relating to its internal status, as shown by the commands in Table I.

The second action which can be taken by the microcontroller 38 is the reception of information from the network master with the intent of directly transferring data to the microcontroller in the controlled product 47, as shown by the commands in Table II. Here the microcontroller 38, when interrupted, first returns an acknowledgement control message to the master indicating acceptance of the command. Following this transmission the microcontroller returns control of the INCOM chip 36 to the network interface to receive the input data message. This continues until all data words are received, in which case the microcontroller 38 will then provide the network master with a positive or negative acknowledge control message. Control is again returned to the INCOM network interface to allow the network master to send the INCOM chip 36 a disable interface instruction.

TABLE I

| Command Field MSB-LSB | Sub Cmd. Field MSB-LSB | Command Name | Description |
|---|---|---|---|
| 0000 | | SSAT | Send status: |
| | 0000 | | Product's two bit status returned in control word (imitate stand-alone) |
| | 0001 | | Product's division code and product code/status |
| | 0100 | | Latest full holding buffer obtained from product device |
| | 1000 | | Interface card status |
| 0001 | xxxx | SSBS | Send buffer segment xxxx only |
| 0010 | xxxx | SUBS | Send buffer up to and including segment xxxx |
| 0011 | | | Reserved |
| 0100 | | | Reserved |
| 0101 | | | Reserved |
| 0110 | | | Reserved |
| 0111 | | | Reserved |

TABLE II

| | | | |
|---|---|---|---|
| 1000 | xxxx | RPBN | Receive xxxx as product buffer number to be accessed |
| 1001 | xxxx | RPFC | Receive xxxx as code passed to product in control to determine function |
| 1010 | xxxx | RPDM | Receive xxxx + 1 data messages to be passed to product (the first byte will provide the product with the function code) |
| 1011 | | | Reserved |
| 1100 | | | Reserved |
| 1101 | xxxx | RPFR | Receive xxxx as code passed to product in control to determine function. Response is requested informing the master of code acceptance and usage at the product level |
| 1110 | xxxx | RPDR | Receive xxxx + 1 data messages to be passed to product (the first byte will provide the product with the function code). Response is requested informing the master of data usage at the product level. |
| 1111 | | | Reserved |

Condsidering now the specific commands from the network master shown in Table I, the SSAT command requests various types of status information from the microprocessor 38 when operating as an expanded mode slave. The status groups requested are as follows:

| | |
|---|---|
| SSAT:0000 | Two status bits are returned in a control message which functions similarly to the status bits returned in a stand-alone mode slave. The bits, labeled ST2 and ST1, are returned in the two most significant bits of the subcommand field, i.e. bits 26 |

|         | -continued |
|---------|------------|
|         | and 25, respectively, as described in Verbanets application Ser. No. 625,747 now U.S. Pat. No. 4,912,723. |
| SSAT:0001 | Status indicating the product division code and the product code/status. This command may be employed in situations where a large number of products may be categorized based on the particular division in a large company which manufactures or uses the product. Each product within a product division may be assigned a product code identifying the specific product and further status bits are employed to indicate the operational status of this particular product. In response to this command one data message will be returned having the format shown in FIG. 17. This information is always stored in the first 3 bytes of the buffer supplied by the product, regardless of which buffer of the sixteen possible buffers is being accessed. |
| SSAT:0100 | This command requests all information from that one of the sixteen product buffers which is presently under investigation i.e. the buffer which has been chosen by the latest RPBN command (Table II). Since the microcontroller 38 can store 32 bytes of information relative to a particular product buffer, eleven data messages of 3 bytes each will be successively supplied to the INCOM chip 36 by the microcontroller 38 and successively returned to the network master in the INCOM protocol over the link 34. |
| SSAT:1000 | This command requests status information which is specific to the MEI card's processing functions and which does not reflect the product device's internal status. One data message will be returned by the microcontroller 38 in response to this command. The bit information of this response is defined as shown in Table 1A below. |

TABLE 1A

| | Expanded Mode Slave Internal Card Status Definitions |
|---|---|
| Data Bit | Function |
| 23 | MEI master*/slave configuration |
| 22 | Product parallel*/serial configuration |
| 21 | Product setup procedure in error (thus the MEI cannot interface the product) |
| 20* | Product interface link failure or an unexpected response received from product. |
| 19* | Product timeout error |
| 18* | INCOM interface setup was not in expected transmit/receive mode (hardware error) |
| 17* | INCOM interface link failure or an unexpected response received from master |
| 16* | INCOM reception had a BCH error |
| 15-8 | MEI firmware version (software revision) number, may differ for the slave and master configurations |
| 7-0 | MEI product (hardware revision) number = 0AAH. |

*bit is reset after the MEI status is read

The send single buffer segment (SSBS) command (Table I) requests one data message to be returned to the network master. The information returned will be the 3 bytes of the designated buffer segment of the product buffer presently under investigation i.e. that one of the 16 product buffers chosen by the latest RPBN command (Table II). As discussed heretofore, each product buffer is divided into eleven segments, made up of consecutive 3 byte lengths. The particular segment requested is defined in the subcommand field of the SSBS command. For example, a subcommand field of 0000 will result in the first 3 bytes, or segment 0, being returned to the INCOM master. Segment 0 of any buffer (chosen by RPBN, Table II) will always contain the division code and product code/status, which is also the status returned in response to command SSAT:0001, described above.

The send up to and including buffer segment command (SUBS) command is similar to the SSBS command except that the SUBS command requests one or more data messages to be returned to the master. The information returned may be multiple segments of the product buffer under investigation. All segments up to and including the segment defined in the subcommand field will be returned to the INCOM master in three byte data messages in the INCOM format shown in FIG. 10.

The receive product buffer number (RPBN) command (Table II) designates the particular product buffer which the MEI card 30 is to store and alternately update in its two holding buffers. The master selects a specific product buffer by the contents of the subcommand field. Any further commands initiated by the master will supply information from this particular buffer until another RPBN command is issued to modify the selected configuration.

The receive product function control code (RPFC) command provides the product a control message with sixteen possible functions as defined in the subcommand field. These functions are product dependent and thus are defined in the specifications of each product individually. When the MEI card 30 is functioning as an expanded mode slave, it does not attempt to interpret this subcommand field, nor will it require a response from the product device. Only an INCOM network level response (i.e. an acknowledgement) will be returned to the INCOM master in response to the RPFC command.

The receive product multiple data messages (RPDM) command is similar to the RPFC command in that it provides the product with information dependent on the specific needs of that particular product. The subcommand field in this command, however, specifies the number of data messages (+1) which are to be received by the MEI card 30 immediately following the reception of the RPDM command. For example, a subcommand field of 0000 in the RPDM command will be followed by one data message from the INCOM master. Accordingly, a total of 17 data messages from the INCOM master may follow the RPDM command. These data messages contain 3 bytes or 24 bits of information each. The first byte of the first data message received from the INCOM master will contain the function code of this message sequence. This code is product dependent and therefore is defined in the specifications of each product individually. When the MEI card 30 is functioning as an expanded mode slave, it only interprets the number of bytes to be passed to the product, without knowing the contents of the data to follow. The MEI card also will not require a response from the product device. Only an INCOM network level response (i.e., an acknowledgement) will be returned to the INCOM master.

The receive product functions control code with response (RPFR) command is the same as the RPFC command described above but indicates that the INCOM master is requesting a response from the product indicating the acceptance and usage of this control code function from the level of the product and not simply an acknowledgement at the INCOM network level. The reply returned by the product through the microcontroller 38 and the INCOM chip 26 to the network master should be the PRSP command, shown in Table III and described hereinafter, with the subcommand field contents of this reply being product dependent. This command will usually require a longer time for the product to respond.

The receive product data messages with response (RPDR) command is similar to the RPDM command described above but the master is requesting a response from the product indicating the acceptance and usage of this data message function from the level of the product, and not simply an acknowledgement at the INCOM network level. The reply returned from the product should be the PRSP command (Table III) with the subcommand contents being product dependent.

Data Messages Initiated By the Network Master

When the MEI card 30 is configured as the network master, data messages transmitted by the external master computer 40 to the microcontroller 38 are stripped of the RS232C protocol and are inputted to the INCOM chip in 3 byte segments in accordance with the format shown in FIG. 10. If the MEI card 30 is configured to operate as an expanded mode slave, however, these data messages are extracted from the INCOM chip 36 by the microcontroller 38, as shown in FIG. 12. Whether inputted or extracted, the information is handled in serial format, with the least significant bit (0) received first. The number of data bits actually transmitted/received per message transfer is 24, or 3 bytes. Information passed which has more than 24 bits will require multiple data messages to be transferred.

Initially, a control message must be sent by the network master before it can transfer any data messages. This control message is employed to enable the expanded mode interface between the INCOM chip 36 and the microcontroller 38 if this interface is not already enabled. Also, this control message is employed to provide the microcontroller 38 with a command which defines the type of data message or messages which will be sent. Before the network master begins sending the data, however, it must wait for an acknowledge control message returned from the MEI card 30 operating as an expanded mode slave to inform the network master that the command has been accepted. If the MEI card 30 does not accept command, an error control message (or no reply, if the INCOM chip 36 does not receive the enable interface instruction correctly due to a transmission error) will inform the network master to retry the command. After the microcontroller 38 receives the corresponding number of data messages, as defined in the previous command sent, a control status message is returned to the network master indicating the correctness of the information received.

Control Messages Returned To The Network Master

When the MEI Card 30 is configured to operate in the expanded master mode, control messages intended for the external master computer 40 are extracted from the INCOM chip by the microcontroller 38 in the format shown in FIG. 11 and supplied over the RS232C channel to the external master computer 40. If the MEI card 30 is configured to operate as an expanded mode slave, however, these control messages are supplied to the INCOM chip 36 by the microcontroller 38 in the format shown in FIG. 9. Whether extracted or inputted, the information is handled in serial format, with the least significant bit (0) received first. These control messages have the slave's own address in the address field of the message. The INCOM instruction field is returned with the same information which was received by the slave from the master's most recent control message. The command definitions returned to the network master differ from the commands sent by the network master, and are shown in Table III below.

TABLE III

| Command Field MSB-LSB | Sub Cmd. Field MSB-LSB | Command Name | Description |
|---|---|---|---|
| 0000 | 00ss | SMSS | Stand-alone Mode Slave Status Image ss is the two status bits defined |
| 0001 | | CAEF | Command Acknowlege and Error Functions: |
| | 0000 | | Acknowlege command |
| | 0001 | | Non-acknowlegement command |
| | 0010 | | Repeat request |
| | 0011 | | BCH error in transfer sequence |
| | 0100 | | MEI card requires buffer segment number |
| | 0101 | | Hardware failure |
| | 0110 | | Product device not responding |
| 0010 | xxxx | PRFC | Product Device Direct Response |
| 0011 to 1111 | | | Reserved |

Referring to Table III, the stand-alone mode slave status image (SMSS) command is returned to the network master in response to an SSAT:0000 command described in detail heretofore. The subcommand field returns 00ss, where ss are the two status bits, ST2 and ST1, described heretofore. These two bits are always stored in the two least significant bits of the products division code and product code/status word (or 3 byte field), as shown in FIG. 9A.

The command acknowledge and error functions (CAEF) command returns positive or negative status information to the network master concerning the expanded mode slave's attempt to process the master's most recent request, as follows:

| | |
|---|---|
| CAEF:0000 | Positive acknowledge status is returned to the master device indicating the MEI card 30 has accepted the present command or a transfer sequence between the MEI card 30 and the controlled product was completed successfully. |
| CAEF:0001 | Negative acknowlege status is returned to the master device indicating that the MEI card 30 has not accepted the command or transfer sequence. |
| CAEF:0010 | The MEI card 30 wishes the master to transmit its request again. |
| CAEF:0011 | The MEI card 30 has received a BCH error in one or more of the data messages transmitted from the master in a transfer sequence |
| CAEF:0100 | If the master is requesting buffer information from the product device and the MEI card 30 has not received the RPPN |

| | -continued |
|---|---|
| | command (which initializes the product buffer number), an error is returned to the master requesting this information. |
| CAEF:0101 | The MEI card 30 detects an error condition internal to the controlled product's hardware. |
| CAEF:0110 | The MEI card 30 does not receive a response from the controlled product it is monitoring. |

The product device direct response (PRFC) command (Table III) returns xxxx from the controlled product in response to an RPFR command or an RPDR command received from the network master. The subcommand field returns xxxx which is passed from the controlled product informing the network master of the acceptance and usage of the received information at the product level, i.e. not just at the INCOM network level. Since this reply is from the product level, the contents of this subcommand field is application dependent.

Data Messages Transmitted To The Network Master

When the MEI card is operated in the expanded master mode, data messages received by the INCOM chip 36 are extracted from this chip by the microcontroller 38, as shown in FIG. 12. If the MEI card 30 is configured to operate as an expanded mode slave, however, these data messages are input to the INCOM chip 36 by the microcontroller 38, as shown in FIG. 10. Whether extracted or inputted, the information is handled in serial format, with the least significant bit (0) received first. The number of data bits actually transmitted/received per message transfer is 24, or 3 bytes. Information passed which has more than 24 bits will require multiple data messages to be transferred. When the microcontroller 30 is operating as an expanded mode slave, it will fill the unused data portion of messages not containing an exact multiple of 24 bits with zeros. Also, the data bytes are extracted from the memory of the microcontroller 38 and delivered to the network master as shown in Table IV below.

TABLE IV

| Network Data Field Setup | |
|---|---|
| Data stored as: | |
| RAM Storage Address | Data Bit 7--------0 |
| yyyy | hgfedcba |
| yyyy + 1 | ponmlkji |
| yyyy + 2 | xwvutsrq |
| Transferred on network as: Network Data Message Bit 3------------------------------26 | |
| abcdefghijklmnopqrstuvwx | |

If data is requested by the network master and the MEI card 30 does not need to return an error message, then the required number of data messages are returned to the network master with an acknowledge control message (CAEF:0000) immediately following the data. The MEI card 30 then controls the R/W line to the INCOM chip 36 to set up the INCOM chip 36 to receive another instruction from the INCOM network.

MEI CARD-PRODUCT INTERFACE PROTOCOL

The control commands and their definitions for transfers from the MEI card 30 to the controlled product 44 and for transfers from the product device 44 the MEI card 30, are given in Tables V and VI, respectively, below. In these tables the command and subcommand fields are given in hexadecimal notation.

TABLE V

| Control Commands To The Product Device | | |
|---|---|---|
| Control Code (In HEX) | Command Name | Description |
| 00H | NOREQ | No request |
| 0EH | MPRES | MEI Card has been Reset |
| 1xH | WPCOD | Receive x as code to determine function from the network master |
| 2xH | WPDAT | Receive x + 1 (times 3) bytes of information from the network master, with the first byte providing the function code |
| 9xH* | WPCDR | Receive x as code to determine function from the network master, then pass back a response |
| AxH* | WPDTR | Receive x + 1 (times 3) bytes of information from the network master with the first byte providing the function code, then pass back a response |
| B0H* | WPSTA | Pass the division code and product code/ status (i.e., bytes 1, 2 and 3 of all product buffers) |
| CxH 8 | WPBUF | Pass all bytes of information for buffer x |

TABLE VI

| Control Commands From The Product Device | | |
|---|---|---|
| 80H* | WPRET | Return mastership back to MEI interface card |
| 9xH* | WPPLR | Return mastership back to MEI interface card while providing a nibble x as status requested from the MEI command |

Since the MEI card 30 is to be used with a wide variety of controlled products, these exchange definitions are not for specific purposes but are kept general in form. A maximum of 256 control commands are available in each direction using this transfer protocol. For programming ease, all commands which require a change of mastership between the MEI card 30 and the controlled product 44 have their most significant bit (bit 7) set.

Considering first the control commands which are sent from the MEI card 30 and received by the controlled product 44, shown in Table V, it should be pointed out that the control code shown therein is given in hexadecimal notation. Also, those control commands to the product device which imply a transfer of mastership are denoted by an asterisk following the control code (the msb is set). An explanation of each command in Table V is as follows:

NOREQ: The MEI card 30 is not requesting information from the product nor does it want to receive information from the product. This command simply informs the product device that the MEI card 30 is alive, although the interface to the product is presently idle.

MPRES: By this command the MEI card 30 is informing the product that it has just initialized itself from a reset function. Although transmitted to a parallel formatted product, this command is mainly intended for use when the MEI card is interface to a product with a serial configuration. Three consecutive MPRES commands will be sent to the product (the serial link operates in the full duplex mode) informing the product to halt all previous interactions with the MEI card. This command is intended to initialize the interface in the event of a deadman time out on the MEI card 30 which will cause a reset condition. The product device shall stop all transmissions to the MEI card when this command is received.

WPCOD: The MEI card 30 is passing the function control code received from the master device's RPFC command (described previously) to the product. It is passed to the product in the lower nibble of the WPCOD command, and provides one of 16 possible functions. The function definitions are not decoded by the MEI card 30, thus allowing each product to interpret the code individually.

WPDAT: Following the WPDAT command, the MEI card 30 will pass 3 times the number of bits (+1) specified in the lower nibble of this command to the product. These bytes were received from the master device's RPDM command (discussed previously). The data is product dependent and therefore the MEI card 30 does not interpret the information. The first data byte passed to the product will be the function code to be decoded by the product.

WPCDR: This command is the same as the WPCOD command above, except the MEI card 30 is requesting the product to return a response following the command. This response is product dependent and is not interpreted by the MEI card 30, but rather is transferred to the INCOM master (or the host computer 40 if this MEI card is functioning as the INCOM master and is conversing with the control product 44).

WPDTR: This command is the same as the WPDAT command above, except the MEI card 30 is requesting the product to return a response following the command and data provides to the product device. This response is product dependent and is not interpreted by the MEI card 30, but rather is transferred to the INCOM master (or host computer 40 if this MEI card functions as the INCOM master and is conversing with the local product 44)

WPSTA: By this command the MEI card 30 is requesting the division code and product code/status from the product. This information is 3 bytes in length and will always be the first 3 bytes of all of the 16 product buffers. After transmission of this control word mastership of the link is given to the product.

WPBUF: By this command the MEI card 30 is requesting all the bytes of the product buffer specified in the lower nibbl of this command. A product command may have up to 16 possible buffer configurations. The MEI card 30 will interrogate that buffer pertaining to the master device's latest RPBN command received from the master. After transmission of this control word mastership of the link is given to the product. Considering now the control commands sent by the product and received by the MEI card 30, shown in Table VI above, an explanation of each command follows:

WPRET: The product device is returning mastership of the product/MEI card interface back to the MEI card 30. This occurs when the product has completed transferring all the data requested by the MEI card 30 or if no information is presently available for transfer.

WPPLR: By this control command the product device is returning mastership of the product/MEI card interface back to the MEI card 30 and is similar to the WPRET command above with the exception that the lower nibble of this command contains status information from the product. This information was requested by the previous command from the MEI card 30, as for example the WPCDR or WPDTR commands discussed above, and is product dependent.

MEI Card-Product Parallel Format Operating Discipline

Considering now the operating discipline or structure of the protocol between the MEI card 30 and the controlled product 44 when using the parallel data format, at initialization (or start up) the MEI card 30 will be the master device for exchanges between itself and the product. The timing sequence for a typical transfer from the MEI card 30 to the product device is shown in FIG. 13, wherein the waveforms on the four control lines Output Cont*/Data, Data Field, Output Str*, and Output Ack* and the respective timing therebetween, is shown. Initially the MEI card 30 places correct information on the Data Field and Output Cont*/Data lines. When these lines are stable the MEI card 30 activates the Output Str* line to the product device. The product device reads this information and then activates the Output Ack* line to the MEI card 30 to acknowledge reception. This acknowledgement indicates to the MEI card 30 that the transfer is complete. At this time one of two approaches may be used. If the MEI card 30 has not passed mastership to the product device (i.e., is not requiring information to be returned) the MEI card 30 keeps control of the Data Field and Output Cont*/Data lines while deactivating the Output Str* line. This status change then signals the product device to deactivate the Output Ack* line. Another transaction cannot occur until the MEI card 30 witnesses this change.

If, however, the MEI card 30 is expecting a response from the product, it passes a control byte to the product device, i.e. one of the control commands shown in Table V with the msb set. The product decodes this control command, which indicates that the product should become the master of the MEI card-product interface. The timing for the passage of this control byte is shown in the FIG. 14. As shown in this figure, at the completion of the transfer from the MEI card, the MEI card first tristates the Data Field lines prior to deactivating the Output Str* line. This status change then signals the product device to deactivate the Output Ack* line. Deactivation of the Output Ack* line indicates to the MEI card 30 that the product has taken mastership. The MEI card 30 will then look for the Input Str* line to become active to begin accepting data. Failing to see this change of status (or any transfer thereafter) within approximately one second will return control back to the MEI card 30.

Considering now an exchange between the controlled product 44 and the MEI card 30, a timing sequence for a typical transfer in this direction is shown in FIG. 15. Here the product device is the interface master and thus places correct information on a Data Field and Input Cont*/Data lines. When these lines are stable the product device activates the Input Str* line to the MEI card 30. The MEI card 30 reads this information and then activates Input Ack* line to the product device to acknowledge reception. This acknowledgement indicates to the product device that the transfer to the MEI card 30 is complete. Again two approaches may be used. If the product device is not returning mastership to the MEI card 30 (i e., has not completed transferring all the requested information), the product device keeps control of the Data Field lines while deactivating Input Str*. This status change then signals the MEI card 30 to deactivate the Input Ack* line. Another transaction cannot occur until the product device witnesses this change.

When the product device has returned all requested information to the MEI card 30 (or has none to give), it passes a control byte to the MEI card 30 indicating that it is returning mastership of the interface to the MEI card 30, these control commands being described heretofore in connection with Table VI. The timing for the passage of this control byte is shown in FIG. 16 wherein it will be seen that at completion of the transfer, the product device must first tri-state the Data Field lines prior to deactivating the Input Str* line. This status change then signals the MEI card 30 to deactivate the Input Ack* line which indicates to the product that the MEI card has reestablished mastership. The product will then look for the Output Str* line to become active to begin accepting transfers from the MEI card 30. A time out by the product device is not needed in this situation since the interface, if not receiving a transfer completion within approximately one second, will resume control of the interface anyway. Also, if this control message goes undetected by the MEI card 30 (due to transmission errors) the interface will recover since the MEI card 30 will time out and resume control.

MEI CARD-EXTERNAL MASTER SERIAL INTERFACE c1 MEI Card/Serial Master Driver/Receiver Connections The interface between the MEI Card 30 and the serial master card 42 is provided by an 8 position, two sided card edge connector J2 the pin connections of which are shown in FIG. 8. The MEI card 30 functions as an RS232C data communication equipment interface while the host computer 40 functions as an RS232C data terminal equipment interface. Full duplex operation employing a serial format consisting of one start bit, 8 data bits and 2 stop bits is supported. The signal description of this interface is as follows:

Master* Slave: An active low input from the serial master card 42 which informs the microcontroller 38 and the INCOM chip 36 that the MEI card 30 is to function as a master device on the INCOM network. If this signal is not driven low, the MEI card 30 will function as an expanded mode slave.

TxD: Transmit Data line. An active high signal which inputs serial data to the MEI card from the host computer 40 through the serial master card 42.

RxD: Receive Data line. An active high signal which outputs serial data from the MEI card 30 to the host computer 40.

RTS*: Request To Send line. An active low input control signal which is used to condition the local MEI card 30 for data transmission. The active state maintains the MEI card 30 in the transmit mode, while an inactive state maintains a non-transmit mode. A transition to the active state allows the MEI 30 card to enter the transmit mode, thus activating Clear To Send (CTS*) and Transferring Data across the interface on transmit data (TxD line). A transition to the inactive state forces the MEI card 30 to complete the transmission of all data which was previously transferred across the interface on the TxD line and then assume a non-transmit mode. The MEI card 30 must then respond by placing the CTS* line in the inactive state. The RTS* line cannot be turned active again until CTS* becomes inactive.

CTS*: Clear To Send line. An active low output control signal which is used to indicate whether the MEI card 30 is ready to transmit data. The active state of the CTS* line is a response to the occurrence of a simultaneous active condition of Request To Send (RTS*) and Data Set Ready (DSR*).

DSR*: Data Set Ready line. An active low output control signal used to indicate the status of the MEI card-external master interface. The active state of this signal indicates that the MEI card 30 has completed its initialization procedures, is set up in the master configuration mode and receives Data Terminal Ready (DTR*) in the active state. The inactive state is an indication to the host device 40 to disregard signals appearing on the other lines from the MEI card 30.

DTR*: Data Terminal Ready line. An active low input control signal used to control switching of the MEI card to the RS232C serial channel interface. The active state prepares the MEI card 30 for connection to the serial interface and maintains this connection established. The inactive state causes the MEI card to be removed from the serial channel following the completion of any transmission in progress. When DTR* is set inactive, it cannot be turned active again until Data Set Ready (DSR*) becomes inactive.

Baud 0, 1, 2: A three bit field input from the serial master card 42 which selects the baud rate for this serial link between the MEI card 30 and the external master computer 40. The decode of this field is the same as described previously in connection with the MEI card product serial format interface. A baud rate setting of 111b while the MEI card 30 is configured as the master device, will halt the microcontroller 38 since this configuration is undefined.

Reset*: An active low input from the serial master card 42 which provides a power up reset to the MEI card 30.

Serial Master Driver/Receiver Card 42

The serial master driver/receiver card 42 is shown in FIG. 19 and comprises a series of six type H11A1 opto-isolators 140–150 which are employed to electrically isolate the MEI card 30 from the RS232C connector J4 which may comprise a standard 25 pin subminiature connector. More particularly, transmissions from the MEI card 30 are supplied from the T×D line to a type 75492 inverter 152 to the diode portion of the opto-isolator 140. The output of the isolator is supplied to a type 1488 level setting driver 154 the output of which is supplied through pin 3 of the J4 connector to the master computer 40. Transmissions from this external master are supplied from pin 2 of the J4 connector through the type 1489 inverter 156 and a type 75492 inverter 158 to the diode portion of the opto-isolator 146. The output of this isolator is then supplied over the R×D line to the MEI card 30. The handshake line RTS is likewise supplied through the inverter 160 to the opto-isolator 142 the output of which is connected through the driver 162 through pin 5 of the J4 connector. The other handshake line of the MEI card 30, i.e., the DTR line is likewise supplied through the inverter 64 to the opto-isolator 144 the output of which is supplied through the driver 166 through pin 6 of the J4 connector. The CTS handshake signal from the external master is supplied from pin 4 of the J4 connector through the inverters 168 and 170 to the isolating diode portion of the opto-isolator 148, the output of which is connected to the CTS line and supplied to the MEI card 30. The DSR handshake signal is supplied from pin 20 of the J4 connector through the inverters 172 and 174 to the diode portion of the opto-isolator 150, the output of which is supplied to the DSR line of the MEI card 30. If desired, one of the handshaking lines in each direction, i.e., the DTR and the DSR lines, may be eliminated in order to reduce the cost and size of the serial master card 42. The software program listed in the attached Appendix is based on the use of a single handshake line in each direction, i.e., the lines RTS and CTS.

The serial master card 42 is also provided with the AC voltage input terminals 180, 182 and 184 to which a suitable AC voltage is supplied from the illustrated power transformer 186, this voltage being supplied through the full wave rectifier 188 to the voltage regulators 190, 192 and 194. The voltage regulator 190 is preferably a type LM7805CT and supplies an isolated +5 volts to the indicated portions of the serial master card 43. The voltage regulator 192 is preferably a type LM78M12CP and supplies +12 volts isolated and the voltage-regulator 194 is a type LM7912CT and supplies −12 volts isolated to the indicated portions of the serial master card 42.

In the embodiment of the serial master card 42 shown in FIG. 19 (and in the attached listing) only two baud rate conductors, i.e., baud 0 and baud 1 may be selected by means of the jumpers W11 and W12 which are connected to the pins 4 and 6, respectively, of the J2 connector. Accordingly, selective closure of these jumpers allows a selection of baud rates of either 300, 600, 1200 or 2400. Also, in the embodiment of FIG. 19 control of the master-slave configurations is not made from the external master 40 so that pin 10 of the J2 connector is left blank. In this embodiment, control of the master-slave configuration is provided by a master-slave jumper W4 on the MEI card 30, the connections for which are shown in dotted lines in FIGS. 5 and 6. When the jumper W4 is used the master*/slave connections shown in dotted lines in FIGS. 5 and 6 are used instead of the connections shown in full lines in these figures. In the alternative, the master/slave jumper W14 in the serial master card 42 may be connected to pin 10 of J2, in which case the connections shown in full lines in FIGS. 5 and 6 are used.

External Serial Master Format and Operation

In discussing the format and operation of the serial interface between the MEI card 30 and an external master 40, a system such as shown in FIG. 20 will be considered. In this system, the MEI card 30 has no controlled product connected to its J3 connector and receives ASCII encoded serial data from the external master computer or terminal 40 through the serial master card 42. The MEI card 30 strips off the ASCII card protocol and formats the message received from the external master 40 into the INCOM protocol shown in FIGS. 9 and 10 and loads the control or data message into the serial shift register of the INCOM chip 36 on this MEI card 30. After this message has been stored in the INCOM chip 36 of the MEI card 30 a message is transmitted over the INCOM network line 34 to a number of MEI cards 30A, 30B each of which is associated with an IQ2000 motor controller (controlled product) which is connected to the J3 connector of each of these MEI cards 30A, 30B. In the system of FIG. 20, the microcontroller 38 of the MEI card 30 is operated in the master RS232C-to-INCOM network configuration by closure of the jumper W4 on the MEI card 30. On the other hand, the MEI cards 30A and 30B which provide communication with the IQ2000 products 44A and 44B, respectively, are operated in the INCOM slave-to-parallel product configuration by opening the jumper W4 and supplying a low signal to pin 8 of the J3 connector from the associated IQ2000 microprocessor. The MEI cards 30A and 30B thus operate in accordance with the INCOM network-MEI card interface protocol discussed in detail heretofore in connection with the controlled product 44.

As discussed generally heretofore, any data transmitted from an IQ2000 controlled product originates in that unit's Data Table. This Data Table is an area in memory which contains the most current operating information and system status data. As shown in FIG. 18, the IQ2000's Data Table is considered as being organized into 16 separate areas, called buffers, each of which contains 32 bytes of data numbered 0 through 31. Groupings of three adjacent bytes are conveniently associated together into what are called buffer segments, each of which has a unique address which is programmed when the specific data in that area is accessed.

The external master 40 in the system of FIG. 20 may access data from a selected one of the IQ2000's, either as a single buffer segment or as a group made up of from 2 through 11 buffer segments which are numerically adjacent. The external master may also access a complete 32 byte buffer which is composed of eleven buffer segments. The MEI cards 30A and 30B act as interfaces between the IQ2000's Data Table and the external master device, it being realized that the Data Table is never directly accessed by the master device but instead requests are sent to the MEI card 30A or 30B which transfers data out of the associated IQ2000 Data Table and makes it available for transmission, one buffer at a time. The function of the MEI cards 30A and 30B are thus to control the transfer of specific data out of the associated IQ2000 Data Table to the MEI card, to transmit that data to the external master 40, to accept transmissions of data from the master 40 intended for the microprocessor of the associated IQ2000, to reset the IQ2000 from a tripped condition when signalled to do so by the external master 40, and to generate various communication control characters related to the exchange of information, as will be discussed in more detail hereinafter. As discussed generally heretofore, the MEI cards 30A and 30B are provided with two product buffers which are organized identically to the Data Table buffer, as shown in FIG. 18, each of these product buffers being alternately updated in accordance with the data in the corresponding buffer of the Data Table of the associated IQ 2000.

As discussed generally heretofore, the external master 40 may be a host computer, a personal computer, or any RS232C device capable of sending and receiving ASCII characters. The IQ2000's 44A and 44B are always considered to be slave devices. Considering very generally the various types of communication requests which the external master 40 may send to an IQ2000, these communication requests may either be (1) request for operating information, (2) request for system status data, or (3) request for miscellaneous data. In requesting current operating information, the external master 40 requests that the current operating data in a specific Data Table buffer be transferred into the product buffers of the associated MEI card 30A or 30B, this buffer being one of the 16 buffers available in the Data Table of the IQ2000. The external master can also send requests for the current system status of the IQ2000. These system status requests can include (1) motor command system, i.e., IQ2000, status; ready, run, trip or alarm condition, (2) motor contactors status; slow, fast or reverse, or (3) specific product and division codes related to the individual IQ2000 being addressed.

In accordance with an important aspect of the disclosed system, transmission of serial data over the RS232C conductors from the external master 40 to the MEI card 30 employs only a limited number of ASCII standard code characters to minimize errors in transmission. Using this limited ASCII protocol, data, information and command characters are transmitted within "messages". Thus, as shown in FIG. 21, each ASCII message is made up of 10 bytes. If the transmitted intelligence requires fewer than 10 bytes, zeros are used to fill out the unused bytes. Also, as discussed generally heretofore, a maximum of eleven messages can be sent to or from a single buffer at a given time. In conformity with the INCOM network protocol shown generally in FIGS. 9 and 10 and described in detail in the above-identified copending Verbanets application Ser. No. 625,747, these messages are of two basic types. The first type is a control message, such as shown in FIG. 21(a), which contains the command characters that initiate functions such as accessing and returning specific Data Table information from an IQ2000. These control messages are sent by the external master 40, although in one instance the MEI card 30A or 30B associated with an IQ2000 generates a command acknowledge message, which may be considered a control message. The second type of message is a data message, such as shown in FIG. 21(b), which generally contains the current operating information or system status data. These data messages are generated by the MEI cards 30A or 30B associated with an IQ2000.

As shown in FIGS. 21A and B, the first byte of each message type is dedicated to the common ASCII communication control character STX. Certain of the remaining nine bytes of each message may contain either the requested operating information and/or system status data or, alternately, they may define the type of control message being transmitted. As shown in FIG. 22(c), each of the ten bytes of a single message contains one start bit, seven ASCII encoded bits, one parity bit, and two stop bits. As shown in FIG. 22(a), the lower nibble (bits 0 through 3) of the ASCII encoded bits contains either the transmitted data from the IQ2000, or the command characters from the external master 40. Bits 4 through 6 of the upper nibble are added to encode the actual binary states of bits 0 through 3 into the ASCII 8 bit code. Thus the data which is intended to be transmitted as shown in FIG. 22(a), which is the equivalent of 5H, is encoded into ASCII with a parity bit add-on, as shown in FIG. 22(b) which is the equivalent of 35H.

TABLE VII

ASCII ENCODING CHART

| Data Nibble (Bits 0 thru 3) | | ASCII Encoded Data (Bits 0 thru 7) | |
|---|---|---|---|
| Hex | Binary | Hex | Binary |
| 00 | 0000 | 30 | 0011 0000 |
| 01 | 0001 | 31 | 0011 0001 |
| 02 | 0010 | 32 | 0011 0010 |
| 03 | 0011 | 33 | 0011 0011 |
| 04 | 0100 | 34 | 0011 0100 |
| 05 | 0101 | 35 | 0011 0101 |
| 06 | 0110 | 36 | 0011 0110 |
| 07 | 0111 | 37 | 0011 0111 |
| 08 | 1000 | 38 | 0011 1000 |
| 09 | 1001 | 39 | 0011 1001 |
| 0A | 1010 | 41 | 0100 1010 |
| 0B | 1011 | 42 | 0100 1011 |
| 0C | 1100 | 43 | 0100 1100 |
| 0D | 1101 | 44 | 0100 1101 |
| 0E | 1110 | 45 | 0100 1110 |
| 0F | 1111 | 46 | 0100 1111 |

Table VII shows a complete ASCII conversion chart for the 4 available data or control bits employed in each byte of the 10 byte message. In this Table, the columns headed Hex are included only to identify the bit patterns more easily and in the columns headed Binary, the least significant bit is on the right. From Table VII it can be seen that the lower 4 bits of the encoded ASCII are identical to the unencoded bits. For example, 0001 is encoded as 0011 0001. The single exception to the ASCII encoding chart of Table VII is the byte format for the STX control character. As stated heretofore, the first byte of each 10 byte message must contain the ASCII control communication character STX and this byte uses the ASCII encoded bits 0000 0010 the hexadecimal equivalent of which is 02H.

Before transmissions can be correctly sent from the master device 40, they must have been encoded by a program to accomplish this ASCII encoding conversion. Master devices, such as the master device 40 capable of generating ASCII characters obviously transmit correctly encoded characters. In the following description any given character or part of a message will be noted in a single hexadecimal alpha-numeric if it is either data or command characters, as in bits 0 through 3, for example, 5H in FIG. 22(a) or will be noted in a 2 digit hexadecimal alpha-numeric when involving an actual transmission. This is the equivalent of the ASCII coded simple binary data, for example 35H in FIG. 22(b). While hexadecimal notation is used in the present description, the actual transmissions are in binary 1's and 0's as shown in FIG. 22(d), hexadecimal being used only as a convenience for reference to long binary groups in the present description. Thus, in FIG. 22(c) the external master 40 encodes binary 0101 (5H) into the equivalent ASCII 35H. It also adds a start bit, a parity bit (always zero), and two stop bits to complete the message byte. At this time, transmission of 35H can occur. In this connection, it will be noted that the least significant bit and/or the lower nibble are always transmitted first, as shown in FIGS. 22(c) and (d).

Regardless of whether a message is a control message or a data message, all messages are structured in 10 byte units. Byte 1 always contains the STX character and each message always ends with two check sum bytes CS0 and CS1 as shown in FIG. 21. Referring first to the typical and simplified control message format shown in FIG. 21(a), it should be pointed out that the letters used in the individual bytes of this message, such as C, IC, CM, and so forth, are mnemonics only and are not programmed or received. Byte 1 of this control message is always the ASCII communication control character STX (02H). If the STX character is received by the MEI card 30 at any time after the first byte of a message, the reception of that message is aborted and the new STX begins a new message.

With regard to byte 2 of the control message shown in FIG. 21(a) one of two distinct coded characters is contained in this byte of a control message depending upon whether it originates in the master device 40 or the addressed IQ2000. When the control message originates in a master device, this byte is always ASCII 1 (31H). If the control message originates in the IQ2000, this byte will be ASCII 2 (32H) if no BCH error is detected, or ASCII 3 (33H) if a BCH error is detected. Byte 3 of the control message shown in FIG. 21(a) must always be ASCII 3 (33H) when communicating with an IQ2000 over the INCOM network line 34. This ASCII encoded character corresponds to the INCOM network instruction to set up an expanded mode interface between the INCOM chip 36 in one of the MEI cards 30A, 30B and the associated multi-purpose microcontroller 38 of this MEI card. Even when communicating directly between an RS232C compatible device and a single IQ2000 connected to an MEI card, this byte 3 must be programmed 33H. If any code other an ASCII 3 is contained in this byte the MEI card ignores the message.

Bytes 4 and 5 of the control message are the command and subcommand bytes, respectively, which together define the specific content of the control message. Tables I, II and III describe the various types of commands and subcommands used in a control message.

Bytes 6, 7 and 8 of each control message list the unique INCOM address of each MEI card associated with one of the IQ2000s. More particularly, the address select switches 62 on this MEI card are set to correspond to a specific INCOM address. The range of addresses may be from 001H to FFEH. 001H and FFFH are not assigned to an IQ2000 MEI card. An address of 21AH would be transmitted as AH, 1H, 2H, for bytes 6, 7 and 8, respectively. When encoded the actual ASCII II characters would be 41H, 31H and 32H. When an RS232 device is communicating directly with an IQ2000 independently of the INCOM network, the address FFFH is used by the master.

Bytes 9 and 10 of the control message are the low and high check sum "nibbles". Bits 0 through 3 of these bytes contain the nibbles which together form the check sum. This check sum is the two's complement of the sum of bits 0 through 3 of the first eight bytes of the message. For example, in the specific control message shown in FIG. 23, wherein the command and subcommand bytes are 38H and 33H, respectively and the INCOM address is 30H, 30H, 36H, the binary equivalents of bits 0 through 3 of the first eights bytes of the control message shown in FIG. 23 are added together for a total of 10111b or 17H. The check sum is the two's complement of 10111, which when added to 10111, equals 0 and a carry. The actual transmission of the check sum is 39H and 45H for bytes 9 and 10, respectively, where 39H is the low byte; bits 0 through 3 equal 1001 (9H), transmitted as ASCII II 9 (39H) and 45H is the high byte; 0 through 3 equals 1110 (EH) transmitted as ASCII II E (45H).

As discussed generally heretofore, a data message usually originates in one of the MEI cards 40A, 40B associated with an IQ20000. A typical simplified data message format is shown in FIG. 21(b), the letter D and the word "data" used in this figure being mnemonic and are not the characters programmed or received. Thus, the mnemonic D in byte 2 indicates that this is a data type message. In actual programming, when a data message originates in an MEI card associated with an IQ2000, byte 2 contains ASCII 2 (32H) if no BCH error is detected in transmission over the INCOM network. If a BCH error is detected, byte 2 contains an ASCII 3 (33H).

Bytes 3 to 8 of the data message shown in FIG. 21(b) contain the transmitted data. Thus, each message contains six nibbles (3 bytes) of data which may be loaded into the serial shift register of the INCOM chip 36 on the MEI card 30, for example. In this connection, it will be recalled that only bits 0 through 3 of each byte are data, bits 4 through 7 being the add-on ASCII II encoding and parity bits, as shown in FIG. 22(b). Bytes 9 and 10 of the data message are check sum bytes and are derived as described in detail heretofore in connection with FIG. 21(a).

Although most data messages are generated by the IQ2000 communication's hardware, a data message may, if desired, originate at the external master 40. FIG. 21(c) shows a data message of this type. In this figure, the letters D and TD are mnemonics only. When a data message originates in a master device, byte 2 contains ASCII II 0 (30H). Bytes 3 and 4 of the first message only define the type of data being transmitted. Subsequent bytes, shown shaded in FIG. 21(c), may contain any desired data. Messages after the first data message from the external master 40, follow the byte format shown in FIG. 21(b).

An acknowledge character indicates whether or not the syntax of the last message received from the external master 40 was correct. This character is only generated by the IQ2000 communication hardware. If the syntax of the message received is incorrect, a negative acknowledge character is returned to the master device. The characters transmitted are standard ASCII II coded characters, i.e., acknowledge-ASCII II ACK (06H) or negative acknowledge-ASCII II NAK (15H).

In accordance with a further aspect of the disclosed system, an echoing function is enabled and disabled by the external master 40 the purpose of which is to assure that a character transmitted from the external master 40 is correctly received by the MEI card 30. This assurance comes about by causing the MEI card 30 to retransmit or echo to the external master 40 identical or similar characters to those received from the master. Single characters can be sent directly from an ASCII II coded keyboard device as the external master 40, but these must be included within the message formats shown in FIG. 21. In such a case, when an illegal message format is sent to the MEI card 30, this card would also generate a NAK character. Enabling and disabling of the echo function is accomplished by the ASCII II control characters DC2 (12H) and DC4 (14H), respectively. After the function is enabled or disabled, the alpha character A (41H) or N (4EH) is generated by the MEI card 32 to indicate that the control character was or was not properly received. Thus, in using the echo function, the master device transmits a DC2 control character to enable the echo function. The MEI card 30 generates the alpha character A to indicate an acknowledgement of the command. Had the command not been accepted, the alpha character N would be sent back to the master device.

In accordance with a further aspect of the disclosed system, the ASCII II characters CR (carriage return) and LF (line feed) are echoed back to the external master 40. This echoing may cause double spacing on the master device's display. Lower case alpha characters a through f are echoed back as corresponding upper case characters. Illegal ASCII II characters are echoed back although they cause a syntax error. This in turn causes the control character NAK to be generated by the MEI card 30. The DEL (7FH) control character, sometimes called RUB, and BS (08H) character both perform the same function, i.e., to erase the last character received. DEL/RUB is, however, echoed back to the master device 40 as BS. This control character frequently moves the cursor one space to the left on terminals. These two control characters are included primarily for debugging of communications when a dumb terminal is being used as the external master 40.

In accordance with a further aspect of the disclosed system, the MEI card 30 generates XOF (transmit off) and XON (transmit on) characters to signal that this unit is busy processing a previously received message or that it is free to accept a new message. The ASCII control character DC3 (13H) is used for XOF and the character DC1 (11H) is used for XON. If the master device 40 begins to transmit a new message, the MEI card 30, when busy with a previously received message, generates an XOF character after two characters of the new message are received. The MEI card 30 completes the in-progress processing and then generates an XON character. The master can then retransmit the new message. It should be noted that DC1 (XON) is generated only if a DC3 (XOF) character had been sent earlier. Also, the MEI card 30, if it receives these characters from a master, interprets them as bad characters.

Although the DEL/RUB (7FH) and BS (08H) control characters are not usually included in messages sent from the master device, they may, at times be so included. These characters are considered by the MEI card 30 as being legal, and will cause a BACK UP/ERASE function even when the echo function is disabled.

Certain of the control and format effecter characters need to be qualified with respect to the effect they have on the byte count of each ten-byte message. Illegal or bad characters will be counted in the total message's byte count and will cause a syntax error to be detected and a NAK to be generated. However, the format effecter or control characters CR (0DH), LF (0AH), DC2 (12H) and DC4 (14H) are not counted in the message's byte count or check sum calculations. The control characters DEL/RUB (7FH) and BS (08H) are not counted in the messages byte count. Also, when these characters are used, they subtract the last byte from the count.

A listing of the limited ASCII II protocol which can be transmitted to or generated by the MEI card 30 is shown in FIG. 24. In this figure an X located in the column heading VALID TRANS. means that the associated character is valid for transmission from the MEI card 30 to the master device 40. An X located in the column heading VALID RECV. means that the associated ASCII II character is valid for reception by the MEI card 30 from the master device 40. In the column heading KEYBOARD GENER. a description is given of how to manually generate the various ASCII II characters from a dumb terminal or ASCII II coded keyboard. To generate a control character from a keyboard, the control (Ctrl) key is pressed and held and then the desired alpha character is pressed before releasing both keys.

FIGS. 25-32, inclusive, are tables showing a number of specific examples of transmissions which take place between the MEI card 30 and the external master 40 in accordance with the limited ASCII II protocol of the disclosed system. In these examples the sequential events of each transmission are given in table form wherein each message is divided into its ten-byte components. Each transmission "event" is made up of two lines where the first line contains the STX control character, the message type specifier, the data being transmitted (in the case of a data message) or the command and subcommands and address (in the case of a control message) and two check sum characters. The second line contains the actual transmission. In the case of the STX or ACK characters, this is simply the hexadecimal equivalent of the binary control character. In the case of other characters, the second line shows the hexadecimal form of the encoded ASCII II characters which will be transmitted, although the suffix H is not shown for simplicity. The acknowledge character (ACK) is a single character transmission shown in the far left column in these figures.

In FIG. 25 an example of the transfer of the complete fourth buffer (address 3H) of an IQ2000's Data Table to the external master 40 is given. Thus, referring to this figure, event number 1 is the request by the external master 40 that the fourth buffer (address 3H) of the IQ2000 associated with the MEI card set to address 023H be transmitted to the holding buffers of this MEI card. Event number 2 is the acknowledge character sent by the MEI card 30 to the master device 40 indicating that the syntax of the last message was correct. Even number 3 is the command acknowledge message sent to the master device 40 from the MEI card of the IQ2000 polled, 023H in this example. Event number 4 is a request by the master device 40 that the latest complete buffer in the MEI card set to address 023H be sent from this MEI card over the INCOM network and through the MEI card 30 to the master device 40. Event number 5 is the acknowledge character sent by the MEI card 30 to the master device 40 indicating that the syntax of the last message was correct. Event number 6 is the first data message corresponding to the first buffer segment of the fourth buffer of the IQ2000's data table after it has been stored in the active holding buffer of the associated MEI card. Data nibbles are shown with the byte number, L designating the low nibble and H the high nibble. Thus in this first of the eleven data messages, byte 0, 1 and 2 are listed above the data nibbles. Events 7 through 16 are the second through eleventh data messages needed to transmit the entire fourth buffer requested. Event 17 is the command acknowledge message sent to the master device 40 from the MEI card associated with the IQ2000 polled, indicating that transmission of data is complete.

In FIG. 26 an example of the transfer of a single buffer segment having buffer segment address 6H from the fourth buffer (address 3H) of the IQ2000's Data Table to the master device 40 is given. Referring to this figure, event number 1 is a request by the master device 40 that the fourth buffer (address 3H) be transmitted to the MEI card associated with an IQ2000 having address 009H. Events 2 and 3 are similar to that described in detail heretofore in connection with FIG. 25. In event number 4, the master device requests buffer segment 6H from the MEI card with address 009H. This segment may, for example, contain ground current and one byte of the winding temperature data. Event number 5 is similar to that described heretofore in connection with FIG. 25. Event number 6 is the data message containing buffer segment 6H. In this example the data byte numbers 18, 19 and 20 are listed above the typical data. Event number 7 is similar to that described in detail heretofore in connection with FIG. 25.

In FIG. 27 an example of the transfer of more than one buffer segment of the IQ2000's Data Table to the master device 40 is given. Referring to this figure, event number 1 is a request by the master device 40 that the fifth buffer (4H) be transferred to the holding buffer of the MEI card set to address 124H. Events 2 and 3 are similar to that described in detail heretofore in connection with FIG. 25. Event number 4 is a request by the master device 40 that buffer segments of the fifth buffer (4H) up to and including buffer segment 1 (these are segments 0 and 1) be sent from the MEI card set to address 124H over the INCOM network and through the MEI card 30 to the master device 40. Event number 5 is similar to that described heretofore. Event number 6 is the first message of the two messages sent and contains buffer byte number 0, 1 and 2. Event number 7 is the second data message and contains buffer bytes 3, 4 and 5 whereupon buffer segments 0 and 1 have been transferred. Event 8 is similar to that described heretofore.

In FIG. 28 an example of the request by the master 40 for the run/trip/alarm status of the addressed IQ2000 which is transmitted within a control message. Referring to this figure, event number 1 is a request by the master device 40 for the status of the IQ2000 associated with the MEI card set to address 4A2H. Event number 2 is the acknowledge character sent to the master device 40 by the MEI card 30 to indicate the syntax of the last message is correct. Event number 3 is the status bit message sent from the MEI card having address 4A2H over the INCOM network and through the MEI card 30 to the master device 40 where the status bits ST may be as follows:

00=motor ready, not running
01=motor running
10=trip condition
11=alarm condition.

The 2H(10b) shown in the example in event 3 indicates a trip condition.

In FIG. 29 an example is given of the transmission events when the master requests the status of the MEI card associated with the polled IQ2000. Thus, referring to this figure, event number 1 is a request by the master device 40 for the status of the MEI card set to address 354H. Event number 2 is the acknowledge character sent by the MEI card 30 indicating the syntax of the last message was correct. Event number 3 is the MEI card status message sent by the MEI card set to address 354. This message will have command and subcommand bytes (C and SC) as set forth in Table IA described in detail heretofore. Event number 4 is the command acknowledge message sent by the MEI card at address 354 indicating that the transmission of the MEI card status is complete.

In FIG. 30 an example of a request from the master device 40 to reset a particular MEI card associated with one of the IQ2000s on the INCOM line 34 is given. Referring to this figure, event number 1 is a request by the master device 40 to reset the MEI card which is set to address 026H. Event number 2 is the acknowledge character sent by the MEI card 30 to indicate the syntax of the last message was correct. Event number 3 is the command acknowledge message sent by the MEI card having address 026H indicating that the reset command has been accepted.

In FIG. 31 an example is given of a request by the master device 40 to reset a particular IQ2000 with direct product acknowledgement. Referring to this figure, event number 1 is a command by the external master 40 to reset the IQ2000 and initiate a response from the MEI card after this MEI card (30A or 30B) has received a response from the IQ2000 polled, address A12H in this example. Event number 2 is the acknowledge character sent by the MEI card 30 to indicate the syntax of the last message was correct. Event number 3 is the direct response message from the IQ2000 associated with the MEI card set to address A12H which indicates that the IQ2000 has been reset.

In FIG. 32 an example is given of a request by the master 40 to reset an IQ2000 with response only from the MEI card 30A or 30B acknowledging that this MEI card has passed the message on to the product. Referring to this figure, event number 1 is a request by the master 40 to reset the IQ2000 associated with the MEI card having the address 124H and to initiate an immediate response from this MEI card. Event number 2 is the acknowledge character sent by the MEI card 30 indicating the syntax of the last message was correct. Event 3 is the command acknowledge message sent from the MEI card polled by way of the MEI card 30 to the master device 40 indicating that the reset command was received.

MEI CARD SOFTWARE PROGRAMS

As discussed generally heretofore, the microcontroller 38 in the MEI card 30 is programmed in accordance with the software programs given in the attached Appendix. Considering very generally, the INCOM slave-to-parallel product (INCOM/product, or slave/product) software module on pages A-1 to A-31 of the attached listing includes testing of the status of the master*/slave port P2.7 and the slave PAR*/serial port P3.7 during the initialization phase thereof to determine in which configuration the MEI card 30 is to operate. Furthermore, this software module has the proper jumps for going to the other modules i.e., the master RS232C-to-parallel product module (master/product, or M/P) on pages A-32 to A-60 and the master RS232C-to-INCOM network module (master/INCOM, or master/serial, M/S) on pages A-61 to A-71. In general, these last two modules put data in the registers of the INCOM/product module rather than calling up routines from this module.

INCOM/Product Configuration

Considering first the INCOM/product configuration, FIGS. 33-49 are flow charts illustrating the logic flow in the portion of the INCOM/product configuration on pages A-11 to A-31. Pages A-1 to A-10 of the attached listing give the external jumps for other configuration code, external flag, register and RAM definitions, and MEI status definitions, port locations, product protocol definitions and INCOM bus protocol definitions.

Referring to FIGS. 33-49, all interrupts are disabled during logic flow from the point labelled "!D" to the point labelled "!E". Also, since there are two product buffers in the microcontroller 38 which are alternately updated from the selected buffer of the controlled product 44, an asterisk is used in these figures to indicate the same flow using different buffer number flags. Also of importance in these figures is the correlation of various points in each flow chart with the label terminology used in the listing of the attached Appendix. For example, the label INIT-MASTER-SERIAL-SET UP shown in FIG. 33 corresponds to the instruction given on page A-11 of the Appendix and permits a correlation of the comments given in the listing with the flow of logic at this point in the initialization flow chart shown in FIG. 33. In FIGS. 33-49 the following abbreviations are used:

SRUN - Slave Run Loop
SPAR - Slave Parallel Interface to Product
SPIN - Slave Parallel Input from Product
SPOT - Slave Parallel Output to Product
PCMD - Product Command
PROD - Product
CMD - Command
CONT - Control
DAT - Data
PTR - Pointer
INCR - Increment
STR - Strobe
INT - Interrupt
CNT - Counter
ADR - Address
REC - Receive
MESS - Message
ICMD - Command from INCOM master
DECR - Decrement
ANO - Another
IC - INCOM As discussed generally heretofore, the two product buffers are used by two configurations, the INCOM/-product configuration and the master/product configuration. In the INCOM/product configuration, each buffer is 48 bytes long, and is capable of holding 16 INCOM formatted messages. For the master/product configuration, each buffer is reduced to 36 bytes (12 messages). Only data messages are stored in these buffers. Normally these product buffers are both dedicated to use by the product to fill them with the particular product buffer number. Three status flags for each buffer designate which buffer has valid information and who has control of it. When a command designates it is sending data messages to a product, one of the buffers is relinquished from control by the product. Either the INCOM or the RS232C port then fills this buffer for later transmittal to the product. After the message block has been sent on to the product, control is again passed back to the product. At no time can either the INCOM or RS232C port software have control of more than one of the product buffers. Pointers define where valid information is located within the product buffer, combined with the status flags. Each buffer is contiguous except for its first byte. The two buffers are stored end-to-end and occupy the high value memory locations of internal RAM of the microcontroller 38.

The initialization routines shown in FIGS. 33-35 are used for all three configurations of the MEI card 30. FIG. 33 INIT-START is the initialization routine used for setting the hardware, serial ports, initializing the INCOM chip 36, and checking the master/slave and parallel/serial setting of the ports P2.7 and P3.7. These initialization routines are used at start-up or when the deadman circuit times out. The initialization routine also jumps at INIT-MASTER-LJMP (FIG. 33) to the initialization routines used during master configurations of the MEI card 30 and returns at INIT-MASTER-SPAR-RET on FIG. 34.

FIG. 36 is a flow chart of the SRUN-LOOP routine which is used for all configurations. Before the microcontroller 36 strobes the deadman, the program checks the registers in ROM and adds the numbers stored therein. The sum of these numbers should equal the number in the last ROM location. If it does not, the microcontroller 38 shuts off and resets the MEI card. If the deadman times out in the middle of a sequence, the MEI card 30 starts a new sequence with initialization. FIG. 36 includes the point at which the MASTER-RUN-LOOP of the master configurations is selected and goes to the external master routines, as will be described in more detail hereinafter.

FIGS. 37-40 comprise flow charts of that portion of the slave run loop in which an input from the product to the MEI card is being received, as described heretofore in connection with FIGS. 15 and 16. Specifically, FIGS. 37 and 38 show the handling of data messages from the controlled product 44 to the MEI card 30. This routine, SRUN-SPAR, includes the soft INCOM interrupt routine IC-INT-SLAVE shown in FIGS. 44-46, at the point SOFT-INCOM-INT of FIG. 38, if a direct response command is received.

FIGS. 39 and 40 show the handling of a control message from the product 44 to the MEI card 30. This routine, SPIN-CONT, includes the INCOM interrupt routine IC-INT-SLAVE shown in FIGS. 44-46, at the point SOFT-INCOM-INT of FIG. 40, if a direct response command, such as the RPFR and RPDR commands discussed in detail heretofore, is received from the INCOM master.

FIG. 41 is a flow chart (SPOT) of that portion of the slave run loop in which an output to the product (either a command or a data message) is being sent by the MEI card 30. This routine includes the PROD-ACK-SLAVE interrupt routine shown on FIGS. 42 and 43 if the output strobe and output ACK of the MEI card are both inactive, as shown by the SOFT-PROD-ACK-INT point in the flow chart of FIG. 41. The SPOT routine also includes the INCOM interrupt routine, IC-INT-SLAVE shown in FIGS. 44-46 as shown by the SOFT-INCOM-INT point in the flow chart of FIG. 41, if a direct response command is received.

The PROD-ACK-SLAVE interrupt routine of FIGS. 42 and 43 is the routine by means of which all processing is done to give to the product the information the MEI card 30 is passing on to it from the INCOM network. This routine also includes the INCOM interrupt routine IC-INT-SLAVE, as shown by the SOFT-INCOM-INT point in FIG. 43, if a direct response command is received.

The INCOM interrupt routine shown in FIGS. 44-46 may be either hardware initiated by the INCOM chip 36, or software initiated in response to a direct response command from the INCOM master. If the hardware interrupt is a receive interrupt from the INCOM chip 36 on its INT line, the message stored in the serial shift register of the chip 36 is read out and put in the INCOM buffer of the MEI card, as shown in FIG. 44. If the hardware interrupt is a transmit interrupt from the chip 36, i.e., a logic 0 on the DATA line of the chip 36 indicating completion of a transmission to the network by the chip 36, the next message intended for the INCOM chip 36 is stored in its serial shift register, as shown in FIG. 45. If the interrupt is software initiated, the required direct response is sent to the INCOM chip 36, as shown in FIG. 46.

The flow charts of FIGS. 47-49 are an extension of the INCOM receive interrupt routine of FIG. 44 and show the logic flow in decoding a control (command) message from the INCOM master. Specifically, FIGS. 47 and 48 decode the SSBS, SUBS, RPBN, RPFC, RPFR, RPDM, and RPDR commands discussed in detail heretofore in connection with Tables I and II. FIG. 49 decodes the SSAT command discussed in detail heretofore in connection with Table I.

Master/Product Configuration

As discussed generally heretofore, when the master/slave* jumper W4 is open, the serial master card 42 is connected to the J2 connector, and a parallel product 44 is connected to the J3 connector, the MEI card is configured to operate in a master/product mode in which the external master 40 communicates directly with only one controlled parallel product independently of the INCOM network. It should be noted that in this configuration the hardware components including the coupling circuit 32 and the INCOM chip 36 are not required for the unused INCOM port of the MEI card 30 and hence may be eliminated from the MEI card if it is to be used solely for this configuration.

In the master/product configuration, a command message from the external master 40 is fully processed before commencing a new message. Ten byte messages are received and converted into an INCOM format and processed. Once the INCOM message has been interpreted, the buffer containing the message is released, allowing additional data to be received. If more than two bytes of data are received by the MEI card via the RS232C serial port before this INCOM buffer is released, a CTRL-S [XOFF] is sent back to the external master 40. If an XOFF had been sent, when the INCOM buffer is released, a CTRL-Q [XON] is sent by the MEI card signifying that it can accept another ten byte message. If the external master 40 had sent more than one byte of this new message after receiving an XOFF, these additional bytes will have been lost, and a complete ten byte message should be restarted.

In the case where the external master 40 is sending messages to the MEI card 30, some verification is performed on the incoming data stream. Format verification begins after the start or restart character, CTRL-B or [STX]. Items checked for formatting include (a) the correct check sum computed by bytes 9 and 10, (b) proper message type, i.e., byte No. 2 must contain a "0" (data) or a "1" (command), and (c) no unexpected ASCII II characters are received within a message stream.

The master/product configuration of the MEI card 30 can be broken into two parts, i.e., the master RS232C port and the product port. This configuration has incorporated the product port interface of the INCOM slave/product configuration shown in FIGS. 33 to 49 and in the listing pages A-1-A-31 of the attached Appendix. Hooks are identified and used to tie this master/product configuration into the product port software of the INCOM slave/product configuration.

Within the master port software are: (a) an initialization routine, (b) seven functional blocks that are polled, (c) two subroutines, and (d) the RS232C receive/transmit interrupt routine. Flags within the seven functional blocks control the order in which information is transferred and processed inside the MEI card 30. The seven functions developed perform all necessary tasks to process a ten byte incoming message, decipher it, and pass it out to the product interface software if necessary. These routines include two receive and five transmit functions, as follows:

1. POLL-RCV-INT: This routine polls the receive interrupt buffer for information and passes/decodes it into a three byte INCOM formatted message. Formatting checks of the incoming data are also performed.

2. POLL-RCV-MSG: This routine interprets the message in the INCOM formatted buffer and processes the command directly or passes it on to the product interface software as necessary, setting appropriate flags and conditions.

3. POLL-TX-DAT: This routine passes data messages as requested, from an MEI product buffer (there are two) to the output INCOM buffer for transmission to the external master 40. Only one data message is sent per poll and only if the INCOM buffer is available.

4. POLL-TX-INT: If the output INCOM buffer has a message to send, this routine will reformat and move the message to the transmit interrupt buffer and request its transmission.

5. POLL-TX-PROD: This routine processes a direct product response that product software has generated. This information in the product response is formatted into the output INCOM buffer for transmission to the external master 40.

6. TX-FMT-MSG: The first response (in addition to echoing) that the MEI card 30 sends to the master 40 after receipt of a complete ten byte message is the format response. This routine performs this task, sending either an (ACK) or (NAK) in addition to other information if echoing is enabled. The criteria for correct format includes data/command byte correct, no unexpected ASCII II characters, and proper checks on receipt.

7. TX-CAEF-MSG: This routine supplies the external master 40 with the additional validity information that has been accumulated during the processing of a message. It also supplies various conditions within the MEI card 30 and the product interface. Additionally, it may represent the end of a request or sequence of events to the master (a high level handshake response).

The INITIALIZE:routine reads/sets the baud rate and also sets the appropriate configuration parameters for the master RS232/product software to work correctly. Two subroutines are used in multiple places in the master/product module. These are:

1. CHK-QUEUE: This subroutine checks the product queue for an INCOM formatted message to be entered and passes it on to the product interface software for processing.

2. GET-BUFF: This subroutine checks the two product buffers for access. If it can, this subroutine takes control of a valid buffer for use by the master RS232 software. Note that the master can only control one buffer at any given time.

The interrupt routine, % RITI:, processes both receiver and transmitter interrupts. Control of receiver buffer overflow is controlled by hardware via the RTS/CTS and by software via (XOFF/XON).

Considering first the master/product configuration from a very general standpoint, as an interface between the ports of the MEI card 30 and the different MEI card configurations, a neutral format almost identical to an INCOM message on the network 34 has been developed and is used internally in the MEI software. This format is used in both the master/INCOM and master/product configurations and is the main interface to pass information bidirectionally to/from the RS232C port and its software. There is a separate 3 byte buffer for each direction of data flow (RCV-MSG-BUF for received messages, and TX-MSG-BUF for transmissions). Additionally, each buffer has a message type bit flag (RCV-MSG-FLG and TX-MSG-FLG) to designate the information as a data (=0), or command (=1) message. The TX-MSG-BUF has one additional bit flag, the BCH-FLG. This flag represents a bit calculated by the INCOM chip 36 for a message received from the INCOM network. In the master/product configuration, this bit is always cleared (=0).

The RCV-MSG-BUF is filled by the POLL-RCVMSG routine discussed above. This routine obtains its data from the RS232C receive interrupt buffer. Three different polling routines extract and process information from this buffer.

The TX-MSG-BUF is emptied by the POLL-TX-INT routine discussed above. This routine reformats and moves the message in the buffer to the RS232C transmit interrupt buffer where it is later sent out on the RS232C port. Many routines place INCOM formatted messages into this buffer for transmission to the RS232C master 40.

RS232C Transmit Interrupt Buffer

Most of the data sent to the RS232 master port is stored temporarily in the transmit interrupt buffer, TX-INT-BUF, before it is processed by the interrupt routine % RITI-INT. The transmit interrupt buffer is 8 bytes in length and has two parts with distinctively different characteristics. The first part of this buffer is 5 bytes in length and holds only hexadecimal nibble information. Data stored in this area represents a compressed code version of the 10 byte message format sent to the master 40. Each nibble of such a message has a hexadecimal value which when transmitted, is converted into an ASCII II character representing the digit. The second part of the buffer (3 bytes) contains any ASCII II character desired to be sent to the master 40. This part of the buffer is used for sending the format responses. If the format verification discussed above shows a good message from the master 40, the format response message is [ACK] if echoing is off, or [ACK]'A'[CR][LF] if echoing is on. If the format verification indicates a bad message from the master 40, the format response message if [NAK] if echoing is off or [NAK]'N'[CR][LF] if echoing is on.

Two pieces of information control the status of the transmit interrupt buffer, TX-PTR, a byte variable, and NIB-FLG, a bit variable. TX-PTR contains two pointers, each stored as nibbles, PTR-END and PTR-NXT. PTR-NXT is in the upper nibble and PTR-END occupies the lower nibble. The transmit interrupt buffer does not operate as a ring buffer.

PTR-END designates the ending position where data is located within the buffer pending transmission. It is updated as data is loaded into the TX-INT-BUF by the routine POLL-TX-INT. PTR-NXT points to the location where data is being removed for transmission to the RS232C port. Itr is updated as data is removed and sometimes when data is loaded into the second part of this buffer.

The NIB-FLG is a bit that determines the nibble to be processed for the byte pointed to by PTR-NXT. When NIB-FLG=0, the lower nibble is being pointed to, whereas when it is 1, it points to the upper nibble. The NIB-FLG is only used with the first part of the transmit interrupt buffer.

Data exists in the transmit interrupt buffer when the two pointers are unequal. When equal, all data has been sent, and they are reset to 0 designating an empty buffer.

Data can be entered into the second part of the transmit interrupt buffer when there is information in the first part. When this happens, only PTR-END is updated. If no data is in the first part of the buffer, PTR-END is updated, and so is PTR-NXT (to a value of 5). No data can be put into the first buffer unless TX-PTR=0.

The conditions when information which is not in the transmit interrupt buffer is sent include two cases, (a) transmittal of XON/XOFF characters, and (b) the transmittal of a [CR] [LF] for any [CR] in the buffer.

RS232C Receive Interrupt Buffer

The RS232C input interrupt buffer, RCV-INT-BUF is a 4 byte ring buffer. This buffer stores characters as received under control of the buffer status variable, RCV-PTR. Because of the coding, a maximum of three bytes can be in the receive interrupt buffer at any given point in time. This eliminates the ambiguous condition of a full or empty buffer when the points PTR-IN and PTR-OUT, are equal.

RCV-PTR contains two pointers as nibble quantities; PTR-IN in the lower nibble, and PTR-OUT in the high nibble. PTR-IN points to the last character received from the RS232C port. PTR-OUT points to the last character removed by the POLL-RCV-INT routine. When these two nibble quantities are equal, there is no data in the receive interrupt buffer to process.

To prevent buffer overflow, both hardware and software start-stop control is employed. Hardware control pulls the MEI card RTS line high whenever there is a single character in this buffer and the RCV-MSG-BUF is full. This should stop transmission if the RS232 master 40 interprets this line. If not, software control sends an [XOFF] when there are two characters in the buffer. If neither method is incorporated for control by the master, overflow occurs whenever more than 3 bytes are attempted to be stored in this buffer and the RCV-MSG-BUF is full. Even if neither method is incorporated, such overflow should not normally occur, unless the RS232 baud rate is higher than that of the INCOM network 34 and multiple messages are sent by the master 40 without pauses. To alleviate such overflow, the master should pause a sufficient time between transmission of messages, allowing them to be processed by the MEI card 30.

The block diagrams shown in FIGS. 50 to 59, inclusive, are employed as a general overview to describe the interaction of the external master 40 and the MEI card 30 over the RS232C link. FIG. 50 is an overview showing how a message received by the MEI card 30 is processed before it is separated into a command or data message. It is assumed that a ten byte message has been received starting with an (STX). In this figure, the decision block "valid formatted message" includes the format verification discussed in detail heretofore.

Once a command message is received, a complete sequence of events to process it to its conclusion is performed before another command will be interpreted. Reception of a command message before the last data message of a stream is expected will clear out event information and that previous command will be ignored along with the data messages.

Once a validly formatted message has been received it is passed on for further processing as shown generally in FIG. 51. In this figure the commands processed by the left branch include RPDM and RPDR. The commands processed by the right branch of this figure include SSAT, SSBS, SUBS, RPBN, RPFC and RPFR. Only the processing of the respective command is necessary after FIG. 51 has been traversed, i.e., those blocks specified by an asterisk. Various operations are performed for a given command and each response is different.

FIGS. 52 to 59, inclusive, show generally the sequence of events associated with the previously described set of valid commands. In these figures the command field bits are given within parentheses and the subcommand field bits are given within brackets. More particularly, in FIG. 52(a) the response to an SSAT [2 bit status] command is given. In FIG. 52(b) the response to the SSAT [division code/status] command is given. In FIG. 52(c) the response to an SSAT [full buffer] command is given. In FIG. 52(d) the response to an SSAT [processor status] command is given. In the response to this command three bytes of data are sent; i.e., hardware revision number, software revision number, and status. Some status information is cleared and not available after this command, i.e., the bits designated by an asterisk in Table IA and in the following description of the master/INCOM configuration. The hardware and software revision numbers do not change, although the status byte obviously will. FIG. 52(e) gives the response to an SSAT [reset] command. During the time out for MEI card to reset, the MEI card 30 will not accept any new information from any port. Reset also clears the status/error information that is associated with an SSAT [processor status] command. Byte three of the data message sent back to the external master 40 represents different information depending upon which configuration is being used.

In FIG. 53 the response to an SSBS [send data segment #n] command is given. In FIG. 54 the events performed in response to a SUBS [send data segments 0-#n command] are given. In FIG. 55 the sequence of events in response to an RPBN [receive product buffer #] command are given. In FIG. 56 the sequence of events in response to an RPFC [pass code #n to product] command are given.

In FIG. 57 the sequence of events in response to an RPDM [pass n+1 data messages to product] command are given. In this figure "n" is the decimal representation of the binary value [xxxx]. In this figure it is also assumed that all data messages have been received (see FIG. 51) before the flow chart of FIG. 57 is entered. FIG. 58 shows the sequence of events in response to an RPFR [pass code #n with product response] command is given. FIG. 59 shows the sequence of events in response to an RPDR [pass n+1 data messages with product response] command.

With the above described overview of FIGS. 50 to 59, inclusive, in mind, reference may now be had to FIG. 60 which is a detailed flow chart of the initialization procedure performed when the main initialization program of FIGS. 33-35 detects either a master/product configuration or a master/INCOM configuration. In this flow chart, and in succeeding detailed flow charts of the master/product configuration and the master/INCOM configuration, source code labels associated with the flow chart block precede that block. These labels are in capital letters and each with a colon. Furthermore, in those instances where a second label is used in the master/product or master/INCOM configurations as a synonym, this synonym label is given in parentheses and starts with a "%". Also, as in the flow charts of FIGS. 33-49 of the INCOM/product configuration, a "!D" disables all interrupts at that point in the program and before the next instruction is executed. Similarly, a "!E" enables all interrupts at that point before the next instruction is executed. In the master configuration flow charts the following additional abbreviations are used:

MSG - Message
RCV - Receive
FMT - Format
PNDG - Pending
BUF - Buffer
RESP - Response
SNDG - Sending
OBTD - Obtained
W/I - Within
REQD - Required
PROC - Process
TX - Transmit
CHAR - Character
SECT - Section
REQTD - Requested
DEF - Defined
RECD - Received
XPTD - Expected As discussed generally heretofore, the initialization procedure for all three configurations starts as shown in FIG. 33. However, when a master configuration is detected and the program proceeds to the block "EXTERNAL ROUTINE " a INIT-master-LJMP, shown in FIG. 33, the program jumps to the master initialization shown in FIG. 60 as shown by the label INIT-MASTER-LJMP: at the start of this flow chart. In this connection it will be noted that the synonym % INITIALIZE: is used in the master configuration rather than the label INIT-MASTER-LJMP of the INCOM/product configuration.

In FIG. 60 the block 200 saves the machine state of the microcontroller 38, block 202 sets up pointers RSO, RS1 to register bank #3, block 204 reads the hardware baud rate jumpers W11 and W12 (FIG. 19 for baud rate selection on the RS232C link), block 206 is a table lookup for baud rate timer #1 settings corresponding to the settings of the jumpers W11 and W12, block 208 sets up the 8051 UART as 9 bit, 2 stop bits; enables serial reception and interrupt driven (?), block 210 initializes the pointers to the RS232C receive interrupt buffer, RCV-BUF and block 212 restores the machine state of the 8051. The decision block 214 tests the state of port P3.7 of the microcontroller 38 and if this is low, indicating a parallel configuration i.e., a master/product configuration, the master initialization routine exits from FIG. 60 and returns to the INT-MASTER-SPAR-RET: point of the main initialization program shown in FIG. 34. If P3.7 is high, indicating a serial configuration i.e., master/INCOM configuration, the program proceeds to the initialization phase of this configuration shown in the left hand column of FIG. 60, as will be described in more detail hereinafter.

After initialization is returned to the main initialization program, it proceeds through the flow charts of FIGS. 34 and 35 and into the SRUN-LOOP program of FIG. 36 until a master configuration is detected by the decision block 216 whereupon the program jumps to the master run loop shown in FIG. 61. Referring to FIG. 61, it can be seen that the MASTER-RUN-LOOP label has the synonym % SRUN-LOOP-EXT: also assigned to it for the master configurations. Decision block 220 tests port P3.7 for the series or parallel configuration and if a parallel configuration is detected, i.e., a master/product configuration, the program proceeds to poll the subroutines discussed generally heretofore in the order shown in FIG. 61. In FIG. 61, and succeeding detailed flow charts of the master configurations, subroutines are identified by rectangles having double lines on each side, each of these subroutines being completely described in separate flow charts. When subroutines are finished, they are returned back to the statement following where they were called. Thus, the right hand portion of FIG. 61 constitutes the main polling loop of the master/product configuration. In this loop the block 222 saves the machine state of the 8051 microprocessor and sets up to use register bank #3. It should also be noted that in this main polling loop of FIG. 61 all interrupts are enabled before selection of the next subroutine in the loop, these interrupts being disabled internally at the start of each of the subroutines as shown in the respective flow charts for these subroutines. After the TX-CAEF-MSG subroutine is polled, the block 224 restores the machine state of the 8051 and the master run loop exits and returns to the point MASTER-RUN-LOOP-RET: shown in FIG. 36 and proceeds to utilize the MEI card product routines of the INCOM/product configuration shown in FIGS. 37-49.

If the test of port P3.7 indicates that this port is set, i.e., the master/INCOM configuration, the program proceeds through the left hand column of subroutines, as will be described in more detail hereinafter, block 226 in this left hand column being employed to save the machine state of the 8051 and block 227 sets up register bank #3 for use.

Considering now the separate routines which are polled by the main polling loop of the master/product configuration, the first routine polled is the POLL-RCV-INT routine the flow chart of which is shown in FIGS. 62, 63 and 64. In this detailed flow chart, and in other flow charts of the master configurations, an encircled letter which has only a flow arrow leading to the circle is considered to be connected to the same encircled letter which has an arrow leading away from the circle in the same routine flow chart. Thus, in FIGS. 62 and 63 the encircled letters "A" which only have arrows leading into the circle are all connected to the encircled "A" identified by the reference numeral 230. Considered generally, this routine processes the incoming RS232 ASCII II encoded characters in the interrupt buffer and accumulates an INCOM message in the receive message buffer.)

In FIG. 62 the block 232 sets up the pointer to the character in the receive interrupt buffer. The block 234 turns the echo on. Block 236 loads the received character pointed to into the transmit interrupt buffer and requests the character to be sent. Block 238 turns the echo off.

In FIG. 63 the block 240 sets the receive message counter equal to 1, the block 242 sets the check sum total equal to 2, the block 244 designates the receive message buffer is empty, the block 246 sets up for the CAEF [ACK]. In the ASCII II decoding line the block 248 converts the ASCII II coded character to the hexadecimal value number, and the block 250 increments the receive message counter. The block 252 adds the hexadecimal value to the check sum and the block 254 sets an error in the case of a bad check sum. In the nonhexadecimal line the block 256 sets a flag that a bad character was received and the block 258 sets up for a CAEF [NAK]. The block 260 adds a hexadecimal value to the check sum.

In FIG. 64 the block 262 adds the hexadecimal value to the check sum and the block 264 puts the hexadecimal nibble in the proper position of the INCOM message format in the receive message buffer. The block 266 sets an error for bad format, i.e., a bad command-/data field. The block 268 sets up for a CAEF [NAK] response to the master 40. The block 270 sets up a request to send a format response, the block 272 designates the receive message buffer as full, the block 274 ignores the bad message and designates the receive message buffer as empty and the block 276 designates an error in the MEI status register.

Considering now the TX-FMT-MSG routine, which is the next routine polled in the main polling loop of the master/product configuration, this routine is shown in FIG. 65. As discussed generally heretofore, this routine transmits a format response to the RS232 message received. It should be noted that this routine returns to one of two locations depending upon which configuration called it. In the master/product configuration this routine returns to the RCV-POLL-2 location as shown in the right hand column of FIG. 61. In the master/INCOM configuration this routine returns to the INCOM-POLL-4, as shown in the left hand column of FIG. 61. Referring to FIG. 65, if a format response to the master is pending and the transmit interrupt buffer is empty the block 290 clears the FMT-FLG designating that no format response is pending, the block 292 sets up the transmit interrupt buffer pointers, and the block 294 loads the transmit buffer with [ACK]. If a bad buffer is indicated the block 296 overwrites [ACK] with [NAK]. If an echo response is on, the block 298 sets the transmit interrupt buffer pointers and the block 300 loads the character 'A' in the transmit interrupt buffer. If a bad buffer is indicated the block 302 overwrites the 'A' with 'N' in the transmit interrupt buffer. The block 304 loads [CR] carriage return into the transmit interrupt buffer and updates the pointer. The logic flow then goes to block 306 which initiates an interrupt to send the RS232 message in the transmit interrupt buffer and the routine exits.

Considering now the POLL-RCV-MSG routine, which is the next routine polled in the main polling loop of the master/product configuration, this routine is shown in FIGS. 66 to 75. As discussed generally heretofore, this routine processes an INCOM formatted message in the receive message buffer obtained from the RS232 master 40. Referring to FIG. 66, if a reset is pending and the receive message buffer is empty the block 320 clears the RS232 hardware stop to allow transmission. The block 322 requests the sending of the character [XON] to the master 40 and the program exits. If a data message is indicated but no data message was expected, the block 324 ignores the message and designates the receive message buffer empty. If a data message was expected and it is the first data message, the block 326 obtains a product buffer to use and puts the first byte of the message from the receive message buffer into it. The block 328 sets up a pointer to the remainder of the product buffer to fill. If it is not the first data message, the block 330 sets up the pointer to the message in the product buffer defined by the first message, the block 332 stores the first byte of the message from the receive message buffer at this location in the product buffer and the block 334 decrements the pointer.

Referring to FIG. 67, the block 336 stores the second and third bytes of the receive message buffer in the product buffer. If this is the last data message expected, the block 328 designates that no more data messages are expected, the block 330 saves the ending position in the product buffer and designates it valid, the block 332 updates the product queue of command associated with the data messages received and the block 334 designates the receive message buffer empty. If a product response is not expected, the block 336 initiates a request to send CAEF [ACK]. If more data messages are expected the block 338 designates the receive message buffer empty and the block 340 updates the data message pointer.

Referring to FIG. 68, wherein a command from the external master 40 is processed, the block 350 designates no more data messages expected, the block 352 designates the product response not pending and the block 353 instructs to get the command field of the INCOM format message. If the command is an SSAT command the block 354 gets the subcommand field of the message which is decoded in the decision blocks 356–364. If the command is not an SSAT command the command field is decoded to determine the nature of the command, as discussed in detail heretofore in connection with Tables I and II, this decoding being achieved by the decision blocks 366–378. If the command is RPFC the block 380 designates that a product RESP is required. If the command is RPFR the block 382 designates that a product RESP is required. The outputs of the decision blocks in FIG. 68 are supplied to the indicated subroutines in the other figures of the POLL-RCV-MSG routine. If the command is not any of those tested for in these decision blocks, the block 379 initiates a request to send CAEF [NAK] and the block 381 designates the receive message buffer empty.

Referring to FIG. 69, the flow points G, H and P are first sent to the SETUP-SUBS subroutine, as block 390 gets the message information to set up pointers of the data message to send. The block 392 gets the message information to set up pointers of data messages to send, and the block 394 sets up pointers from the product buffer information for the number of messages to send. If the pointers are within the range of the product buffer, the block 396 designates a data message pending to be sent to the master. If not, the block 398 designates the receive message buffer empty, the block 400 releases the product buffer grabbed for use, and the block 402 requests a CAEF [out-of-range] to be sent.

Referring to FIG. 70, the output of the decision block 358 (FIG. 68), after going to the GET-BUFF routine described in more detail hereinafter, asks if a product buffer has been obtained in the decision block 404. If it has, the block 406 sets up pointers to message number 1. If no buffer is obtained the block 408 designates the receive message buffer as empty and the block 410 initiates a request to send CAEF [no valid buffer]. If the command is RPBN, the block 412 designates no product RSVP required. If a previous buffer number was specified and this is not the same as the new buffer number, the block 414 designates invalid product buffers and the block 416 saves the new buffer number. If the new buffer number is the same as the old buffer number the block 418 designates that a buffer number has been received and the block 420 initiates a request to send CAEF [ACK].

Referring to FIG. 71, if the command is RPDN and a product buffer is obtained, the block 430 designates no product response required. If no buffer is obtained the block 432 initiates a request to send CAEF [no buffer available]. Similarly, if the command is RPBR and a buffer is obtained the block 434 indicates no product response is required whereas if no buffer is obtained, block 436 initiates a request to send CAEF [no buffer available]. The sub-routine CHK-QUEUE is then called, as described in more detail hereinafter. If the queue is filled the block 438 designates the receive message buffer as empty and the block 440 initiates a request to send CAEF [repeat request]. If the queue is not full the block 442 sets up the expected number of data messages from the master and in the product queue, and the block 444 designates the receive message buffer as empty. If a product response is required the block 446 puts "WPDTR" in the product queue and the block 448 sets up to expect a product response. If no product response is required the block 450 puts "WPDAT" in the product queue and the block 452 initiates a request to send CAEF [ACK].

Referring to FIG. 72 if the command is RPFC the CHK-QUEUE routine is called. If the queue is full blocks 460 and 462 function the same as the blocks 438 and 440 in FIG. 71. If the queue is not full the block 464 updates the product queue and the block 466 gets the subcommand to put in the product queue. If a product RSVP is required, the block 468 puts "WPCDR" in the product queue, the block 470 sets the receive message buffer empty and the block 472 sets up to expect a product response. If no product RSVP is required the block 474 puts "WPCOD" in the product queue, block 476 sets the receive message buffer empty and the block 478 initiates a request to send CAEF [ACK].

Referring to FIG. 73, if the subcommand requests a two bit status and the transmit message buffer is available, the block 490 designates the receive message buffer empty, the block 492 designates the transmit message buffer as full, the block 494 obtains a product buffer and puts the two bit status in the transmit message buffer subcommand. The block 496 loads the address of FFFH, the block 498 loads SMSS into the response command field, and the block 500 designates the command in the transmit message buffer.

Referring to FIG. 74, if the subcommand is an MEI reset the block 502 resets the deadman hardware, the block 504 clears out any pending tasks of the MEI card 30, the block 506 sets the MEI reset flag on and the block 508 initiates a request to send CAEF [ACK].

Referring to FIG. 75, if the subcommand is a request for MEI status and the transmit message buffer is available, the block 510 designates the transmit message buffer full and containing a data message, the block 512 loads message byte #1 with the hardware revision #, the block 514 loads message byte number 2 with the software revision #, block 516 loads message byte number 3 with the MEI error status byte, block 518 clears the appropriate bits in the MEI error status byte, block 520 initiates a request to send CAEF [ACK] and the block 522 designates the receive message buffer empty.

Considering now the POLL-TX-DAT routine, which is the next routine in the main polling loop of the master/product configuration, this routine is shown in FIG. 76. Considered generally, this routine processes data messages in a product buffer and sets them up to be sent to the RS232 master. Referring to FIG. 76, if a CAEF message is not pending, the transmit message buffer is not full and there are data messages pending, the block 530 sets up which data message to process. If this is the first data message the block 532 determines the product buffer to use and gets the out-of-order byte into the transmit message buffer and the block 536 sets up a pointer to the remainder of the message. If this is not the first data message, the block 538 sets up a pointer to the message in the product buffer defined by the first message (?), and the block 540 gets the first byte and stores it in the transmit message buffer. Block 542 gets the second and third bytes and stores them in the transmit message buffer and block 544 designates the transmit message buffer full and pending to be sent to the RS232 master. If there are no more data messages to send, the block 546 designates an invalid product buffer and gives control of it back to the product port software, and the block 548 sets up to send a CAEF [ACK] and makes it a pending request. If there are more data messages to be sent the block 550 increments a pointer to designate the next data message to process and the program exits.

The POLL-TX-INT routine, which is the next routine in the main polling loop of the master/product configuration, is shown in FIG. 77. Considered generally, this routine moves a message from the INCOM format buffer to the RS232 transmit interrupt buffer. This routine also tests for hardware transmit stop request and hardware reset (SSAT-09 from the master 40). Referring to FIG. 77, if the hardware "stop transmit" CTS line is high, there is a message to send and the transmit interrupt buffer is not full, the block 560 moves the message in the transmit buffer to the transmit interrupt buffer, changing the nibble order to match the RS232 protocol. The block 562 computes the check sum of the nibbles in the message and enters this check sum in the transmit interrupt buffer to be sent to the RS232 master, the block 564 designates the transmit message buffer empty, the block 566 sets up pointers to designate that the transmit interrupt buffer has data to be sent and the block 568 requests an RS232 transmit interrupt. If the CTS line is low and did not just change state, the block 570 designates the prior state of the CTS line as low and the block 572 requests an RS232 transmit interrupt. If there is no message to send, no CAEF response is pending and a reset of the 8051 is requested by the RS232 master, the block 574 sits in an infinite loop. This will cause the deadman to activate an 8051 hardware reset and restart.

The POLL-TX-PROD routine, which is the next routine polled in the main polling loop of the master/product configuration, is shown in FIG. 78. Considered generally, this routine checks for a product response and prepares it to be sent to the RS232 master 40. Referring to FIG. 78, if there is a product response, there are no data messages to process, the transmit message buffer is empty and no format or CAEF response is pending, the block 580 designates no product response is necessary after this routine is completed. If the response is good, the block 582 defines a command message in the transmit message buffer, the block 584 gives the address of FFFH to this message, the block 586 fills the subcommand field of the message with the product response and the command field with "PRSP" code and the block 588 designates that a message in the transmit message buffer is pending to send. If there is a bad response, the block 590 sets up and requests to send CAEF [product not responding].

The TX-CAEF-MSG routine, which is the last routine in the main polling loop of the master/product configuration, is shown in FIG. 79. Considered generally, this routine transmits a CAEF response to certain messages received from the RS232 master. It should be noted that this routine returns to one of two locations depending upon which configuration called it. Thus, in the master/product configuration this routine returns to TX-POLL-6; (FIG. 61) and in the master/INCOM configuration this routine returns to INCOM-POLL-6 (FIG. 61). Referring to FIG. 79, if a CAEF response is pending, no format response to the master is pending and the transmit message buffer is not full, the block 600 designates the message in the transmit message buffer, the block 602 designates that the message is a command and not data, the block 604 loads the transmit message buffer with the CAEF command field, the block 606 loads the transmit message buffer with FFFH as the address field, the block 608 gets the subcommand to be sent and puts it into the transmit message buffer, and the block 610 clears the CAEF flag, designating no CAEF message pending.

As discussed generally heretofore, the interrupt routine % RITI-INT processes both receiver and transmitter interrupts. This interrupt routine is shown in FIGS. 80 and 81. Referring to FIG. 80, the machine state of the 8051 is saved by the block 620, the block 622 sets up for register bank #3 and the block 624 turns on the activity LED shown in FIG. 6. If a receive interrupt occurs the block 626 clears the RI interrupt flag, the block 628 gets a pointer on where the last received byte is, and block 630 increments the pointer for the next byte. Block 632 masks the offset pointer to a value between 0 and 3 for the four byte interrupt ring buffer, and block 634 stores the character received after masking off bit 7 to a value of 0. If an [XOFF] was sent, the block 636 turns off the activity LED and block 638 restores the machine state of the 8051. If no [XOFF] was sent, the receive message buffer is full, and the receive interrupt buffer has 1 byte stored the block 640 sends an RS232 hardware stop request to have the master 40 stop transmitting and block 642 cleans up the error, status register and stack. If the receive interrupt buffer has 2 bytes stored, the block 644 sets up a request to send [XOFF] and block 646 requests an RS232 transmit interrupt.

Referring to FIG. 81 the block 650 clears the interrupt flag TI. If the MEI card is sent an [XOFF] or an RS232 and the master hardware line is requesting to stop transmission, the block 652 denotes a master hardware stop has occurred. If an [XON] is pending the block 654 loads the RS232 transmitter with [XON]. If an [XOFF] is pending the block 656 loads the RS232 transmitter with [XOFF], and the block 658 designates the last character of the [XON]/[XOFF] pair sent and that none are pending. If there are no characters to send the block 660 resets the pointers in the transmit interrupt buffer. If characters are to be sent, the block 662 gets a pointer to determine next character to send. If this character is in the nibble section of the transmit interrupt buffer the block 664 gets the nibble and encodes it into hexadecimal ASCII II characters, the block 666 puts the characters into the RS232 transmitter and the block 668 updates the pointers into the transmit interrupt buffer. If the character is in the byte section of the transmit interrupt buffer the block 670 puts the character into the RS232 transmitter. If the character sent is a carriage return [CR] the block 672 replaces [CR] with [LF] in the transmit interrupt buffer. If the character is not [CR] the block 674 updates the pointers to the transmit interrupt buffer.

The SETUP-SUBS subroutine is used to determined if a product buffer is available or no buffer segment # is defined. This subroutine is used, for example, in FIG. 69. The flow chart of the SET-UP-SUBS subroutine is shown in FIG. 82. Referring to this figure, if a buffer number has not been defined, the block 680 designates the receive message buffer empty, the block 682 sets up CAEF [no buffer segment specified] and requests that it be sent, and the block 684 removes the subroutine return address from the stack. Block 684 exits by going to flow point A on the POLL-RCV-MSG routine shown on FIG. 66. If a valid buffer is not obtained the block 686 designates the receive message buffer empty and the block 688 sets up CAEF [no valid buffer yet] and requests it to be sent.

As discussed generally heretofore, the GET-BUF subroutine checks the two product buffers to obtain a valid product buffer for use by the master RS232 port routines. This subroutine is shown in FIG. 83. Referring to this figure if the RS232 port already has control of a product buffer the block 690 designates no valid buffer flag and the program exits. If the RS232 port does not control a product buffer and the product buffer #1 is valid the block 692 sets flags for buffer #1 to designate its use by the RS232 routines. If product buffer #1 is not valid but product buffer #2 is, the block 694 sets flags for buffer #2 and designates its use by the RS232 routines. Block 696 designates the valid buffer flag obtained and the subroutine exits.

As discussed generally heretofore, the CHK-QUEUE subroutine checks the product queue for pending commands this queue is 4 bytes (commands) deep. The CHK-QUEUE subroutine is shown in FIG. 84. Referring to this figure, if the queue input pointer is at the end of the queue the block 700 sets the queue pointer to one less than the start point of the queue and the block 702 increments the queue input pointer. If the queue input pointer has the same value as the queue output pointer the block 704 passes back that the queue is full. If these two pointers do not agree the block 706 passes back that the queue is not full.

Master/INCOM Configuration

The master/INCOM configuration of the MEI card allows the external master 40 to tap into the INCOM network 34 and control stand alone slaves or expanded mode slaves on the INCOM network. The master/INCOM configuration controls two ports of the MEI card 30, i.e., the INCOM port and the RS232C port. The INCOM routines of the INCOM/product configuration are not used in the master/INCOM configuration.

The routines used by the master/INCOM configuration can be broken into polling routines and interrupt routines. Polling routines are noncritical with respect to time. They move, process, and transform information that has been received from one port and send it to a transmitter of the same or another port. Interrupt routines are those routines that process and receive data from an external device and store it in a buffer so that the polling routine can process it at a later time. A time out interrupt also tests delays in command responses.

Some of the polling routines used in the master/INCOM configuration are also used in the master/product configuration. However, a brief description of the polling routines used in the master/INCOM configuration in the order in which they are polled in FIG. 61 is given below together with comments relevant to the master-/INCOM configuration:

POLL-RCV-INT This routine tests for data in the RS232C receive interrupt buffer, transforming it from the RS232 format into an INCOM format in another buffer. (Data flow: source=RS232C, destination=INCOM unless intercepted as an MEI command).

POLL-TX-INT This routine moves data in an INCOM formatted buffer to the RS232 transmit interrupt buffer which is sent to the external master 40. In the process the data is reformatted for transmission. (Data flow: source=INCOM or MEI, destination=RS232C).

TX-FMT-MSG This routine sends a response to the master 40 concerning the format of the message just received from the master. (Data flow: source=MEI, destination=RS232C).

TX-CAEF-MSG This routine sends a response to the master 40 concerning the processing of the command sent to the MEI card. (Data flow: source=MEI, destination=RS232C).

POLL-MEI-CMD This routine determines if the message received from the master 40 and in the INCOM formatted buffer is directed to the MEI card as a command. If it is, the routine performs the required actions. (Data flow: source=RS232C, destination=-MEI).

POLL-RCV-INCOM If the INCOM holding buffer has data pending that it received from the INCOM network, this routine moves the data to an INCOM formatted buffer for transmittal to the master 40. (Data flow: source=INCOM, destination=RS232C).

POLL-TX-INCOM This routine determines if the message received from the RS232C master 40 and located in the INCOM formatted buffer, is directed to the INCOM network. If so, it sends a message to the INCOM chip to put onto the INCOM network 34.

A brief description of the interrupt routines employed in the master/INCOM configuration is as follows:

%INT-INCOM This routine processes receive and transmit interrupts generated by the INCOM chip 36. For receive, it moves a message from the INCOM chip to the INCOM holding buffer. For transmit, it only clears out the interrupt line.

INT-TIMER This routine is a time out interrupt. An error flag is set if a response from the INCOM network is not received after a command request to it, within a given time period.

%RITI-INT This routine processes receive and transmit interrupts generated by the RS232 master 40. For receive, a byte is moved from the receiver logic and stored in the receive interrupt buffer. For transmit, a byte is moved from the transmit interrupt buffer to the RS232 transmitter circuitry.

In addition to the above polling and interrupt routines, the master/INCOM configuration employs an INCOM-IN subroutine to clock a data byte from the INCOM chip into the microcontroller 38. It also employs the INCOM-OUT subroutine to clock a data byte from the microcontroller 38 into the INCOM chip 36.

The INCOM-BUF, also described as the INCOM holding buffer, is a contiguous circular/ring buffer of 72 bytes using RAM locations 38H through 7FH. It is a temporary storage for data received from the INCOM network that is pending to be processed and sent to the RS232 master 40. Three pieces of information control the status of this buffer: BEGIN-PTR, END-PTR, and BUF-FLG. BEGIN-PTR is a byte pointer used to designate where data is to be removed from the buffer for processing and transmission to the RS232 port. The value must be incremented to point to the proper location where this data is stored. END-PTR is a byte pointer used to designate where new data is to be placed in the buffer when received from the INCOM network. The value must be incremented to point to the next free location to store the data. BUF-FLG is a bit flag used to designate the ambiguous condition when both of the above pointers are equal. When not equal, this flag is always 0. When both pointers are equal and the flag=0, the buffer is empty. When equal and the flag=1, the buffer is full.

The INCOM holding buffer is filled in increasing memory location order (except for the loop back condition), and can be considered a FIFO queue. Data is stored in this buffer by the %INT-INCOM routine and removed by the POL-RCV-INCOM routine. The buffer (72 bytes), can hold 18 messages of 4 bytes each. The first byte of each message contains the BCH error in bit #0. The BCH error bit is 1 if an error was detected by the INCOM chip, otherwise it is 0. Also in this byte is the message type in bit #1 where command messages are represented by 1 and data messages by 0. The remaining bits of this byte are not used. The second, third and fourth bytes of this message correspond to the INCOM received message.

In the master/INCOM configuration, the MEI card 30 is programmed to respond to any command from the external master 40 with an address of FFFH. All other commands are passed on to the INCOM network without interpretation, other than format checking. Of those commands sent to the MEI card, only two are valid: a request of the MEI card to reset, and a request for the MEI card status. The MEI card will respond to any other command with a CAEF (not acknowledge).

The MEI reset command has a command field equal to 0000B (the binary code for the SSAT command) and a subcommand field of 1001B. When this command is received and interpreted, the only response processed and sent back before a hardware reset is the CAEF [acknowledge]. Of course, any information yet pending in the INCOM formatted transmit buffer and RS232 transmit interrupt buffer are allowed to be sent. After transmission, the MEI card 30 locks into a loop, waiting for the deadman circuitry to initiate a hardware reset. All status information concerned with events prior to reset is cleared.

The MEI status command has a command field equal to 0000B (the SSAT command) and a subcommand field of 1000B. The format for the status is the same as that received from an MEI slave on the network except for the interpretation of bits in the third byte of the message. For the master/INCOM configuration these bits are:

| Byte #3 | Description (0=no error, 1=error) |
|---|---|
| bit 16* (lsb) | BCH error |
| 17* | RS-232 received message format error |
| 18* | input data overflow/lost from RS-232 |
| 19* | input data overflow/lost from INCOM |
| 20* | INCOM timeout error for response to request |
| 21 | INCOM hardware error |
| 22 | MEI configuration must=1 (serial) |
| 23 (msb) | MEI configuration, must=0 (master) |
| For the master/product configuration, these bits are: | |
| bit 16* (lsb) | |
| 17* | RS-232 received message format error |
| 18* | input data overflow/lost from RS-232 |
| 19* | product timeout error |
| 20* | product interface link error |
| 21 | not used |
| 22 | MEI configuration, must=0 (parallel) |
| 23 (msb) | MEI configuration, must=0 (master) |

*bit is reset after the MEI status is read.

Considering first the initialization which is unique to the master/INCOM configuration, when the decision block 214 tests serial, the block 205 sets the stack pointer register to 7, the block 207 sets up the INCOM chip 36 and lines to the 8051, the block 209 sets up to allow the INCOM chip to interrupt the 8051 and the block 211 initializes pointers to the INCOM interrupt buffer where incoming messages are stored. The program then returns to the initialization at the INIT-MASTER-SPAR-RET point on FIG. 34.

Considering now the detailed flow charts of the routines which are polled during the main polling loop of the master/INCOM configuration, it can be seen from FIG. 61 that four of these routines (indicated by asterisks) are common to the master/product configuration. The first routine which is used only in the master/INCOM configuration is the POLL-MEI-CMD routine which is shown in FIG. 85. Considered generally, this routine processes commands directed to the MEI card (address=FFFH) rather than the INCOM network. The only valid commands are SSAT-RESET and SSAT-STATUS. This routine test for a command from the RS232 port to the MEI card rather than to the INCOM network. Referring to this figure, if there is no message to process the block 710 returns the routine to the main polling routine of FIG. 61. On the other hand, if a message is in process, the message is a command type, the INCOM is not busy, the address is FFFH, the command is SSAT, and the subcommand is STATUS or RESET, the block 712 jumps to the middle of the routine POLL-RCV-MSG of the master/product configuration. If the command meets none of these requirements, a bad MEI command is indicated and the block 714 jumps to the CHK-OTHER-CMD: point of the POLL-RCV-MSG routine.

The POLL-RCV-INCOM routine, which is the next routine in the main polling loop of the master/INCOM configuration which is not common to the master/product configuration, is shown in FIG. 86. Considered generally, this routine processes an INCOM message from the INCOM input holding buffer, INCOM-BUF to the output buffer, TX-MSG-BUF. Referring to FIG. 86, if the format response to the RS232 master is pending the block 720 returns to the main polling routine. This is also true if a CAEF message is pending. If neither of these messages is pending, the transmit message buffer is not full and there is data in the INCOM buffer, the block 722 designates the INCOM ring buffer not full, BUF-FLG 0. If the INCOM buffer is empty the block 724 resets the buffer pointer to the start of the buffer, less 1. If the INCOM buffer is not empty the block 726 moves an INCOM network message from INCOM-BUF to the RS232 three byte output buffer, TX-MSG-BUF, and defines the command/data flag, TX-MSG-FLG. The block 728 updates the pointers for the INCOM buffer, the block 730 designates the message in the transmit message buffer via TX-MBUF-FLG=1, and the block 732 clears the time out flag, TIMER-FLG, to prevent a time out error.

The next routine in the main polling loop of the master/INCOM configuration is the POLL-TX-INCOM routine which is shown in FIG. 87. In general, this routine moves the RS232 input message in the INCOM formatted buffer to the INCOM chip for sending out on the INCOM network. Referring to FIG. 87 if a message is in process and the INCOM chip is not busy the block 740 sends the message bit (DATA/CMD) to the INCOM chip, and the block 742 sends the first message byte to the accumulator. The INCOM-OUT subroutine is then employed to move a message byte from the 8051 of the INCOM chip, as described in more detail hereinafter. The second message byte is then sent to the accumulator by the block 744 and after this has been moved to the INCOM chip the block 746 moves the third message byte to the accumulator. After this third byte is moved to the. INCOM chip the block 748 initializes the RS232 port so it can accept another message, the block 750 resets the timeout timer to wait for an INCOM response, and the block 752 clears RTS-OUT, RS232 hardware, allowing the master to restart transmitting. If an XOFF was last sent the block 754 sends [XON] the RS232 software restart transmitting. The block 756 sets the INCOM RW line to the read state. If no message is in process or the address is FFFH the block 758 returns to the main polling routine of the master/INCOM configuration.

As discussed generally heretofore, the %INT-INCOM routine processes INCOM messages received from the network. More specifically, this routine takes an INCOM message from the INCOM chip 36 after an interrupt occurs and stores it in the INCOM holding buffer, INCOM-BUF. This routine is shown in FIG. 88. Referring to this figure, the machine state of the 8051 is saved by the block 760 and the block 762 sets up to use register bank #0. If a receive interrupt occurs and the INCOM holding buffer is full, the block 764 saves a status error and the block 766 drops the message by clocking out of the INCOM chip. If the program is at the end of the ring INCOM holding buffer the block 768 resets to the start of the holding buffer. The block 770 clocks the BCH error bit out of the INCOM chip and saves it, the block 772 clocks a message type bit (DATA/COMMAND) out of the INCOM chip and saves it in the holding buffer, and the INCOM-IN routine described in more detail hereinafter is called. Returning from this routine, the block 774 saves the first byte of the message in the INCOM buffer, the block 776 saves the second byte of the message in the INCOM buffer and the block 778 saves the third byte in this message. If the INCOM data line is set the block 780 saves an error in the MEI status register B. If the INCOM data line is low, the block 782 saves new pointers to valid messages, saved in the INCOM holding buffer, and the block 784 sets up the INCOM chip to receive a new message. If the INCOM holding buffer pointers are equal the block 786 sets the BUF-FLG=1 to designate the INCOM holding buffer is full. If a TX interrupt occurs the block 788 clears the interrupt signal from the INCOM chip and the block 790 stores the machine state of the 8051.

As discussed generally heretofore, the %INIT-TIMER routine is a time out interrupt which checks for a response to a request on the INCOM network. An error flag is set if the response from the INCOM network is not received after a command request to it, within a given time period. This routine is shown in FIG. 89. Referring to this figure, the machine state of the 8051 is saved in the block 794 and the block 796 increments the timer counter, TIMER-CTR. If a master/INCOM configuration is found, a response from the INCOM network is pending and time out has been exceeded, the block 798 produces a time out error and sets it in the MEI status register B. The block 800 clears the TIMER-FLG to designate no response pending and the block 802 restores the machine state of the 8051.

As discussed generally heretofore, the master/INCOM configuration employs an INCOM-IN sub-routine to clock a data byte from the INCOM chip into the microcontroller 38. This subroutine is shown in FIG. 90. Referring to this figure the block 810 sets the loop counter to 8, the block 812 clocks an INCOM bit into carry, the block 814 moves the carry bit into the accumulator and the block 816 decrements the loop counter.

The INCOM-OUT subroutine, shown on FIG. 81 clocks the data bytes from the microcontroller 38 to the INCOM chip 36. Referring to this figure the loop counter is set to 8 by the block 820, the block 822 rotates the accumulator bit into carry and onto the INCOM data line, the block 824 clocks the data line into the INCOM chip and the block 826 decrements the loop counter.

While there have been illustrated and described several embodiments of the present invention, it will be apparent that various changes and modifications thereof will occur to those skilled in the art. It is intended in the appended claims to cover all such changes and modifications as fall within the true spirit and scope of the present invention.

(The following page is Appendix Page A-1)

MCS-51 MACRO ASSEMBLER    MEI EXPANDED MODE SLAVE, Version 0.5

INDX-W51 (X327) MCS-51 MACRO ASSEMBLER, X215
OBJECT MODULE PLACED IN /INDX.CE/MEIS05.OBJ
ASSEMBLER INVOKED BY:  /INDX.CE/ASM51 /INDX.CE/MEIS05.A51

LOC  OBJ        LINE    SOURCE

1      $TITLE(MEI EXPANDED MODE SLAVE, Version 0.5    DATE: 04/18/85)

```
  2         $MOD51 NOMACRO XREF
  3         $PAGELENGTH(59)
  4         ;
  5         ;                    Copyright (C) 1984,1985 by
  6         ;                    Westinghouse Electric Corporation
  7         ;                         All Rights Reserved
  8         ;
  9         ;                    WESTINGHOUSE ELECTRIC CORPORATION
 10         ;                         PROPRIETARY INFORMATION
 11         ;
 12         ;     This is the program for the MEI Interface Card. It contains code
 13         ;     for the parallel product interface and the expanded mode slave INCOM
 14         ;     interface (i.e., configuration type SLAVE PARALLEL).
 15         ;         The software which allows the MEI Interface card to operate as a
 16         ;     RS232-C master device with a host computer and the master INCOM interface
 17         ;     is not incorporated, but must be linked with this module using the jump
 18         ;     and status labels described the following two sections (which define EXTRN
 19         ;     and PUBLIC directives, and the MEI STATUS).
 20         ;
 21         ;***********************************************************************
 22         ;
 23         ;             EXTERNAL JUMPS FOR OTHER CONFIGURATION CODE
 24         ;                       (all use LJMP instructions)
 25         ;
 26         ;***********************************************************************
 27         ;
 28         ;         Initialization Jumps for Master Code
 29         ;
 30         EXTRN   CODE (INIT_MASTER_LJMP)        ;Initialize serial link to master
 31                                                ; after a reset occurred (the serial
 32                                                ; port is already setup but REN is
 33                                                ; not enabled)
 34         PUBLIC  INIT_MASTER_SPAR_RET           ;Return from INIT_MASTER_LJMP
 35         EXTRN   CODE (MASTER_RUN_LOOP)         ;Jmp location following initialization
 36                                                ; (for the running loop of program)
 37         PUBLIC  MASTER_RUN_LOOP_RET            ;Return of MASTER_RUN_LOOP
 38                                                ; if slave par prod intfce IS used
 39         PUBLIC  SRUN_LOOP                      ;Return of MASTER_RUN_LOOP
 40                                                ; if slave par prod intfce IS NOT used
 41         ;
 42         ;         Interrupt Routine Jumps for Master or Slave Serial Code
 43         ;
 44         EXTRN   CODE (IC_INT_MASTER_LJMP)      ;INCOM
 45         EXTRN   CODE (TIMEOUT_INT_MASTER_LJMP) ;Timeout (INT 0)
 46         PUBLIC  TIMEOUT_INT_SLAVE              ;Location of slave timeout interrupt
 47                                                ; incase master code uses the same
 48         EXTRN   CODE (PROD_ACK_MASTER_LJMP)    ;Parallel Product Interface OUTPUT
 49                                                ; ACK* input
```

MCS-51 MACRO ASSEMBLER    MEI EXPANDED MODE SLAVE, Version 0.5

LOC  OBJ          LINE    SOURCE

```
 50         PUBLIC  PROD_ACK_SLAVE                 ;Parallel Prod Interface OUTPUT ACK*
 51                                                ; interrupt incase master option 0
 52                                                ; uses same routine (it is supported)
 53         EXTRN   CODE (SER_PORT_SLAVE_LJMP)     ;Serial Product (Slave) interrupt
 54         EXTRN   CODE (SER_PORT_MASTER_LJMP)    ;Serial Master interrupt
 55         ;
 56         ;         Starting Location of Master Code
 57         ;
 58         EXTRN   CODE (START_MASTER_CODE)       ;Ending of this Slave Configuration
 59                                                ; code i.e., the origin of the
 60                                                ; master configuration code.
 61 +1     $EJECT
```

```
LOC  OBJ           LINE    SOURCE

62     ;*****************************************************************
                    63     ;
                    64     ;            EXTERNAL FLAG, REGISTER AND RAM DEFINITIONS
                    65     ;         (Definitions here are used by the Other Configurations
                    66     ;              Program and this Program Simultaneously)
                    67     ;
                    68     ;*****************************************************************
                    69     ;NOTE: Only definitions which are preceived to be used by the other code in
                    70     ; conjunction with this code are defined here.  It is the responsibility of
                    71     ; the engineer designing the other modules to not intrude upon the other
                    72     ; registers of this code when running in conjunction with it. (Serial Slave
                    73     ; configuration may want to use some of the routines used by the parallel
                    74     ; slave.)
                    75     ;
                    76     ;         Bit Addressable Flags (16 bytes maximum for parallel slave config,
                    77     ;                                but only uses 2 bytes)
 ----               78                     DSEG AT 20H
                    79     ;
                    80     PUBLIC   BIT_FLG1                  ;Overlapping Byte Definitions of the Bit
 0020               81     BIT_FLG1:             DS   1
                    82     PUBLIC   BIT_FLG2                  ; Addressable Fields used below
 0021               83     BIT_FLG2:             DS   1
                    84     ;
                    85     ;         Double Buffer Definitions for Master/Product Configuration
                    86     ;
                    87                     USING 0
                    88     ;
                    89     PUBLIC  PROD_BUF1_PTR_ADR  ; EQU AR4    ;Adr ptr for buf #1 data from/to prod
                    90     PUBLIC  PROD_BUF2_PTR_ADR  ; EQU AR5    ;Adr ptr for buf #2 data from/to prod
                    91     ;
                    92                     USING 1
                    93     ;
                    94     PUBLIC  BUF1_LOC1_ADR      ; EQU AR0    ;Product Buffer #1 first byte address
                    95     PUBLIC  BUF2_LOC1_ADR      ; EQU AR1    ;Product Buffer #2 first byte address
                    96     ;
                    97     EXTRN   NUMBER (MAS_BUF_LENGTH)      ;Buffer size for MASTER configuration
                    98     EXTRN   NUMBER (BUF1_MAS_START_ADR)  ;Buffer #1 starting address, and must equal
                    99                                          ; BUF1_START_ADR = 07FH
                   100     EXTRN   NUMBER (BUF2_MAS_START_ADR)  ;Buffer #2 starting address, and must equal
                   101                                          ; BUF1_MAS_START_ADR - MAS_BUF_LENGTH + 1
                   102     EXTRN   NUMBER (BUF_MAS_RAM_END_ADR) ;Last (+ 1) internal buf addr, & must equal
                   103                                          ; BUF2_MAS_START_ADR - MAS_BUF_LENGTH + 1
                   104     ;
 ----              105                     BSEG AT 00H
                   106     ;
                   107     PUBLIC  INIT_BUF_FLG              ; MEI still in initialization process, i.e.,
 0000              108     INIT_BUF_FLG:         DBIT 1      ; MEI don't have buffer # from INCON/MASTER
                   109     PUBLIC  BUF1_USER_FLG             ;Buffer #1 is used for RS232-C input (off is
 0001              110     BUF1_USER_FLG:        DBIT 1      ; used for slave input)
                   111     PUBLIC  BUF2_USER_FLG             ;Buffer #2 is used for RS232-C input (off is
 0002              112     BUF2_USER_FLG:        DBIT 1      ; used for slave input)
                   113     PUBLIC  BUF1_VALID_FLG            ;Buffer #1 contains valid information (full)
 0003              114     BUF1_VALID_FLG:       DBIT 1
                   115     PUBLIC  BUF2_VALID_FLG            ;Buffer #2 contains valid information (full)

LOC  OBJ           LINE    SOURCE 0004              116     BUF2_VALID_FLG:       DBIT 1
```

```
              117     PUBLIC  BUF1_ACTIVE_FLG        ;Buffer #1 is presently being used
0005          118     BUF1_ACTIVE_FLG:        DBIT 1
              119     PUBLIC  BUF2_ACTIVE_FLG        ;Buffer #2 is presently being used
0006          120     BUF2_ACTIVE_FLG:        DBIT 1
              121     ;
              122     ;       Master/Product Parameter Passing Flag and Registers Definitions
              123     ;
              124                     USING 2
              125     ;
              126     PUBLIC  PROD_QUEUE_START_ADR ; EQU AR6  ;Starting address of product cmd queue
              127     PUBLIC  PROD_QUEUE_END_ADR   ; EQU AR7  ;Last byte address of product cmd queue
              128     ;
              129                     USING 0
              130     ;
              131     PUBLIC  PROD_QUEUE_PTR_ADR ; EQU AR1    ;Adr ptr to prod cmd queue of current
              132                                             ; cmd
              133     PUBLIC  PROD_QUEUE_NXT_ADR ; EQU AR2    ;Adr ptr to prod cmd queue of last cmd
              134                                             ; in queue
              135     PUBLIC  PROD_TIMER_CNT_ADR ; EQU AR3    ;Adr ptr to product timeout cnter reg
              136     PUBLIC  BUF_NUM_ADR        ; EQU AR6    ;Which Buffer INCOM/MASTER wants is in
              137                                             ; lsn, the deadman seq reg is in msn
              138     PUBLIC  BUF_NUM_MASK       ; EQU 0FH    ; Mask for number of buffer is lsn
              139     ;
....          140                     BSEG
              141     ;
              142     PUBLIC  MAS_PASS_FLG           ;Direct Response From Product Valid Flag
0007          143     MAS_PASS_FLG:           DBIT 1
              144     ;
              145                     USING 3
              146     ;
              147     PUBLIC  MAS_PASS_ADR           ;Direct Response Parameter Loc as defined by
001E          148     MAS_PASS_ADR            EQU AR6 ; direct addressing (IC_WRK_ADR)
              149 +1  SEJECT
MCS-51 MACRO ASSEMBLER   MEI EXPANDED MODE SLAVE, Version 0.5

LOC  OBJ       LINE    SOURCE

150     ;*******************************************************************
               151     ;
               152     ;       MEI INTERFACE CARD STATUS DEFINED FOR THE SLAVE CONFIGURATIONS
               153     ;          (some bits may be used in the master configurations also)
               154     ;
               155     ;*******************************************************************
               156     ;
               157     ;       MEI Card Product Identification
               158     ;
               159     PUBLIC  MEI_INTFCE_NUM
00AA           160     MEI_INTFCE_NUM          EQU 0AAH ;Bits  7- 0 is the product MEI card number
               161     PUBLIC  MEI_SLAVE_VER_NUM
0006           162     MEI_SLAVE_VER_NUM       EQU 06H  ;Bits 15- 8 is the slave configuration version
               163     ;
               164     ;       MEI Card Internal Status  Bits 23-16 is the internal status
               165     ;          Note: _ACC definitions are used when Reg B is moved to ACC
               166     ;
               167     PUBLIC  MASTER_SLAVE_CONF
00F7           168     MASTER_SLAVE_CONF       BIT B.7  ;Master* / Slave Configuration (should always
               169                                      ;match port bit MASTER_SLAVE or will allow
               170                                      ; a reset to MEI card)
               171     PUBLIC  PAR_SER_CONF
00F6           172     PAR_SER_CONF            BIT B.6  ;Slave parallel* or serial configuration
               173                                      ;(should always match port bit SLAVE_PAR_SER
               174                                      ; or will allow a reset to MEI card)
```

```
                175      PUBLIC  SLAVE_SETUP_ERR
00F5            176      SLAVE_SETUP_ERR         BIT B.5   ;For Parallel conf, the initialization process
                177                                        ;   failed and thus no transactions to the prod
                178                                        ;   will occur (will not interface product)
                179                                        ;For Serial conf, the baud rate setting is
                180                                        ;   illegal and thus no transactions to prod
                181                                        ;   will occur (will not interface product)
                182      PUBLIC  PROD_INTFCE_ERR
00F4            183      PROD_INTFCE_ERR         BIT B.4   ;For Product, interface link failure or an
                184                                        ;   unexpected response command, is reset
                185                                        ;   after INCOM/MASTER reads interface status
                186      PUBLIC  PROD_TIMEOUT_ERR
00F3            187      PROD_TIMEOUT_ERR        BIT B.3   ;Timeout Error occurred for product, is reset
                188                                        ;   after INCOM/MASTER reads interface status
                189      PUBLIC  IC_HARD_ERR
00F2            190      IC_HARD_ERR             BIT B.2   ;INCOM interface setup was not in expected
                191                                        ;   transmit/receive mode, is reset after
                192                                        ;   INCOM reads interface status
                193      PUBLIC  IC_INTFCE_ERR
00F1            194      IC_INTFCE_ERR           BIT B.1   ;INCOM/MASTER interface link failure or an
                195                                        ;   unexpected response is reset after
                196                                        ;   INCOM/MASTER reads interface status
                197      PUBLIC  IC_BCH_IN_ERR
00F0            198      IC_BCH_IN_ERR           BIT B.0   ;INCOM reception had a BCH error since last
                199                                        ;   interface status reading, is reset after
                200                                        ;   INCOM/MASTER reads interface status
00E0            201      MEI_STAT_RES_MASK  EQU  11100000B ;Mask used to reset bits after INCOM/MASTER
                202                                        ;   reads MEI status (use AND function)
                203 +1   $EJECT MCS-51 MACRO ASSEMBLER      MEI EXPANDED MODE SLAVE, Version 0.5

LOC  OBJ        LINE     SOURCE

204      ;
                205      ;************************************************************
                206      ;
                207      ;                        PARAMETERS
                208      ;
                209      ;************************************************************
                210      ;
----            211              CSEG AT 0FFFH
                212      ;
0FFF 02         213      CODE_ROM_CHKSUM:        DB   002H      ;PROM checksum value for full code,
                214                                             ;   is placed in location 0FFFH.
                215
                216      ;
00FA            217      SP_TIMEOUT_CNT          EQU  250       ;Count for number of times the timeout
                218                                             ;   timer (0) interrupts for slave
                219                                             ;   parallel port error conditions
                220                                             ;   (this count cannot equal the values
                221                                             ;   0 or 1 because of timer jitter or
                222                                             ;   255 because of roller of counter)
                223      ;
                224      ;************************************************************
                225      ;
                226      ;                   PORT LOCATION DEFINITIONS
                227      ;
                228      ;************************************************************
                229      ;
                230      ;        Master Slave Configuration
                231      ;
00A7            232      MASTER_SLAVE            BIT  P2.7      ;MEI Master*/Slave Status
```

```
                        233                                      ; Master Mode = Low
0080                    234    TXD_IN          BIT  P3.0         ; Serial input (USART function)
0081                    235    RXD_OUT         BIT  P3.1         ; Serial output (USART function)
00A3                    236    RTS_IN          BIT  P2.3         ; Request To Send*
00A4                    237    CTS_OUT         BIT  P2.4         ; Clear To Send*
00A5                    238    DSR_OUT         BIT  P2.5         ; Data Set Ready*
00A6                    239    DTR_IN          BIT  P2.6         ; Data Terminal Ready*
00A0                    240    BAUD_BITS       EQU  P2           ; Serial link baud rate bits are on
0007                    241    BAUD_MASK       EQU  00000111B    ; Port 2 bits 0-2
0000                    242    BAUD_110_SEL    EQU  000B         ; Baud selection of 110     / Order
0001                    243    BAUD_300_SEL    EQU  001B         ; Baud selection of 300     | here
0002                    244    BAUD_600_SEL    EQU  010B         ; Baud selection of 600     | is
0003                    245    BAUD_1200_SEL   EQU  011B         ; Baud selection of 1200  < very
0004                    246    BAUD_2400_SEL   EQU  100B         ; Baud selection of 2400    | important
0005                    247    BAUD_4800_SEL   EQU  101B         ; Baud selection of 4800    | to
0006                    248    BAUD_9600_SEL   EQU  110B         ; Baud selection of 9600    | code
0007                    249    BAUD_ILLEGAL    EQU  111B         ; Baud selection illegal    \ below
0000                    250    BAUD_110        EQU  000H         ; Timer value, 112.5 baud rate setup
00A0                    251    BAUD_300        EQU  0A0H         ; Timer value, 300 baud rate setup
00D0                    252    BAUD_600        EQU  0D0H         ; Timer value, 600 baud rate setup
00E8                    253    BAUD_1200       EQU  0E8H         ; Timer value, 1200 baud rate setup
00F4                    254    BAUD_2400       EQU  0F4H         ; Timer value, 2400 baud rate setup
00FA                    255    BAUD_4800       EQU  0FAH         ; Timer value, 4800 baud rate setup
00FD                    256    BAUD_9600       EQU  0FDH         ; Timer value, 9600 baud rate setup
                        257    ;

MCS-51 MACRO ASSEMBLER    MEI EXPANDED MODE SLAVE, Version 0.5

LOC  OBJ                LINE   SOURCE

258                                      ;Slave Mode = High
0087                    259    SLAVE_PAR_SER   BIT  P3.7         ; Parallel*/Serial Status
                        260                                      ;    Parallel Mode = Low
0080                    261    PAR_DAT         EQU  P0           ;    Data Port (all 8 bits)
0091                    262    PAR_OUT_CD      BIT  P1.1         ;    Output Cont*/Data
0082                    263    PAR_OUT_ACK     BIT  P3.2         ;    Output Ack* (INTO w/ low
                        264                                      ;       priority)
0093                    265    PAR_OUT_STR     BIT  P1.3         ;    Output Str*
0090                    266    PAR_IN_CD       BIT  P1.0         ;    Input Cont*/Data
0092                    267    PAR_IN_ACK      BIT  P1.2         ;    Input Ack*
0086                    268    PAR_IN_STR      BIT  P3.6         ;    Input Str*
                        269                                      ;    Serial Mode = high
0080                    270    SERIAL_RXD      BIT  P3.0         ;    Serial input (USART function)
0081                    271    SERIAL_TXD      BIT  P3.1         ;    Serial output (USART function)
                        272    ;BAUD_BITS      EQU  P2           ;    Serial link baud rate bits are
                        273    ;BAUD_MASK      EQU  00001110B    ;       on Port 2 bits 3,2,1
                        274    ;
                        275    ;-----------------------------------------------------------------
                        276    ;
                        277    ;       INCOM IC Interface
                        278    ;
0083                    279    IC_INT          BIT  P3.3         ; Int from INCOM (Also INT1 w/ high
                        280                                      ;    priority)
0095                    281    IC_CLK          BIT  P1.5         ; Serial Clock output to INCOM
0094                    282    IC_DAT          BIT  P1.4         ; Serial Data output to INCOM
0096                    283    IC_RW           BIT  P1.6         ; Read/Write* control output to INCOM
0097                    284    IC_BUSY         BIT  P1.7         ; Busy* Status input from INCOM
0085                    285    IC_ACTIVITY_LED BIT  P3.5         ; LED on (when cleared) to indicate
                        286                                      ;   INCOM activity is being serviced
                        287    ;
                        288    ;-----------------------------------------------------------------
                        289    ;
                        290    ;       Reset Function
```

```
                  291    ;
0084              292    DEADMAN              BIT  P3.4         ;Deadman Strobe pulsed low
                  293    ;
                  294            USING 0
REG               295    DEADMAN_REG          EQU  R6           ;Deadman sequence storage register
0006              296    DEADMAN_ADR          EQU  AR6
00F0              297    DEADMAN_MASK         EQU  0F0H         ; this reg only uses upper nibble
0050              298    DEADMAN_NUM1         EQU  50H          ;Register values determining correct
0060              299    DEADMAN_NUM2         EQU  60H          ; program flow which will then strobe
00A0              300    DEADMAN_NUM3         EQU  0A0H         ; deadman (if same, strobe of deadman
                  301                                           ;    always occurs in run loop)
                  302 +1 $EJECT
MCS-51 MACRO ASSEMBLER   MEI EXPANDED MODE SLAVE, Version 0.5

LOC  OBJ          LINE   SOURCE

303    ;
                  304    ;************************************************************************
                  305    ;
                  306    ;                    RAM & FLAG DEFINITIONS
                  307    ;
                  308    ;************************************************************************
                  309    ;
                  310    ;        Initialization Locations
                  311    ;
                  312            USING 1
                  313    ;
000A              314    STACK_START_ADR      EQU  AR2 ;Stack beginning address at Register Bank 1,
                  315                                  ; R1 and ends at Register Bank 2, R3. The
                  316                                  ; maximum depth of stack for expanded mode
                  317                                  ; slave configuration is therefore 11 bytes
                  318    ;
                  319    ;--------------------------------------------------------------------
                  320    ;
                  321    ;       Double Buffer Definitions for Expanded Mode Slave Configuration
                  322    ;
0030              323    BUF_LENGTH           EQU  45           ;Buffer length. Note, actual buffer is one byte
                  324                                           ; less because first byte is stored in a reg.
007F              325    BUF1_START_ADR       EQU  07FH         ;Buffer #1 starting address, with buf length
0050              326    BUF2_START_ADR       EQU  (BUF1_START_ADR - BUF_LENGTH + 1)
                  327                                           ;Buffer #2 starting address, with buf length
0021              328    BUF_RAM_END_ADR      EQU  (BUF2_START_ADR - BUF_LENGTH + 1)
                  329                                           ;Last (+ 1) internal buffer RAM address
                  330    ;
....              331            BSEG
                  332    ;
0001              333    BUF1_FOR_IC_FLG      EQU  BUF1_USER_FLG ;Buffer #1 is used for INCOM input
                  334                                            ; (off is used for slave input)
0002              335    BUF2_FOR_IC_FLG      EQU  BUF2_USER_FLG ;Buffer #2 is used for INCOM input
                  336                                            ; (off is used for slave input)
                  337    ;
                  338 +1 $EJECT
MCS-51 MACRO ASSEMBLER   MEI EXPANDED MODE SLAVE, Version 0.5
LOC  OBJ          LINE   SOURCE 339    ;
                  340    ;************************************************************************
                  341    ;
                  342    ;                    PRODUCT PROTOCOL DEFINITIONS
                  343    ;
                  344    ;************************************************************************
```

```
              345   ;
              346   ;        Registers Defined For The Product Interface
              347   ;
              348           USING 0             ; Run Loop & Product Interrupts Uses Register Bank 0
              349                               ; Definitions of registers used
REG           350   WRK_PTR_REG         EQU R0  ;Working pointer register
REG           351   PROD_QUEUE_PTR_REG  EQU R1  ;Adr to prod cmd queue of current cmd
REG           352   PROD_QUEUE_NXT_REG  EQU R2  ;Adr to prod cmd queue of last cmd in queue
REG           353   PROD_TIMER_CNT_REG  EQU R3  ;Product timeout counter register
REG           354   PROD_BUF1_PTR_REG   EQU R4  ;Adr pnter for buffer #1 data from/to product
REG           355   PROD_BUF2_PTR_REG   EQU R5  ;Adr pnter for buffer #2 data from/to product
REG           356   BUF_NUM_REG         EQU R6  ;Which Buffer INCOM/MASTER wants in lsn, the
              357                               ; deadman sequence reg in msn
000F          358   BUF_NUM_MASK        EQU 0FH ; Mask for buf no. is lsn
REG           359   ROM_CHKSUM_REG      EQU R7  ;PROM checksum holding reg for calculations
              360   ;
              361                               ; Definitions of Registers Addresses
0000          362   WRK_PTR_ADR         EQU AR0 ;
0001          363   PROD_QUEUE_PTR_ADR  EQU AR1 ;
0002          364   PROD_QUEUE_NXT_ADR  EQU AR2 ;      see
0003          365   PROD_TIMER_CNT_ADR  EQU AR3 ;
0004          366   PROD_BUF1_PTR_ADR   EQU AR4 ;
0005          367   PROD_BUF2_PTR_ADR   EQU AR5 ;      above
0006          368   BUF_NUM_ADR         EQU AR6 ;
0007          369   ROM_CHKSUM_ADR      EQU AR7 ;
              370   ;
              371           USING 3
001F          372   TO_PROD_CNT_ADR     EQU AR7 ;Count register for data to product
              373   ;
              374           USING 1
0008          375   BUF1_LOC1_ADR       EQU AR0 ;Byte having the division code (product buffer
              376                               ; #1 first byte)
0009          377   BUF2_LOC1_ADR       EQU AR1 ;Byte having the division code (product buffer
              378                               ; #2 first byte)
              379   ;
              380           USING 2     ; These 4 registers are used for product queue
              381                       ;    in rotating queue fashion
0014          382   PROD_QUEUE_START_ADR EQU AR4 ;Starting address of queue
0017          383   PROD_QUEUE_END_ADR   EQU AR7 ;Last byte address of queue
              384   ;
              385   ;         Flags Defined For The Product Interface
              386   ;
....          387           BSEG
0008          388   PAR_IN_OUT_FLG:     DBIT 1  ;Slave Parallel flag indicating whether the MEI
              389                               ; is currently in the output (low) or input
              390                               ; mode
0009          391   PAR_OUT_STR_IMAGE_FLG: DBIT 1 ;Image flag of PAR_OUT_STR output port bit
0005          392   PAR_IN_ACK_IMAGE_FLG   EQU F0 ;Image flag of PAR_IN_ACK output port bit
```

MCS-51 MACRO ASSEMBLER    MEI EXPANDED MODE SLAVE, Version 0.5

```
LOC OBJ       LINE    SOURCE 000A          393   PAR_TO_START_OUT_FLG: DBIT 1 ;Must initialize an output to the product when
              394                                ; input handshake on this byte is complete
000B          395   PROD_CURRENT_BUF_FLG: DBIT 1 ;Indication of which buffer the product
              396                                ; interface is using (0 = Buffer #1)
000C          397   DAT_TOFROM_PROD_FLG:  DBIT 1 ;Prod will be receiving/sending data flag
              398   ;
              399   ;................................................................
              400   ;
              401   ;       Commands From The MEI Interface To The Product
              402   ;
```

```
0000            403     NOREQ_PCMD              EQU 00000000B   ;No request
000E            404     MPRES_PCMD              EQU 00001110B   ;MEI-to-Product Start-up or reset cmd
0010            405     WPCOD_PCMD              EQU 00010000B   ;Receive lower nibble as function code
                406                             ;                       from the INCOM/MASTER
0020            407     WPDAT_PCMD              EQU 00100000B   ;Receive # of bytes of info <in lower
                408                             ;                       nibble (+ 1)> from INCOM/MASTER
0090            409     WPCDR_PCMD              EQU 10010000B   ;Same as WPCOD Command except product
                410                             ;                       must reply with WPPLR status
00A0            411     WPDTR_PCMD              EQU 10100000B   ;Same as WPDAT Command except product
                412                             ;                       must reply with WPPLR status
00B0            413     WPSTA_PCMD              EQU 10110000B   ;Product to send division code and
                414                             ;                       product code/status
00C0            415     WPBUF_PCMD              EQU 11000000B   ;Product to pass all bytes of buffer #
                416                             ;                       <defined by lower nibble>
0070            417     WPDAT_WPDTR_PCMD_MASK   EQU 01110000B   ; Mask for determining WPDAT or WPDTR
                418     ;
                419     ;-----------------------------------------------------------------
                420     ;
                421     ;       Commands From The Product To The MEI Card
                422     ;
0080            423     WPRET_PCMD              EQU 10000000B   ;Return link control to MEI card
0090            424     WPPLR_PCMD              EQU 10010000B   ;Return link control to MEI card with
                425                             ;                       lower nibble of product status
00F0            426     WPPLR_PCMD_MASK         EQU 11110000B   ; Mask for determining WPPLR
                427 +1  SEJECT
MCS-51 MACRO ASSEMBLER    MEI EXPANDED MODE SLAVE, Version 0.5

LOC  OBJ           LINE    SOURCE

428     ;
                429     ;*****************************************************************
                430     ;
                431     ;               INCOM BUS PROTOCOL DEFINITIONS
                432     ;
                433     ;*****************************************************************
                434     ;
                435     ;
                436     ;       Registers Defined For The INCOM Interface
                437     ;
                438             USING 3         ; Uses Register Bank 3
                439                             ; Definitions of registers used
REG             440     IC_WRK_PTR_REG          EQU R0  ;Working pointer register
REG             441     IC_DAT_PTR_REG          EQU R1  ;Pointer to present data buffer used
REG             442     IC_DAT_CNT_REG          EQU R2  ;Count of data messages to input/output
REG             443     IC_REC_CONT3_REG        EQU R3  ;Received control bits 26-19
REG             444     IC_REC_CONT2_REG        EQU R4  ;Received control bits 18-11
REG             445     IC_REC_CONT1_REG        EQU R5  ;Received control bits 10-3
REG             446     IC_WRK_REG              EQU R6  ;Working Register
                447     ;
                448                             ; Definitions of registers addresses
0018            449     IC_WRK_PTR_ADR          EQU AR0 ;
0019            450     IC_DAT_PTR_ADR          EQU AR1 ;
001A            451     IC_DAT_CNT_ADR          EQU AR2 ;       see
001B            452     IC_REC_CONT3_ADR        EQU AR3 ;       above
001C            453     IC_REC_CONT2_ADR        EQU AR4 ;
001D            454     IC_REC_CONT1_ADR        EQU AR5 ;
001E            455     IC_WRK_ADR              EQU AR6 ;
                456     ;
                457     ;
                458     ;       Flags Defined For The INCOM Interface
                459     ;
....            460             BSEG
0007            461     IC_IS_OUT_FLG   EQU MAS_PASS_FLG ;INCOM is presently in output transmission
                462     ;                                       ; state
```

```
00           463   IC_SENT_ACK_FLG:      DBIT 1    ;INCOM has just finished xmission sequence
             464                                   ; and must turn around for input from master
             465                                   ; at xmit interrupt
0E           466   IC_EXP_DATIN_FLG:     DBIT 1    ;INCOM routine expects data to be received
0F           467   IC_DATIN_ERR_FLG:     DBIT 1    ;Present INCOM reception had an occurrence of
             468                                   ; a BCH error
             469   ;
             470   ;------------------------------------------------------------
             471   ;
             472   ;         INCOM Word Definitions
             473   ;
0003         474   EN_INTFCE             EQU  0011B   ; Enable Interface Instruction
0002         475   DIS_INTFCE            EQU  0010B   ; Disable Interface without Reply
0002         476   DIS_INTFCE_REPLY      EQU  0010B   ; Disable Interface with Reply
             477   ;
             478                                      ;Two Bit Slave Status
0003         479   SLAVE_STAT_MASK       EQU  0011B   ; Slave status mask for subcmd field
0000         480   SLAVE_OFF             EQU  00B     ; Off State
0001         481   SLAVE_ON              EQU  01B     ; On State
```

:-51 MACRO ASSEMBLER    MEI EXPANDED MODE SLAVE, Version 0.5

```
: OBJ          LINE   SOURCE 0002           482    SLAVE_TRIP            EQU  10B     ; Trip State
0003           483    SLAVE_ALARM           EQU  11B     ; Alarm State
               484    ;
               485    ;------------------------------------------------------------
               486    ;
               487    ;     Commands From The INCOM Master (4 bit field)
               488    ;
0000           489    SSAT_ICMD             EQU  0000B   ;Send status Command
0000           490    SSAT_PROD_2BIT_STAT   EQU  0000B   ; Product 2 bit status Subcommand
0001           491    SSAT_DC_PCS           EQU  0001B   ; Product division code & product
               492                                       ;     code/status Subcommand
0004           493    SSAT_FULL_BUF         EQU  0100B   ; Latest product full buffer Subcmd
0008           494    SSAT_MEI_STAT         EQU  1000B   ; MEI card status Subcommand
0009           495    SSAT_SOFT_RESET       EQU  1001B   ; MEI reset from master on network
0001           496    SSBS_ICMD             EQU  0001B   ;Send single buffer segment <defined by
               497                                       ;     subcommand field> Command
0002           498    SUBS_ICMD             EQU  0010B   ;Send buffer segments up to & including
               499                                       ;     <defined by subcmd field> Cmd
               500    ;
0008           501    RPBN_ICMD             EQU  1000B   ;Receive prod buffer # to be accessed
               502                                       ;     <defined by subcmd field> Cmd
0009           503    RPFC_ICMD             EQU  1001B   ;Receive cont code <defined by subcmd
               504                                       ;     field> for product cmd
000A           505    RPDM_ICMD             EQU  1010B   ;Rec # <defined by subcmd field> + 1
               506                                       ;     data messages for product Cmd
000D           507    RPFR_ICMD             EQU  1101B   ;Same Cmd as RPFC except MEI card is to
               508                                       ;     return status nibble from prod
000E           509    RPDR_ICMD             EQU  1110B   ;Same Cmd as RPDM except MEI card is to
               510                                       ;     return status nibble from prod
               511    ;
               512    ;------------------------------------------------------------
               513    ;
               514    ;     Commands Returned To The INCOM Master
               515    ;
0000           516    SMSS_ICMD             EQU  0000B   ;Stand-Alone Mode Slave status image
               517                                       ;     returned <in subcommand field>
               518                                       ;     Command
0001           519    CAEF_ICMD             EQU  0001B   ;ACK & error Command
0000           520    CAEF_ACK              EQU  0000B   ; Acknowledge Subcommand
```

```
0001            521     CAEF_NACK               EQU     0001B   ; Non-acknowledge Subcommand
0002            522     CAEF_REPEAT             EQU     0010B   ; Repeat request Subcommand
0003            523     CAEF_BCH_ERR            EQU     0011B   ; BCH error in transfer Subcommand
0004            524     CAEF_NEED_BUF           EQU     0100B   ; MEI card requires buffer segment #
                525                                             ;       Subcommand
0005            526     CAEF_BUF_NOT_AVAIL      EQU     0101B   ; Buf segment(s) requested by master
                527                                             ;       is presently not available
0006            528     CAEF_BUF_SMALL          EQU     0110B   ; Buf segment(s) requested by master
                529                                             ;       outside range of buf obtained
0008            530     CAEF_HARD_FAILURE       EQU     1000B   ; Hardware failure Subcommand
0009            531     CAEF_PD_NOT_RESPOND     EQU     1001B   ; Product device is not responding
                532                                             ;       Subcommand
0002            533     PRSP_ICMD               EQU     0010B   ;Prod device direct response returned
                534                                             ;       <in subcommand field> Command
                535 +1  SEJECT
MCS-51 MACRO ASSEMBLER   MEI EXPANDED MODE SLAVE, Version 0.5

LOC  OBJ            LINE    SOURCE

536     ;
                    537     ;************************************************************************
                    538     ;
                    539     ;                               PROGRAM
                    540     ; *
                    541     ;************************************************************************
                    542     ;
----                543             CSEG AT 0000H
                    544     START:
0000 012B           545             AJMP    INIT_START              ;Jump around interrupts
0002 00             546             DB      00H
                    547     ;
                    548     ;
0003                549             ORG     0003H                   ;Product Parallel Input Ack*
0003 30F702         550             JNB     MASTER_SLAVE_CONF,$ + 3 + 2 ; (External Int 0 but is set at Low
0006 615C           551             AJMP    PROD_ACK_SLAVE          ;  priority level)
0008 020000     F   552             LJMP    PROD_ACK_MASTER_LJMP
                    553     ;
                    554     ;
000B                555             ORG     000BH                   ;Timer 0 Overflow Interrupt
000B 30F702         556             JNB     MASTER_SLAVE_CONF,$ + 3 + 2
000E 6159           557             AJMP    TIMEOUT_INT_SLAVE
0010 020000     F   558             LJMP    TIMEOUT_INT_MASTER_LJMP
                    559     ;
                    560     ;
0013                561             ORG     0013H                   ;INCOM interrupt (External Int 1
0013 30F702         562             JNB     MASTER_SLAVE_CONF,$ + 3 + 2 ; but is only interrupt level with
0016 8194           563             AJMP    IC_INT_SLAVE            ;  high priority setting)
0018 020000     F   564             LJMP    IC_INT_MASTER_LJMP
                    565     ;
                    566     ;
001B                567             ORG     001BH
                    568                                             ;Timer 1 Overflow Int is never enabled
                    569     SERIAL_COUNT_VALUE:                     ; Therefore this area of code is for:
001B 00             570             DB      BAUD_110
001C A0             571             DB      BAUD_300                ; Table of Serial baud rate values
001D D0             572             DB      BAUD_600
001E E8             573             DB      BAUD_1200
001F F4             574             DB      BAUD_2400
0020 FA             575             DB      BAUD_4800
0021 FD             576             DB      BAUD_9600
0022 00             577             DB      00H
                    578     ;
0023                579             ORG     0023H                   ;Serial Port Interrupt
0023 30F702         580             JNB     MASTER_SLAVE_CONF,$ + 3 + 2
```

```
26 0100    F    581         AJMP    SER_PORT_SLAVE_LJMP
2B 020000  F    582         LJMP    SER_PORT_MASTER_LJMP
                583     ;
                584     ;..............................................................
                585 +1  SEJECT
```

:S-51 MACRO ASSEMBLER    MEI EXPANDED MODE SLAVE, Version 0.5

C OBJ           LINE    SOURCE

```
                586     ; At RESET, the controller contains:
                587     ;    PC              0000H
                588     ;    ACC,PSW         00H
                589     ;    B               00H
                590     ;    SP              07H
                591     ;    DPTR            0000H
                592     ;    P0,P1,P2,P3     0FFH
                593     ;    IP              XXX00000B
                594     ;       Bit 4   PS  = Serial port low priority interrupt
                595     ;           3   PT1 = Timer 1 low priority interrupt
                596     ;           2   PX1 = External Int 1 low priority interrupt
                597     ;           1   PT0 = Timer 0 low priority interrupt
                598     ;           0   PX0 = External Int 0 low priority interrupt
                599     ;    IE              0XX00000B
                600     ;       Bit 7   EA  = Disable all interrupts
                601     ;           4   ES  = Serial Port interrupt disable
                602     ;           3   ET1 = Timer 1 Overflow interrupt disable
                603     ;           2   EX1 = External Interrupt 1 disable
                604     ;           1   ET0 = Timer 0 Overflow interrupt disable
                605     ;           0   EX0 = External Interrupt 0 disable
                606     ;    TCON            00000000B
                607     ;       Bit 7   TF1 = Timer 1 overflow flag reset
                608     ;           6   TR1 = Timer 1 run control off
                609     ;           5   TF0 = Timer 0 overflow flag reset
                610     ;           4   TR0 = Timer 0 run control off
                611     ;           3   IE1 = External int 1 edge flag reset
                612     ;           2   IT1 = External int 1 low level triggered
                613     ;           1   IE0 = External int 0 edge flag reset
                614     ;           0   IT0 = External int 0 low level triggered
                615     ;    TMOD            00000000B
                616     ;       Bit 7   GATE = Timer 1 enabled when TR1 is set
                617     ;           6   C/T  = Timer/Counter 1 set to timer
                618     ;           5,4 M1,M0 = Timer 1 mode is 13 bit counter
                619     ;           3   GATE = Timer 0 enabled when TR0 is set
                620     ;           2   C/T  = Timer/Counter 0 set to timer
                621     ;           1,0 M1,M0 = Timer 0 mode is 13 bit counter
                622     ;    TH0,TL0,TH1,TL1 00H,00H
                623     ;    SCON            00000000B
                624     ;       Bit 7,6 SM0,SM1 = Serial Port shift register mode
                625     ;           5   SM2. = Multiprocessor comm feature off
                626     ;           4   REN  = Disable serial reception
                627     ;           3   TB8  = 9th data bit to be xmitted  low
                628     ;           2   RB8  = 9th data bit for reception
                629     ;           1   TI   = Transmit interrupt flag reset
                630     ;           0   RI   = Receive interrupt flag reset
                631     ;    SBUF            Undefined
                632     ;    PCON            0XXX0000B       <not bit addressable>
                633     ;       Bit 7   SMOD = Double baud rate mode off
                634     ;           3   GF1  = General purpose flag
                635     ;           2   GF0  = General purpose flag
                636     ;           1   PD   = Power Down is de-active
                637     ;           0   IDL  = Idle mode is de-active
                638 +1  SEJECT
```

MCS-51 MACRO ASSEMBLER    MEI EXPANDED MODE SLAVE, Version 0.5

```
LOC  OBJ          LINE   SOURCE

639                        ;Initialization for Expanded Mode Slave
                  640          USING  0      ;   Uses Register Bank 0
                  641                        ;
                  642   INIT_START:
002B 758109       643          MOV    SP,#(STACK_START_ADR) - 1 ;Stack pointer
002E C295         644          CLR    IC_CLK              ;INCOM clock kept low
0030 E4           645          CLR    A
0031 F5F0         646          MOV    B,A                 ;clear flags and registers
0033 782F         647          MOV    R0,#2FH
                  648   INIT_CLEAR_FLGS:
0035 F6           649          MOV    @R0,A
0036 D8FD         650          DJNZ   R0,INIT_CLEAR_FLGS
                  651   ;
0038 A287         652          MOV    C,SLAVE_PAR_SER     ;Setup slave device status flag and
003A 92F6         653          MOV    PAR_SER_CONF,C      ;  cmd queue for product device
003C 7914         654          MOV    PROD_QUEUE_PTR_REG,#PROD_QUEUE_START_ADR
003E 7A14         655          MOV    PROD_QUEUE_NXT_REG,#PROD_QUEUE_START_ADR
0040 A2A7         656          MOV    C,MASTER_SLAVE      ;Setup master/slave status flag
0042 92F7         657          MOV    MASTER_SLAVE_CONF,C
                  658                                     ;If master device, setup serial port
0044 5003         659          JNC    INIT_MASTER_SERIAL_SETUP
0046 30F645       660          JNB    PAR_SER_CONF,INIT_SPAR ;If serial slave, setup port
                  661   ;
                  662   INIT_MASTER_SERIAL_SETUP:         ;Setup Serial Port
0049 E5A0         663          MOV    A,BAUD_BITS         ;  Get baud rate bits
004B 5407         664          ANL    A,#BAUD_MASK
004D B40705       665          CJNE   A,#BAUD_ILLEGAL,INIT_SERIAL_BAUD_OK
0050 30F7FD       666          JNB    MASTER_SLAVE_CONF,$ ;  Illegal baud rate:
                  667                                     ;    Master halts 8051 with interrupts
                  668                                     ;      already disabled
0053 D2F5         669          SETB   SLAVE_SETUP_ERR     ;    Slave sets status and don't talk
                  670                                     ;      to product
                  671   INIT_SERIAL_BAUD_OK:
0055 758921       672          MOV    TMOD,#00100001B     ;  Timer 1 is 8 bit auto reload timer
                  673                                     ;  Timer 0 is 16 bit timer
0058 90001A       674          MOV    DPTR,#SERIAL_COUNT_VALUE - 1
005B 93           675          MOVC   A,@A+DPTR           ;  Get timer (baud rate) settings
005C F58D         676          MOV    TH1,A               ;  High byte of timer
005E F58B         677          MOV    TL1,A               ;   (low byte also just to start)
                  678                                     ;  SMOD remains off
0060 759808       679          MOV    SCON,#11011000B     ;  Serial setup = 9-bit UART
                  680                                     ;   (TB8 is used as a 2nd stop
                  681                                     ;    bit, which is active high)
0063 D28E         682          SETB   TR1                 ;  Start timer 1 (baud rate gen)
0065 20F703       683          JB     MASTER_SLAVE_CONF,INIT_SSER
0068 020000   F   684          LJMP   INIT_MASTER_LJMP
                  685   INIT_SSER:                        ;Don't initial serial interrupt
006B 20F51E       686          JB     SLAVE_SETUP_ERR,INIT_DONE_PREJMP ;  If wrong baud rate
006E C299         687          CLR    TI                  ;Initialize the serial port incase 8051
0070 7803         688          MOV    WRK_PTR_REG,#3      ;  is initializing after deadman
                  689   INIT_SS_PROD:                     ; If slave device, output 3 reset
0072 75990E       690          MOV    SBUF,#MPRES_PCMD    ;  to product device
0075 3099FD       691          JNB    TI,$
0078 C299         692          CLR    TI
```

S-51 MACRO ASSEMBLER    MEI EXPANDED MODE SLAVE, Version 0.5

```
C  OBJ           LINE     SOURCE

7A C284          693              CLR     DEADMAN                      ;       must strobe deadman in this
7C D284          694              SETB    DEADMAN                      ;          loop
7E D8F2          695              DJNZ    WRK_PTR_REG,INIT_SS_PROD
80 7700          696              MOV     @PROD_QUEUE_PTR_REG,#NOREQ_PCMD
82 8799          697              MOV     SBUF,@PROD_QUEUE_PTR_REG     ; Transmit no request to prod device
84 E599          698              MOV     A,SBUF                       ; Clear recieve buffer
86 C298          699              CLR     RI                           ;    and receive interrupt
88 D29C          700              SETB    REN                          ;    and enable serial reception
8A D2AC          701              SETB    ES                           ; Enable serial port interrupt
                 702     INIT_DONE_PREJMP:
8C 2128          703              AJMP    INIT_DONE
                 704     ;
                 705     INIT_SPAR:                                    ;Setup Parallel Slave Port
8E 758911        706              MOV     TMOD,#00010001B              ; Timers are both 16 bit timer
                 707     INIT_MASTER_SPAR_RET:                         ; For master configuration, check if
91 30F602        708              JNB     PAR_SER_CONF,INIT_SP_ANOTHER_IN ;  no product device exists
94 212E          709              AJMP    INIT_DONE2
                 710     INIT_SP_ANOTHER_IN:                           ; Reset the parallel port incase 8051
96 D288          711              SETB    IT0                          ; Parallel ACK* input int edge trigger
98 E4            712              CLR     A                            ;    is initializing after deadman
99 F58C          713              MOV     TH0,A                        ; Setup timeout timer (0 used here)
9B F58A          714              MOV     TL0,A
9D D28C          715              SETB    TR0                          ;   start timer 0
                 716     INIT_SPAR2:                                   ; Check is prod sending
9F 30800C        717              JNB     TF0,INIT_SPAR3
A2 C28D          718              CLR     TF0                          ;      (reset timer 0 interrupt)
A4 04            719              INC     A
A5 C284          720              CLR     DEADMAN                      ;       must strobe deadman in this
A7 D284          721              SETB    DEADMAN                      ;          loop
A9 B4FAF3        722              CJNE    A,#SP_TIMEOUT_CNT,INIT_SPAR2
AC 8028          723              SJMP    INIT_SP_NOT_ACTIVE           ; No, timeout w/o str
                 724     INIT_SPAR3:
AE 20B6EE        725              JB      PAR_IN_STR,INIT_SPAR2
                 726                                                   ; Yes, Get information
B1 E580          727              MOV     A,PAR_DAT                    ;     Data to Accumulator
B3 A290          728              MOV     C,PAR_IN_CD                  ;     Control*/Data bit in Carry
B5 C292          729              CLR     PAR_IN_ACK                   ;     Activate PAR_IN_ACK
B7 7800          730              MOV     WRK_PTR_REG,#00              ;     Setup timeout timer
                 731     INIT_SPIN_ACK_LOOP:
B9 208613        732              JB      PAR_IN_STR,INIT_SPIN_ACK_DEACTIVE ;Check if PAR_IN_STR
BC 308DFA        733              JNB     TF0,INIT_SPIN_ACK_LOOP       ; is de-active
BF C28D          734              CLR     TF0                          ;     (reset timer 0 interrupt)
C1 08            735              INC     WRK_PTR_REG
C2 C284          736              CLR     DEADMAN                      ;       must strobe deadman in this
C4 D284          737              SETB    DEADMAN                      ;          loop
C6 B8FAF0        738              CJNE    WRK_PTR_REG,#SP_TIMEOUT_CNT,INIT_SPIN_ACK_LOOP
C9 D292          739              SETB    PAR_IN_ACK
CB D2F5          740              SETB    SLAVE_SETUP_ERR              ; Fatal error in parallel interface
                 741                                                   ;    don't set it up !!!!
CD 8044          742              SJMP    INIT_SP_INTFCE_ERR
                 743     INIT_SPIN_ACK_DEACTIVE:
CF D292          744              SETB    PAR_IN_ACK                   ;De-activate Ack to product
                 745     INIT_SP_NOT_FATAL_SETUP:
D1 40C5          746              JC      INIT_SP_ANOTHER_IN + 2       ;    Data or control
```

MCS-51 MACRO ASSEMBLER    MEI EXPANDED MODE SLAVE, Version 0.5

| LOC OBJ | LINE | SOURCE | | | |
|---|---|---|---|---|---|
| 0003 30E7C2 | 747 | | JNB | ACC.7,INIT_SP_ANOTHER_IN + 2 | ; Control, return mastership ? |
| | 748 | INIT_SP_NOT_ACTIVE: | | | |
| 0006 D2A8 | 749 | | SETB | EX0 | |
| 0008 770E | 750 | | MOV | @PROD_QUEUE_PTR_REG,#MPRES_PCMD | ; Tell product device MEI has |
| 000A 8780 | 751 | | MOV | PAR_DAT,@PROD_QUEUE_PTR_REG | ;    reset |
| 000C C291 | 752 | | CLR | PAR_OUT_CD | |
| 000E C293 | 753 | | CLR | PAR_OUT_STR | ;Strobe control line to product |
| 00E0 C209 | 754 | | CLR | PAR_OUT_STR_IMAGE_FLG | |
| 00E2 7800 | 755 | | MOV | WRK_PTR_REG,#00 | |
| | 756 | INIT_SP_OUT_STR_LOOP: | | | |
| 00E4 30820F | 757 | | JNB | PAR_OUT_ACK,INIT_SP_OUT_STR_DEACTIVE | ;Check if PAR_OUT_ACK |
| 00E7 308DFA | 758 | | JNB | TF0,INIT_SP_OUT_STR_LOOP | ;  is active |
| 00EA C28D | 759 | | CLR | TF0 | ;  (reset timer 0 interrupt) |
| 00EC 08 | 760 | | INC | WRK_PTR_REG | |
| 00ED C2B4 | 761 | | CLR | DEADMAN | ;    must strobe deadman in this |
| 00EF D2B4 | 762 | | SETB | DEADMAN | ;      loop |
| 00F1 B8FAF0 | 763 | | CJNE | WRK_PTR_REG,#SP_TIMEOUT_CNT,INIT_SP_OUT_STR_LOOP | |
| 00F4 801D | 764 | | SJMP | INIT_SP_INTFCE_ERR | ;Prod not reset correctly, set link |
| | 765 | INIT_SP_OUT_STR_DEACTIVE: | | | ; error |
| 00F6 C2B9 | 766 | | CLR | IE0 | ;Reset PAR_ACK interrupt bit |
| 00F8 7580FF | 767 | | MOV | PAR_DAT,#0FFH | |
| 00FB D291 | 768 | | SETB | PAR_OUT_CD | |
| 00FD D293 | 769 | | SETB | PAR_OUT_STR | ;De-activate Strobe to product |
| 00FF D209 | 770 | | SETB | PAR_OUT_STR_IMAGE_FLG | |
| 0101 7800 | 771 | | MOV | WRK_PTR_REG,#00 | |
| | 772 | INIT_SP_OUT_ACK_LOOP2: | | | |
| 0103 208211 | 773 | | JB | PAR_OUT_ACK,INIT_SP_DONE | ;Check if PAR_OUT_ACK is |
| 0106 308DFA | 774 | | JNB | TF0,INIT_SP_OUT_ACK_LOOP2 | ; de-active |
| 0109 C28D | 775 | | CLR | TF0 | ;  (reset timer 0 interrupt) |
| 010B 08 | 776 | | INC | WRK_PTR_REG | |
| 010C C2B4 | 777 | | CLR | DEADMAN | ;    must strobe deadman in this |
| 010E D2B4 | 778 | | SETB | DEADMAN | ;      loop |
| 0110 B8FAF0 | 779 | | CJNE | WRK_PTR_REG,#SP_TIMEOUT_CNT,INIT_SP_OUT_ACK_LOOP2 | |
| | 780 | INIT_SP_INTFCE_ERR: | | | ;Prod not reset correctly, set link |
| 0113 D2F3 | 781 | | SETB | PROD_TIMEOUT_ERR | ; and timeout error flags |
| 0115 D2F4 | 782 | | SETB | PROD_INTFCE_ERR | |
| | 783 | INIT_SP_DONE: | | | |
| 0117 C28C | 784 | | CLR | TR0 | ; stop timer 0 |
| 0119 C28D | 785 | | CLR | TF0 | ;   and reset it's interrupt |
| 011B 758C00 | 786 | | MOV | TH0,#00 | ; Setup timeout timer |
| 011E 758A00 | 787 | | MOV | TL0,#00 | |
| 0121 D28C | 788 | | SETB | TR0 | ; Start timer 0 |
| 0123 D2A9 | 789 | | SETB | ET0 | ; Enable timer 0 interrupt |
| 0125 30F704 | 790 | | JNB | MASTER_SLAVE_CONF,INIT_DONE2 - 2 | |
| | 791 | ; | | | |
| | 792 | INIT_DONE: | | | |
| 0128 D2BA | 793 | | SETB | PX1 | ;External Int (INCOM) to high priority |
| 012A D2AA | 794 | | SETB | EX1 | ;External Int (INCOM) enable bit |
| 012C 7800 | 795 | | MOV | PROD_TIMER_CNT_REG,#00H | |
| | 796 | INIT_DONE2: | | | |
| 012E C2A8 | 797 | | CLR | ET1 | ;Disable timer 1 interrupt |
| 0130 7E50 | 798 | | MOV | DEADMAN_REG,#DEADMAN_NUM1 | ;Setup deadman and ROM checksum tests |
| 0132 900000 | 799 | | MOV | DPTR,#START | |
| 0135 7F00 | 800 | | MOV | ROM_CHKSUM_REG,#0 | |

MCS-51 MACRO ASSEMBLER    MEI EXPANDED MODE SLAVE, Version 0.5

| LOC OBJ | LINE | SOURCE | | | |
|---|---|---|---|---|---|
| 0137 20F611 | 801 | | JB | PAR_SER_CONF,SRUN_LOOP - 2 | ;Parallel Product configuration ? |
| 013A 20F50E | 802 | | JB | SLAVE_SETUP_ERR,SRUN_LOOP - 2 | ; Fatal error in parallel |
| | 803 | | | | ; setup, don't talk to product |

```
130 7700        804         MOV     @PROD_QUEUE_PTR_REG,#NOREQ_PCND
13F 8780        805         MOV     PAR_DAT,@PROD_QUEUE_PTR_REG ; Tell product device MEI nothing
141 C291        806         CLR     PAR_OUT_CD                 ;   to do (i.e., idle)
143 C293        807         CLR     PAR_OUT_STR                ; Strobe control line to product
145 C209        808         CLR     PAR_OUT_STR_IMAGE_FLG
147 D2D5        809         SETB    PAR_IN_ACK_IMAGE_FLG
149 D2A8        810         SETB    EX0                        ; Enable prod ACK interrupt (external
                811                                            ;   int 0 with low priority)
                812     ;
                813     ;...........................................................................
                814 +1  $EJECT
5-51 MACRO ASSEMBLER    MEI EXPANDED MODE SLAVE, Version 0.5

C  OBJ          LINE    SOURCE

815                                     ;Run Loop for Expanded Mode Slave
                816             USING   0               ;    Uses Register Bank 0
                817     ;
48 D2AF         818             SETB    EA              ;Enable selected Interrupts
                819     SRUN_LOOP:
4D 30A705       820             JNB     MASTER_SLAVE,$ + 3 + 5      ;Port configuration inputs must equal
50 30F710       821             JNB     MASTER_SLAVE_CONF,SRUN_HARD_CONF_ERR  ; stored status
53 8003         822             SJMP    SRUN_HARD_CONF_2TEST                 ; setting
55 20F708       823             JB      MASTER_SLAVE_CONF,SRUN_HARD_CONF_ERR
                824     SRUN_HARD_CONF_2TEST:
58 308705       825             JNB     SLAVE_PAR_SER,$ + 3 + 5
5B 30F605       826             JNB     PAR_SER_CONF,SRUN_HARD_CONF_ERR
5E 8007         827             SJMP    SRUN_NO_HARD_ERR
160 30F604      828             JNB     PAR_SER_CONF,SRUN_NO_HARD_ERR
                829     SRUN_HARD_CONF_ERR:
163 C2AF        830             CLR     EA              ;Fatal error, halt processing with the
165 80FE        831             SJMP    $               ;  interrupts disabled (to allow reset)
                832     SRUN_NO_HARD_ERR:
167 EE          833             MOV     A,DEADMAN_REG
168 54F0        834             ANL     A,#DEADMAN_MASK
16A B45006      835             CJNE    A,#DEADMAN_NUM1,SRUN_ROM_CHKSUM_LOOP
16D 53060F      836             ANL     DEADMAN_ADR,#(NOT DEADMAN_MASK)
170 430660      837             ORL     DEADMAN_ADR,#DEADMAN_NUM2
                838     SRUN_ROM_CHKSUM_LOOP:           ;PROM checksum test
173 E4          839             CLR     A               ; Only checks 03FH segment of PROM
174 93          840             MOVC    A,@A+DPTR       ; contents each time thru loop
175 2F          841             ADD     A,ROM_CHKSUM_REG
176 FF          842             MOV     ROM_CHKSUM_REG,A
177 A3          843             INC     DPTR
178 E582        844             MOV     A,DPL
17A 543F        845             ANL     A,#03FH
17C 602A        846             JZ      SRUN_DEADMAN_CHK_STR
17E E583        847             MOV     A,DPH
180 B40FF0      848             CJNE    A,#(HIGH (0FFFH)),SRUN_ROM_CHKSUM_LOOP
183 E582        849             MOV     A,DPL
185 B4FFEB      850             CJNE    A,#(LOW (0FFFH)),SRUN_ROM_CHKSUM_LOOP
188 E4          851             CLR     A
189 93          852             MOVC    A,@A+DPTR
18A 900000      853             MOV     DPTR,#START
18D 850710      854             CJNE    A,ROM_CHKSUM_ADR,SRUN_ROM_CHKSUM_ERR
190 7F00        855             MOV     ROM_CHKSUM_REG,#0
192 EE          856             MOV     A,DEADMAN_REG
193 54F0        857             ANL     A,#DEADMAN_MASK
195 B4601A      858             CJNE    A,#DEADMAN_NUM2,SRUN_MASTER_CONF
198 53060F      859             ANL     DEADMAN_ADR,#(NOT DEADMAN_MASK)
19B 430650      860             ORL     DEADMAN_ADR,#DEADMAN_NUM1
19E 800E        861             SJMP    SRUN_DEADMAN_STR2
                862     SRUN_ROM_CHKSUM_ERR:
```

```
01A0 7F00              863            MOV   ROM_CHKSUM_REG,#0
01A2 53060F            864            ANL   DEADMAN_ADR,#(NOT DEADMAN_MASK)
01A5 4306A0            865            ORL   DEADMAN_ADR,#DEADMAN_NUM3
                       866     SRUN_DEADMAN_CHK_STR:
01A8 EE                867            MOV   A,DEADMAN_REG
01A9 54F0              868            ANL   A,#DEADMAN_MASK

MCS-51 MACRO ASSEMBLER        MEI EXPANDED MODE SLAVE, Version 0.5
LOC  OBJ              LINE     SOURCE 01AB B46004            869            CJNE  A,#DEADMAN_NUM2,SRUN_MASTER_CONF
                       870     SRUN_DEADMAN_STR2:
01AE C2B4              871            CLR   DEADMAN                     ;If all is OK thru loop, toggle
01B0 D2B4              872            SETB  DEADMAN                     ; deadman strobe
                       873     SRUN_MASTER_CONF:                        ;Master device configuration ?
01B2 20F703            874            JB    MASTER_SLAVE_CONF,MASTER_RUN_LOOP_RET
01B5 020000    F       875            LJMP  MASTER_RUN_LOOP
                       876     MASTER_RUN_LOOP_RET:
01B8 A2F6              877            MOV   C,PAR_SER_CONF              ; Check if not parallel product or
01BA 72F5              878            ORL   C,SLAVE_SETUP_ERR           ; if fatal error in product setup
01BC 408F              879            JC    SRUN_LOOP
                       880     SRUN_SPAR:
01BE 200873            881            JB    PAR_IN_OUT_FLG,SPIN         ;Par prod output or input mode ?
                       882     SPOT:
01C1 300907            883            JNB   PAR_OUT_STR_IMAGE_FLG,SPIO_TIMEOUT_CHK ;Output str is active,
                       884                                              ; int should handle ACK
01C4 30B204            885            JNB   PAR_OUT_ACK,SPIO_TIMEOUT_CHK ;Input, check if ack is deactivated
                       886                                              ; (if so, interrupt will process)
01C7 D2B9              887            SETB  IE0                         ;Go to PROD ACK interrupt routine
                       888     SPOT_TIMEOUT_RET:
01C9 2149              889            AJMP  SRUN_LOOP - 4
                       890     SPIO_TIMEOUT_CHK:
01CB C2A8              891            CLR   EX0                         ;Disable PROD ACK int during test
01CD EB                892            MOV   A,PROD_TIMER_CNT_REG        ;Output, check timeout (note: interrupt
01CE 2405              893            ADD   A,#(NOT SP_TIMEOUT_CNT)     ; will process information)
01D0 50F7              894            JNC   SPOT_TIMEOUT_RET
                       895     SPIO_TIMEOUT:                            ; Timeout
01D2 E7                896            MOV   A,@PROD_QUEUE_PTR_REG       ;    Check if previous cmd was a
01D3 54F0              897            ANL   A,#0FOH                     ;    return INCOM/MASTER info req
01D5 B49002            898            CJNE  A,#PCDR_PCMD,$ + 3 + 2
01D8 8020              899            SJMP  SPIO_TIMEOUT_WPDAT
01DA B4A002            900            CJNE  A,#PDTR_PCMD,$ + 3 + 2
01DD 801B              901            SJMP  SPIO_TIMEOUT_WPDAT
01DF A802              902            MOV   WRK_PTR_REG,PROD_QUEUE_NXT_ADR ; Is a INCOM/MASTER info request
01E1 E6                903            MOV   A,@WRK_PTR_REG              ;    in the queue ?
01E2 54F0              904            ANL   A,#0FOH                     ;    (would be at end of queue)
01E4 B49002            905            CJNE  A,#PCDR_PCMD,$ + 3 + 2
01E7 8003              906            SJMP  $ + 2 + 3
01E9 B4A01A            907            CJNE  A,#PDTR_PCMD,SPIO_TIMEOUT_RES
01EC AA01              908            MOV   PROD_QUEUE_NXT_REG,PROD_QUEUE_PTR_ADR ; Yes, flush queue & reset
01EE 100103            909            JBC   BUF1_FOR_IC_FLG,SPIO_TO_BUF1_RES     ;    INCOM/MASTER flags
01F1 100204            910            JBC   BUF2_FOR_IC_FLG,SPIO_TO_BUF2_RES     ;    (note: _FOR_IC_FLG
                       911     SPIO_TO_BUF1_RES:                        ;           =  _USER_FLG)
01F4 C203              912            CLR   BUF1_VALID_FLG
01F6 8002              913            SJMP  SPIO_TIMEOUT_WPDAT
                       914     SPIO_TO_BUF2_RES:
01F8 C204              915            CLR   BUF2_VALID_FLG
                       916     SPIO_TIMEOUT_WPDAT:                      ; For Direct Response Cmd
01FA 751E00            917            MOV   IC_WRK_ADR,#00              ;   then pass error parameter
01FD 30F704            918            JNB   MASTER_SLAVE_CONF,$ + 3 + 4
0200 D2B9              919            SETB  IE1                         ;   and force INCOM interrupt
0202 8002              920            SJMP  SPIO_TIMEOUT_RES
0204 D207              921            SETB  MAS_PASS_FLG                ;   or set MASTER polling done
                       922     SPIO_TIMEOUT_RES:
```

:S-51 MACRO ASSEMBLER    MEI EXPANDED MODE SLAVE, Version 0.5

| :C OBJ | LINE | SOURCE | | | |
|---|---|---|---|---|---|
| 206 7700 | 923 | | MOV | @PROD_QUEUE_PTR_REG,#NOREQ_PCMD | ; reset this cmd, and |
| 208 7800 | 924 | | MOV | PROD_TIMER_CNT_REG,#00 | ;       reset timeout timer |
| 20A D2F3 | 925 | | SETB | PROD_TIMEOUT_ERR | ;       set error flags and reset |
| 20C D2F4 | 926 | | SETB | PROD_INTFCE_ERR | |
| 20E 300C17 | 927 | | JNB | DAT_TOFROM_PROD_FLG,SPIO_TIMEOUT_RET_TEST | |
| 211 C20C | 928 | | CLR | DAT_TOFROM_PROD_FLG | |
| 213 C2AF | 929 | | CLR | EA | |
| 215 300809 | 930 | | JNB | PROD_CURRENT_BUF_FLG,SPIO_RES_BUF1 | ; buffers |
| 218 200200 | 931 | | JB | BUF2_FOR_IC_FLG,SPIO_TIMEOUT_RET_TEST | |
| 21B C206 | 932 | | CLR | BUF2_ACTIVE_FLG | |
| 21D C204 | 933 | | CLR | BUF2_VALID_FLG | |
| 21F 8007 | 934 | | SJMP | SPIO_TIMEOUT_RET_TEST | |
| | 935 | SPIO_RES_BUF1: | | | |
| 221 200104 | 936 | | JB | BUF1_FOR_IC_FLG,SPIO_TIMEOUT_RET_TEST | |
| 224 C205 | 937 | | CLR | BUF1_ACTIVE_FLG | |
| 226 C203 | 938 | | CLR | BUF1_VALID_FLG | |
| | 939 | SPIO_TIMEOUT_RET_TEST: | | | ;For failure mode -- |
| 228 30089E | 940 | | JNB | PAR_IN_OUT_FLG,SPOT_TIMEOUT_RET | |
| 22B 30059B | 941 | | JNB | PAR_IN_ACK_IMAGE_FLG,SPOT_TIMEOUT_RET | ; wait forever if input |
| 22E D2A8 | 942 | | SETB | EX0 | ;        str don't go deactive |
| 230 D2AF | 943 | | SETB | EA | ; try another output if it don't go |
| 232 612C | 944 | | AJMP | SPIN_OUT_NEW_PCMD | ;        active |
| | 945 | SPIN: | | | ;Input parallel prod routine |
| 234 300505 | 946 | | JNB | PAR_IN_ACK_IMAGE_FLG,SPIN_DEACTIVE_TEST | |
| 237 308607 | 947 | | JNB | PAR_IN_STR,SPIN_STR | ; Any str yet ? |
| 23A 808F | 948 | | SJMP | SPIO_TIMEOUT_CHK | ; No, check timeout of active edge |
| | 949 | SPIN_DEACTIVE_TEST: | | | ; Strobe reset yet ? |
| 23C 208656 | 950 | | JB | PAR_IN_STR,SPIN_CYCLE_DONE | |
| 23F 808A | 951 | | SJMP | SPIO_TIMEOUT_CHK | ; No, check timeout of deactive edge |
| | 952 | SPIN_STR: | | | |
| 241 E580 | 953 | | MOV | A,PAR_DAT | ; Yes, Get data from port |
| 243 A290 | 954 | | MOV | C,PAR_IN_CD | |
| 245 C292 | 955 | | CLR | PAR_IN_ACK | |
| 247 C205 | 956 | | CLR | PAR_IN_ACK_IMAGE_FLG | ;     Set input ack status |
| 249 7800 | 957 | | MOV | PROD_TIMER_CNT_REG,#00H | ;     reset timeout timer |
| 24B 5055 | 958 | | JNC | SPIN_CONT | ; Data input or control ? |
| | 959 | | | | ;    Data byte is returned |
| | 960 | SPIN_DAT: | | | |
| 24D 300C2B | 961 | | JNB | DAT_TOFROM_PROD_FLG,SPIN_ERR | ;Not expecting data! |
| 250 200819 | 962 | | JB | PROD_CURRENT_BUF_FLG,SPIN_BUF2 | |
| 253 30F705 | 963 | | JNB | MASTER_SLAVE_CONF,$ + 3 + 5 | |
| 256 BC5009 | 964 | | CJNE | PROD_BUF1_PTR_REG,#(BUF2_START_ADR),SPIN_PUT_DAT1 | |
| 259 8003 | 965 | | SJMP | $ + 2 + 3 | |
| 25B BC0004  F | 966 | | CJNE | PROD_BUF1_PTR_REG,#(BUF2_MAS_START_ADR),SPIN_PUT_DAT1 | |
| 25E C205 | 967 | | CLR | BUF1_ACTIVE_FLG | |
| 260 8017 | 968 | | SJMP | SPIN_TO_MUCH_ERR | ;     Buffer is already full, error ! |
| | 969 | SPIN_PUT_DAT1: | | | |
| 262 A804 | 970 | | MOV | WRK_PTR_REG,PROD_BUF1_PTR_ADR | |
| 264 1C | 971 | | DEC | PROD_BUF1_PTR_REG | |
| 265 B88029 | 972 | | CJNE | WRK_PTR_REG,#(BUF1_START_ADR + 1),SPIN_PUT_DAT | |
| 268 F508 | 973 | | MOV | BUF1_LOC1_ADR,A | ; 1st byte placed in Reg |
| 26A 8026 | 974 | | SJMP | SPIN_CHK_STR | |
| | 975 | SPIN_BUF2: | | | |
| 26C 30F705 | 976 | | JNB | MASTER_SLAVE_CONF,$ + 3 + 5 | |

MCS-51 MACRO ASSEMBLER    MEI EXPANDED MODE SLAVE, Version 0.5

```
LOC  OBJ          LINE     SOURCE

026F BD2100        977              CJNE   PROD_BUF2_PTR_REG,#(BUF_RAM_END_ADR),SPIN_PUT_DAT2
0272 8003          978              SJMP   $ + 2 + 3
0274 8D0008   F    979              CJNE   PROD_BUF2_PTR_REG,#(BUF_MAS_RAM_END_ADR),SPIN_PUT_DAT2
0277 C206          980              CLR    BUF2_ACTIVE_FLG
                   981     SPIN_TO_MUCH_ERR:
0279 C20C          982              CLR    DAT_TOFROM_PROD_FLG    ;      Buffer is already full, error !
                   983     SPIN_ERR:
027B D2F4          984              SETB   PROD_INTFCE_ERR
027D 8013          985              SJMP   SPIN_CHK_STR
                   986     SPIN_PUT_DAT2:
027F A805          987              MOV    WRK_PTR_REG,PROD_BUF2_PTR_ADR
0281 1D            988              DEC    PROD_BUF2_PTR_REG
0282 30F705        989              JNB    MASTER_SLAVE_CONF,$ + 3 + 5
0285 B85109        990              CJNE   WRK_PTR_REG,#(BUF2_START_ADR + 1),SPIN_PUT_DAT
0288 8003          991              SJMP   $ + 2 + 3
028A B80004   F    992              CJNE   WRK_PTR_REG,#(BUF2_MAS_START_ADR + 1),SPIN_PUT_DAT
028D F509          993              MOV    BUF2_LOC1_ADR,A        ;  1st byte placed in Reg
028F 8001          994              SJMP   SPIN_CHK_STR
                   995     SPIN_PUT_DAT:
0291 F6            996              MOV    @WRK_PTR_REG,A         ;       Place data
                   997     SPIN_CHK_STR:
0292 30860B        998              JNB    PAR_IN_STR,SRUN_LOOP_EJMP
                   999     SPIN_CYCLE_DONE:
0295 D292         1000              SETB   PAR_IN_ACK
0297 D205         1001              SETB   PAR_IN_ACK_IMAGE_FLG   ;  Reset input ack status
0299 7B00         1002              MOV    PROD_TIMER_CNT_REG,#00H ;     reset timeout timer
029B 300A02       1003              JNB    PAR_TO_START_OUT_FLG,SRUN_LOOP_EJMP
029E 6132         1004              AJMP   SPIN_OUT_NEW_PCMD2
                  1005     SRUN_LOOP_EJMP:
02A0 214D         1006              AJMP   SRUN_LOOP
                  1007                                            ; Control message is returned
                  1008     SPIN_CONT:
02A2 100C22       1009              JBC    DAT_TOFROM_PROD_FLG,SPIN_DAT_DONE
                  1010     SPIN_WPRET:                            ;       Not rec data buf
02A5 B48002       1011              CJNE   A,#WPRET_PCMD,SPIN_WPPLR
02A8 8079         1012              SJMP   SPIN_ANOTHER_OUT
                  1013     SPIN_WPPLR:
02AA F8           1014              MOV    WRK_PTR_REG,A
02AB 54F0         1015              ANL    A,#WPPLR_PCMD_MASK
02AD 84900F       1016              CJNE   A,#WPPLR_PCMD,SPIN_WRONG_PCMD
02B0 E7           1017              MOV    A,@PROD_QUEUE_PTR_REG  ;      was it a return info request
02B1 54F0         1018              ANL    A,#0F0H
02B3 B49002       1019              CJNE   A,#WPCDR_PCMD,$ + 3 + 2
02B6 8003         1020              SJMP   $ + 2 + 3
02B8 B4A004       1021              CJNE   A,#WPDTR_PCMD,SPIN_WRONG_PCMD
02BB 881E         1022              MOV    IC_WRK_ADR,WRK_PTR_REG ; Pass parameter to INCOM or MASTER
02BD 8002         1023              SJMP   $ + 2 + 2
                  1024     SPIN_WRONG_PCMD:
02BF D2F4         1025              SETB   PROD_INTFCE_ERR        ;      Illegal command is an error
02C1 E8           1026              MOV    A,WRK_PTR_REG
02C2 20E75E       1027              JB     ACC.7,SPIN_ANOTHER_OUT ;      Turn around mastership
02C5 80CB         1028              SJMP   SPIN_CHK_STR           ;      Don't turn around mastership
                  1029     SPIN_DAT_DONE:                         ;      Data buf is complete
02C7 20E700       1030              JB     ACC.7,SPIN_DAT_DONE_TEST ;    Not to turn around
```

S-51 MACRO ASSEMBLER    MEI EXPANDED MODE SLAVE, Version 0.5

```
C  OBJ            LINE    SOURCE

CA D2F4           1031            SETB    PROD_INTFCE_ERR         ;         mastership is an error
CC 200804         1032            JB      PROD_CURRENT_BUF_FLG,SPIN_RES_BUF2
CF C205           1033            CLR     BUF1_ACTIVE_FLG
D1 808F           1034            SJMP    SPIN_CHK_STR
                  1035    SPIN_RES_BUF2:
D3 C206           1036            CLR     BUF2_ACTIVE_FLG
D5 8088           1037            SJMP    SPIN_CHK_STR
                  1038    SPIN_DAT_DONE_TEST:
D7 C2AF           1039            CLR     EA
D9 B4803C         1040            CJNE    A,#WPRET_PCMD,SPIN_CONT_BUF_NOT_OK ;Only valid cmd from prod
DC B7B002         1041            CJNE    @PROD_QUEUE_PTR_REG,#WPSTA_PCMD,$ + 3 + 2
DF 8008           1042            SJMP    SPIN_DAT_DONE_WPSTA     ;         Only get WPSTA 3 bytes
E1 EE             1043            MOV     A,BUF_NUM_REG           ;         Check if proper buffer #
E2 540F           1044            ANL     A,#BUF_NUM_MASK         ;              was received
E4 44C0           1045            ORL     A,#WPBUF_PCMD
E6 67             1046            XRL     A,@PROD_QUEUE_PTR_REG
E7 7031           1047            JNZ     SPIN_CONT_BUF_NOT_OK + 2
                  1048    SPIN_DAT_DONE_WPSTA:
E9 200812         1049            JB      PROD_CURRENT_BUF_FLG,SPIN_CONT_BUF2 ;Process buffer
EC EC             1050            MOV     A,PROD_BUF1_PTR_REG
ED 2482           1051            ADD     A,#(NOT (BUF1_START_ADR - 2)) ;    check at least 3 bytes in buf
EF 402C           1052            JC      SPIN_RES_BUF11
F1 D203           1053            SETB    BUF1_VALID_FLG          ;         this buffer is now valid
F3 C205           1054            CLR     BUF1_ACTIVE_FLG
F5 200228         1055            JB      BUF2_FOR_IC_FLG,SPIN_ANOTHER_OUT
F8 D208           1056            SETB    PROD_CURRENT_BUF_FLG    ;         setup for next buffer
FA C204           1057            CLR     BUF2_VALID_FLG
FC 8025           1058            SJMP    SPIN_ANOTHER_OUT
                  1059    SPIN_CONT_BUF2:
FE ED             1060            MOV     A,PROD_BUF2_PTR_REG
FF F4             1061            CPL     A                       ;         Can't use NOT(EXTRN) expression so...
300 30F704        1062            JNB     MASTER_SLAVE_CONF,$ + 3 + 4
303 244F          1063            ADD     A,#(BUF2_START_ADR - 1) ;         check at least 3 bytes in buf
305 8002          1064            SJMP    $ + 2 + 2
307 2400    F     1065            ADD     A,#(BUF2_MAS_START_ADR - 1)
309 5016          1066            JNC     SPIN_RES_BUF22
30B D204          1067            SETB    BUF2_VALID_FLG          ;         this buffer is now valid
30D C206          1068            CLR     BUF2_ACTIVE_FLG
30F 200111        1069            JB      BUF1_FOR_IC_FLG,SPIN_ANOTHER_OUT
312 C208          1070            CLR     PROD_CURRENT_BUF_FLG    ;         setup for next buffer
314 C203          1071            CLR     BUF1_VALID_FLG
316 8008          1072            SJMP    SPIN_ANOTHER_OUT
                  1073    SPIN_CONT_BUF_NOT_OK:
318 D2F4          1074            SETB    PROD_INTFCE_ERR
31A 200804        1075            JB      PROD_CURRENT_BUF_FLG,SPIN_RES_BUF22
                  1076    SPIN_RES_BUF11:
31D C205          1077            CLR     BUF1_ACTIVE_FLG
31F 8002          1078            SJMP    SPIN_ANOTHER_OUT
                  1079    SPIN_RES_BUF22:
321 C206          1080            CLR     BUF2_ACTIVE_FLG
                  1081    SPIN_ANOTHER_OUT:
323 D2AF          1082            SETB    EA
325 208604        1083            JB      PAR_IN_STR,SPIN_OUT_NEW_PCMD ;Test STR input,
328 D20A          1084            SETB    PAR_TO_START_OUT_FLG
```

MCS-51 MACRO ASSEMBLER    MEI EXPANDED MODE SLAVE, Version 0.5

```
LOC  OBJ          LINE    SOURCE 032A 2140         1085            AJMP    SRUN_LOOP
                  1086    SPIN_OUT_NEW_PCMD:                      ; turn around to output and
032C D292         1087            SETB    PAR_IN_ACK              ;   Reset input ack status
032E D2D5         1088            SETB    PAR_IN_ACK_IMAGE_FLG
0330 7B00         1089            MOV     PROD_TIMER_CNT_REG,#00H ;   and reset timeout timer
                  1090    SPIN_OUT_NEW_PCMD2:
0332 E7           1091            MOV     A,@PROD_QUEUE_PTR_REG   ; Check if previous cmd was a return
0333 54F0         1092            ANL     A,#0F0H                 ;   INCOM/MASTER info request
0335 B49002       1093            CJNE    A,#WPCOR_PCMD,$ + 3 + 2
0338 8003         1094            SJMP    $ + 2 + 3
033A B4A006       1095            CJNE    A,#WPDTR_PCMD,SPIN_OUT
033D 30F715       1096            JNB     MASTER_SLAVE_CONF,SPIN_INFO_TO_MASTER
0340 D2BB         1097            SETB    IE1                     ;   and force INCOM interrupt
0342 00           1098            NOP                             ;   or set master polling flag
                  1099    SPIN_OUT:
0343 C2AF         1100            CLR     EA
0345 9109         1101            ACALL   SPIO_AND_CMD_OUT_SUB    ; Check if cmd is queued
0347 5002         1102            JNC     SPIN_CHK_IC_DAT         ;   C set = cmd has been output, and
                  1103    SPIN_IC_DAT:                            ;     product queue updated
                  1104                                            ;   therefore just ret to run loop
0349 214B         1105            AJMP    SRUN_LOOP - 2
                  1106    SPIN_CHK_IC_DAT:
034B 9155         1107            ACALL   SPIO_CHK_DAT_TO_PROD_SUB ; Check if cmd to output data from
                  1108                                            ;   INCOM/MASTER
034D 40FA         1109            JC      SPIN_IC_DAT             ; No, just outputs that cmd
                  1110                                            ; Yes, setup buffer and output cmd
034F D2F4         1111            SETB    PROD_INTFCE_ERR         ; Yes, but no INCOM/MASTER Buf set,
0351 D2AF         1112            SETB    EA                      ;   therefore error! Try new cmd.
0353 80DD         1113            SJMP    SPIN_OUT_NEW_PCMD2
                  1114    SPIN_INFO_TO_MASTER:
0355 D207         1115            SETB    MAS_PASS_FLG
0357 80EA         1116            SJMP    SPIN_OUT
                  1117    ;
                  1118    ;-------------------------------------------------------------
                  1119 +1 $EJECT
```

MCS-51 MACRO ASSEMBLER    MEI EXPANDED MODE SLAVE, Version 0.5

```
LOC  OBJ          LINE    SOURCE

1120    ;
                  1121                    ;Timeout interrupt (INT 0 Overflow) for Expanded
                  1122                    ; Mode Slave
                  1123    TIMEOUT_INT_SLAVE:
0359 0503         1124            INC     PROD_TIMER_CNT_ADR      ;Just increment timeout counter
035B 32           1125            RETI
                  1126    ;
                  1127    ;-------------------------------------------------------------
                  1128 +1 $EJECT
```

MCS-51 MACRO ASSEMBLER    MEI EXPANDED MODE SLAVE, Version 0.5

```
LOC  OBJ          LINE    SOURCE

1129    ;
                  1130                    ;Parallel product interface input OUTPUT ACK* int
                  1131                    ; (EXT INT 0 at low priority) for Expanded Mode Slave
                  1132    PROD_ACK_SLAVE:
```

```
55C C0E0        1133            PUSH    ACC                             ; Save Acc
55E C0D0        1134            PUSH    PSW                             ; Save register bank and status
560 300804      1135            JNB     PAR_IN_OUT_FLG,PROD_ACK_YES     ;Must be in output mode to get int!
563 D2F4        1136            SETB    PROD_INTFCE_ERR
565 81F3        1137            AJMP    INTERRUPT_RET
                1138    PROD_ACK_YES:
567 C2D4        1139            CLR     RS1
569 C2D3        1140            CLR     RS0
56B 200908      1141            JB      PAR_OUT_STR_IMAGE_FLG,SPOT_DEACT ;Active or deactive ACK int ?
                1142                                                    ; My STR is active, therefore was
                1143                                                    ; waiting for prod to go active._
56E 7580FF      1144            MOV     PAR_DAT,#0FFH                   ; Reset the data lines,
571 D291        1145            SETB    PAR_OUT_CD                      ;    the cont*/data line,
573 D293        1146            SETB    PAR_OUT_STR                     ;    the product strobe, and
575 D209        1147            SETB    PAR_OUT_STR_IMAGE_FLG           ;    reset the timeout timer
577 8101        1148            AJMP    SPOT_IN_RET + 2                 ;    and return from int
                1149    ;
                1150    SPOT_DEACT:                                     ; The real interrupt !!!
579 300C37      1151            JNB     DAT_TOFROM_PROD_FLG,SPOT_CMD    ;Am I outputting data or cmd ?
                1152    SPOT_DAT:                                       ; Output data mode
57C D51F00      1153            DJNZ    TO_PROD_CNT_ADR,SPOT_ANO_DAT    ; Check if count is exhausted
57F C20C        1154            CLR     DAT_TOFROM_PROD_FLG             ;    Yes, reset buffer active
581 200804      1155            JB      PROD_CURRENT_BUF_FLG,SPOT_DAT_BUF2_DONE
584 C205        1156            CLR     BUF1_ACTIVE_FLG
586 802B        1157            SJMP    SPOT_CMD
                1158    SPOT_DAT_BUF2_DONE:
588 C206        1159            CLR     BUF2_ACTIVE_FLG
58A 8027        1160            SJMP    SPOT_CMD
                1161    SPOT_ANO_DAT:                                   ; No, output another
58C 200809      1162            JB      PROD_CURRENT_BUF_FLG,SPOT_DAT_BUF2 ; Which buffer
58F EC          1163            MOV     A,PROD_BUF1_PTR_REG             ; data pnter then incr
590 B48002      1164            CJNE    A,#(BUF1_START_ADR + 1),$ + 3 + 2
593 7408        1165            MOV     A,#BUF1_LOC1_ADR
595 1C          1166            DEC     PROD_BUF1_PTR_REG
596 800F        1167            SJMP    SPOT_DAT_BUF
                1168    SPOT_DAT_BUF2:
598 ED          1169            MOV     A,PROD_BUF2_PTR_REG             ; data pnter then incr
599 30F705      1170            JNB     MASTER_SLAVE_CONF,$ + 3 + 5
59C B45107      1171            CJNE    A,#(BUF2_START_ADR + 1),SPOT_DAT_BUF - 1
59F 8003        1172            SJMP    $ + 2 + 3
5A1 B40002   F  1173            CJNE    A,#(BUF2_MAS_START_ADR + 1),SPOT_DAT_BUF - 1
5A4 7409        1174            MOV     A,#BUF2_LOC1_ADR
5A6 1D          1175            DEC     PROD_BUF2_PTR_REG
                1176    SPOT_DAT_BUF:
5A7 C8          1177            XCH     A,WRK_PTR_REG
5A8 8680        1178            MOV     PAR_DAT,@WRK_PTR_REG
5AA C8          1179            XCH     A,WRK_PTR_REG
5AB D291        1180            SETB    PAR_OUT_CD                      ; Output the data
5AD C293        1181            CLR     PAR_OUT_STR
5AF C209        1182            CLR     PAR_OUT_STR_IMAGE_FLG
```

ICS-51 MACRO ASSEMBLER    MEI EXPANDED MODE SLAVE, Version 0.5

```
.OC  OBJ        LINE    SOURCE

5B1 804E        1183            SJMP    SPOT_IN_RET + 2
                1184    ;
                1185    SPOT_CMD:
5B3 E7          1186            MOV     A,@PROD_QUEUE_PTR_REG           ;What cmd is the product executing
5B4 B40E02      1187            CJNE    A,#PRES_PCMD,SPOT_NOREQ
5B7 8003        1188            SJMP    SPOT_ANO_CMD_OUT
                1189    SPOT_NOREQ:
5B9 B40023      1190            CJNE    A,#NOREQ_PCMD,SPOT_UPSTA        ; No request cmd
```

```
                          1191         SPOT_ANO_CMD_OUT:              ;Product interface is idle
03BC C2AF                 1192                 CLR   EA
03BE 9109                 1193                 ACALL SPIO_ANO_CMD_OUT_SUB ; Check if cmd is queued
03C0 5004                 1194                 JNC   SPOT_CHK_IC_DAT   ; C set = cmd has been output, and
                          1195         SPOT_IC_DAT:                   ;    product queue updated
03C2 D2AF                 1196                 SETB  EA               ;    therefore just return from int
03C4 81F3                 1197                 AJMP  INTERRUPT_RET
                          1198         SPOT_CHK_IC_DAT:
03C6 9155                 1199                 ACALL SPIO_CHK_DAT_TO_PROD_SUB ; Check if cmd to output data from
                          1200                                        ;    INCOM/MASTER
03C8 40F8                 1201                 JC    SPOT_IC_DAT      ; No, just outputs that cmd
                          1202                                        ; Yes, setup buffer and output cmd
03CA D2F4                 1203                 SETB  PROD_INTFCE_ERR  ; Yes, but no INCOM/MASTER Buf set,
03CC D2AF                 1204                 SETB  EA               ;    therefore error! Try new cmd.
03CE E7                   1205                 MOV   A,@PROD_QUEUE_PTR_REG
03CF 54F0                 1206                 ANL   A,#0F0H          ; Cmd direct response also ?
03D1 B4A0E8                1207                 CJNE  A,#WPOTR_PCMD,SPOT_ANO_CMD_OUT
03D4 30F704                1208                 JNB   MASTER_SLAVE_CONF,S + 3 + 4
03D7 D2BB                 1209                 SETB  IE1              ; Yes, int INCOM to process
03D9 80E1                 1210                 SJMP  SPOT_ANO_CMD_OUT ;    error or
03DB D207                 1211                 SETB  MAS_PASS_FLG     ;    set MASTER pass flag
03DD 80DD                 1212                 SJMP  SPOT_ANO_CMD_OUT
                          1213
                          1214         ;
                          1215         SPOT_WPSTA:                    ; Requested div code & status cmd
03DF B48002               1216                 CJNE  A,#WPSTA_PCMD,SPOT_WPCOD
03E2 8019                 1217                 SJMP  SPOT_IN_RET - 2
                          1218         ;
                          1219         SPOT_WPCOD:                    ; Output function code cmd
03E4 54F0                 1220                 ANL   A,#0F0H
03E6 841002               1221                 CJNE  A,#WPCOD_PCMD,SPOT_WPOAT
03E9 8001                 1222                 SJMP  SPOT_ANO_CMD_OUT
                          1223         ;
                          1224         SPOT_WPOAT:                    ; Output data cmd
03EB B42002               1225                 CJNE  A,#WPOAT_PCMD,SPOT_WPCDR
03EE 80CC                 1226                 SJMP  SPOT_ANO_CMD_OUT
                          1227         ;
                          1228         SPOT_WPCDR:                    ; Output function code with
03F0 B49002               1229                 CJNE  A,#WPCDR_PCMD,SPOT_WPDTR ;    direct response input cmd
03F3 800A                 1230                 SJMP  SPOT_IN_RET
                          1231         ;
                          1232         SPOT_WPDTR:                    ; Output data with direct
03F5 B4A002               1233                 CJNE  A,#WPDTR_PCMD,SPOT_WPBUF ;    response input cmd
03F8 8005                 1234                 SJMP  SPOT_IN_RET
                          1235         ;
                          1236         SPOT_WPBUF:                    ; Requested full buffer cmd
MCS-51 MACRO ASSEMBLER    MEI EXPANDED MODE SLAVE, Version 0.5

LOC  OBJ                  LINE         SOURCE

03FA B4C008               1237                 CJNE  A,#WPBUF_PCMD,SPOT_WPILL
03FD D20C                 1238                 SETB  DAT_TOFROM_PROD_FLG
                          1239         SPOT_IN_RET:
03FF D208                 1240                 SETB  PAR_IN_OUT_FLG
0401 7B00                 1241                 MOV   PROD_TIMER_CNT_REG,#00 ; reset the timeout timer
0403 81F3                 1242                 AJMP  INTERRUPT_RET    ;   and return from int
                          1243         ;
                          1244         SPOT_WPILL:                    ; Illegal cmd received
0405 C2AF                 1245                 CLR   EA               ; I'M LOST !!!  Fatal error
0407 80FE                 1246                 SJMP  S                ;    in buffer queue, reset
                          1247                                        ;    MEI card with deadman
                          1248 +1      SEJECT
```

:S-51 MACRO ASSEMBLER    MEI EXPANDED MODE SLAVE, Version 0.5

```
OC  OBJ              LINE    SOURCE

1249    ;SLAVE PARALLEL PRODUCT CONFIGURATION SUBROUTINES
                     1250    ;     NOTE:   CAN ONLY CALL THIS SUBROUTINE WITH INTERRUPTS DISABLED
                     1251    ;
                     1252    ;Subroutine -- Checks to see if a command is in the product queue:
                     1253    ;                  If not, chk if INCOM/MASTER has initialized prod buffer #
                     1254    ;                       If so, setups the available BUF1 or BUF2 then outputs
                     1255    ;                              the WPBUF cmd to prod. (ret C set)
                     1256    ;                       If not, will output WPSTA cmd to prod, update prod queue
                     1257    ;                              and setups the available BUF1 or BUF2
                     1258    ;                  If so, ret with cmd in ACC and PAR_DAT (ret C reset)
                     1259            PUBLIC  SPIO_ANO_CMD_OUT_SUB
                     1260    SPIO_ANO_CMD_OUT_SUB:
409 E9               1261            MOV     A,PROD_QUEUE_PTR_REG       ; Check if another cmd in queue
40A 850230           1262            CJNE    A,PROD_QUEUE_NXT_ADR,SPIO_CMD_IN_QUEUE
                     1263    SPIO_BUF_CHK_SETUP:                        ; No, Check if buf # is initialized
40D 7780             1264            MOV     @PROD_QUEUE_PTR_REG,#WPSTA_PCMD  ; No, output another WPSTA
40F 8780             1265            MOV     PAR_DAT,@PROD_QUEUE_PTR_REG
                     1266    SPIO_BUF_IN:                               ;Setup to input a buffer from
411 200800           1267            JB      PROD_CURRENT_BUF_FLG,SPIO_INIT_QUEUE_BUF2 ; product
414 200100           1268            JB      BUF1_FOR_IC_FLG,SPIO_INIT_QUEUE_BUF2 + 3
                     1269    SPIO_INIT_QUEUE_BUF1:
417 7C80             1270            MOV     PROD_BUF1_PTR_REG,#(BUF1_START_ADR + 1)   ;Reset buf #1 pnter
419 D205             1271            SETB    BUF1_ACTIVE_FLG
41B C203             1272            CLR     BUF1_VALID_FLG
41D C20B             1273            CLR     PROD_CURRENT_BUF_FLG
41F 8010             1274            SJMP    SPIO_BUFS_IN
                     1275    SPIO_INIT_QUEUE_BUF2:
421 2002F3           1276            JB      BUF2_FOR_IC_FLG,SPIO_INIT_QUEUE_BUF1
424 7D51             1277            MOV     PROD_BUF2_PTR_REG,#(BUF2_START_ADR + 1)   ;Reset buf #2 pnter
426 20F702           1278            JB      MASTER_SLAVE_CONF,$ + 3 + 2
429 7D00     F       1279            MOV     PROD_BUF2_PTR_REG,#(BUF2_MAS_START_ADR + 1)
42B D206             1280            SETB    BUF2_ACTIVE_FLG
42D C204             1281            CLR     BUF2_VALID_FLG
42F D20B             1282            SETB    PROD_CURRENT_BUF_FLG
                     1283    SPIO_BUFS_IN:
431 300008           1284            JNB     INIT_BUF_FLG,SPIO_CMD_OUT  ; Is this WPSTA cmd ?
                     1285                                               ; If so, WPSTA is already on PAR_DAT
434 EE               1286            MOV     A,BUF_NUM_REG              ; Get present product buffer #
435 540F             1287            ANL     A,#BUF_NUM_MASK            ;   specified by INCOM/MASTER
437 44C0             1288            ORL     A,#WPBUF_PCMD
439 F7               1289            MOV     @PROD_QUEUE_PTR_REG,A      ;   and put in queue
43A F580             1290            MOV     PAR_DAT,A                  ;   and output to prod
                     1291    SPIO_CMD_OUT:
43C C291             1292            CLR     PAR_OUT_CD                 ; cmd already on port -- Control
43E C293             1293            CLR     PAR_OUT_STR                ; strobe prod interface
440 C209             1294            CLR     PAR_OUT_STR_IMAGE_FLG
442 C208             1295            CLR     PAR_IN_OUT_FLG             ; Now in output mode
444 C20A             1296            CLR     PAR_TO_START_OUT_FLG
446 7800             1297            MOV     PROD_TIMER_CNT_REG,#00H    ; reset timeout timer
448 D3               1298            SETB    C                          ; Return with C flag set indicator
449 22               1299            RET
                     1300    SPIO_CMD_IN_QUEUE:                         ; Yes, a cmd is queued
44A 09               1301            INC     PROD_QUEUE_PTR_REG         ; Update queue pointer
44B B91802           1302            CJNE    PROD_QUEUE_PTR_REG,#(PROD_QUEUE_END_ADR + 1),$ + 3 + 2
```

MCS-51 MACRO ASSEMBLER    MEI EXPANDED MODE SLAVE, Version 0.5

```
LOC  OBJ         LINE     SOURCE 044E 7914        1303           MOV    PROD_QUEUE_PTR_REG,#PROD_QUEUE_START_ADR
0450 E7          1304           MOV    A,@PROD_QUEUE_PTR_REG    ;   Get cmd in queue
0451 F580        1305           MOV    PAR_DAT,A                ;   Cmd to output port
0453 C3          1306           CLR    C
0454 22          1307           RET                             ;     Else, return C flag reset
                 1308    ;
                 1309    ;Subroutine -- Entered with product cmd in ACC and PAR_DAT
                 1310    ;            Check to see if the prod cmd sends INCOM/MASTER data to the prod
                 1311    ;                   If so, check if flags correct, i.e., this data is in buffer
                 1312    ;                        If not, return (ret C reset)
                 1313    ;                        If so, setup buffer adr, cnt and flags for data to product
                 1314    ;                                and output cmd to product (ret C set)
                 1315    ;                   If not, just output cmd (ret C set)
                 1316    ;
                 1317           PUBLIC SPIO_CHK_DAT_TO_PROD_SUB
                 1318    SPIO_CHK_DAT_TO_PROD_SUB:
0455 5470        1319           ANL    A,#UPDAT_UPDTR_PCMD_MASK ;Is cmd to send INCOM/MASTER data
0457 B420E2      1320           CJNE   A,#UPDAT_PCMD,SPIO_CMD_OUT ; to prod ?
045A E7          1321           MOV    A,@PROD_QUEUE_PTR_REG    ;     If yes, Calculate byte count of
045B 540F        1322           ANL    A,#00001111B             ;       outgoing message to product
045D F51F        1323           MOV    TO_PROD_CNT_ADR,A        ;       Byte cnt = 3(mess cnt)
045F 23          1324           RL     A
0460 251F        1325           ADD    A,TO_PROD_CNT_ADR
0462 2404        1326           ADD    A,#03 + 1                ;       message cnt is 0 to F
0464 F51F        1327           MOV    TO_PROD_CNT_ADR,A        ;     If yes, setup data byte count,
0466 A201        1328           MOV    C,BUF1_FOR_IC_FLG
0468 8203        1329           ANL    C,BUF1_VALID_FLG
046A 4007        1330           JC     SPIO_UPDAT_BUF1
046C A202        1331           MOV    C,BUF2_FOR_IC_FLG
046E 8204        1332           ANL    C,BUF2_VALID_FLG
0470 400F        1333           JC     SPIO_UPDAT_BUF2          ;  No INCOM/MASTER buf set, thus error!
0472 22          1334           RET                             ;  Return with C flag reset
                 1335    SPIO_UPDAT_BUF1:                       ;  Yes, setup
0473 7C80        1336           MOV    PROD_BUF1_PTR_REG,#(BUF1_START_ADR + 1) ; buf #1 pnter
0475 C201        1337           CLR    BUF1_FOR_IC_FLG          ;         and flags
0477 D205        1338           SETB   BUF1_ACTIVE_FLG
0479 C203        1339           CLR    BUF1_VALID_FLG
047B C208        1340           CLR    PROD_CURRENT_BUF_FLG
047D D20C        1341           SETB   DAT_TOFROM_PROD_FLG
047F 80B8        1342           SJMP   SPIO_CMD_OUT
                 1343    SPIO_UPDAT_BUF2:                       ;  Yes, setup
0481 7D51        1344           MOV    PROD_BUF2_PTR_REG,#(BUF2_START_ADR + 1)   ;buf #2 pnter
0483 20F702      1345           JB     MASTER_SLAVE_CONF,$ + 3 + 2
0486 7D00    F   1346           MOV    PROD_BUF2_PTR_REG,#(BUF2_MAS_START_ADR + 1)
0488 C202        1347           CLR    BUF2_FOR_IC_FLG          ;         and flags
048A D206        1348           SETB   BUF2_ACTIVE_FLG
048C C204        1349           CLR    BUF2_VALID_FLG
048E D208        1350           SETB   PROD_CURRENT_BUF_FLG
0490 D20C        1351           SETB   DAT_TOFROM_PROD_FLG
0492 80A8        1352           SJMP   SPIO_CMD_OUT
                 1353    ;
                 1354    ;--------------------------------------------------------------------------
                 1355 +1 $EJECT
```

:S-51 MACRO ASSEMBLER    MEI EXPANDED MODE SLAVE, Version 0.5

```
XC  OBJ         LINE    SOURCE

1356    ;
                1357                                    ;INCOM Interrupt Routine for Expanded Mode Slave
                1358            USING 3                 ;     Uses Register Bank 3
                1359    ;
                1360    IC_INT_SLAVE:
494 C285        1361            CLR     IC_ACTIVITY_LED
496 C0E0        1362            PUSH    ACC                     ;Save Acc
498 C0D0        1363            PUSH    PSW                     ;Save register bank and status
49A D204        1364            SETB    RS1                     ;Register bank 3
49C D203        1365            SETB    RS0
49E 30B317      1366            JNB     IC_INT,IC_HARD_INT
                1367    IC_SOFT_INT:
4A1 EE          1368            MOV     A,IC_WRK_REG            ;INCOM routine is waiting for input
4A2 54F0        1369            ANL     A,#0F0H
4A4 B49002      1370            CJNE    A,#PCDR_PCMD,$ + 3 + 2
4A7 8003        1371            SJMP    $ + 2 + 3
4A9 B4A008      1372            CJNE    A,#PCTR_PCMD,IC_RET_PRSP_ERR
4AC EE          1373            MOV     A,IC_WRK_REG            ; Return direct response from product
4AD C4          1374            SWAP    A
4AE 54F0        1375            ANL     A,#11110000B
4B0 4402        1376            ORL     A,#PRSP_ICMD
4B2 8018        1377            SJMP    IC_XMIT_LAST_CONT
                1378    IC_RET_PRSP_ERR:                        ; Error from prod in direct response
4B4 7491        1379            MOV     A,#(CAEF_ICMD OR (CAEF_PO_NOT_RESPOND * 10000B))
4B6 8014        1380            SJMP    IC_XMIT_LAST_CONT
                1381    IC_HARD_INT:
4B8 209469      1382            JB      IC_DAT,IC_REC
4BB 200704      1383            JB      IC_IS_OUT_FLG,IC_XMIT
                1384    IC_XMIT_ERR:                            ;Set INCOM hardware error status
4BE D2F2        1385            SETB    IC_HARD_ERR             ; Said xmit interrupt, but thought
4C0 8038        1386            SJMP    IC_LAST_CLK             ;    was receiving. Just try and
                1387                                            ;    receive again. (after clearing
                1388                                            ;    interrupt)
                1389    IC_XMIT:
4C2 200E33      1390            JB      IC_EXP_DATIN_FLG,IC_XMIT_DONE
4C5 100D30      1391            JBC     IC_SENT_ACK_FLG,IC_XMIT_DONE
4C8 DA38        1392            DJNZ    IC_DAT_CNT_REG,IC_XMIT_DAT
                1393    IC_XMIT_ACK_CONT:
4CA 7401        1394            MOV     A,#(CAEF_ICMD OR (CAEF_ACK * 10000B))
                1395    IC_XMIT_LAST_CONT:
4CC D200        1396            SETB    IC_SENT_ACK_FLG
                1397    IC_XMIT_1ST_CONT:
4CE D294        1398            SETB    IC_DAT                  ;INCOM control message
4D0 F171        1399            ACALL   IC_SET_TO_WRITE_CONT_SUB ;Set INCOM to write mode
4D2 F8          1400            MOV     IC_WRK_PTR_REG,A        ;Save Cmd & Subcmd
4D3 C4          1401            SWAP    A
4D4 54F0        1402            ANL     A,#11110000B
4D6 4403        1403            ORL     A,#EN_INTFCE
4D8 D1B8        1404            ACALL   IC_8_DATBIT_OUT_SUB     ;Output INCOM Inst and Cmd
4DA EC          1405            MOV     A,IC_REC_CONT2_REG
4DB D1B8        1406            ACALL   IC_8_DATBIT_OUT_SUB     ;Output Slave Address
4DD 5318F0      1407            ANL     IC_WRK_PTR_ADR,#11110000B
4E0 EB          1408            MOV     A,IC_REC_CONT3_REG
4E1 540F        1409            ANL     A,#00001111B
```

MCS-51 MACRO ASSEMBLER    MEI EXPANDED MODE SLAVE, Version 0.5

| LOC OBJ | LINE | SOURCE | | |
|---|---|---|---|---|
| 04E3 48 | 1410 | | ORL A,IC_WRK_PTR_REG | ;Output lsn of slave address |
| 04E4 D188 | 1411 | | ACALL IC_8_DATBIT_OUT_SUB | ; & Subcmd field |
| | 1412 | IC_RET: | | |
| 04E6 D294 | 1413 | | SETB IC_DAT | ; Tristate data line of INCOM and |
| 04E8 C296 | 1414 | | CLR IC_RW | ; Release INCOM for either xmission |
| 04EA D296 | 1415 | | SETB IC_RW | ; or another reception |
| | 1416 | IC_RET_WITH_WAIT: | | |
| 04EC 7E00 | 1417 | | MOV IC_WRK_REG,#00 | |
| 04EE D285 | 1418 | | SETB IC_ACTIVITY_LED | |
| 04F0 30AFFD | 1419 | | JNB EA,S | ; Reset from master if disable int |
| | 1420 | INTERRUPT_RET: | ; | here |
| 04F3 D000 | 1421 | | POP PSW | |
| 04F5 D0E0 | 1422 | | POP ACC | |
| 04F7 32 | 1423 | | RETI | |
| | 1424 | IC_XMIT_DONE: | | |
| 04F8 C207 | 1425 | | CLR IC_IS_OUT_FLG | ;All transmissions are complete, |
| | 1426 | IC_LAST_CLK: | | ; put INCOM in receive mode |
| 04FA D296 | 1427 | | SETB IC_RW | |
| 04FC D295 | 1428 | | SETB IC_CLK | ;Clock INCOM once to clear interrupt |
| 04FE C295 | 1429 | | CLR IC_CLK | |
| 0500 80E4 | 1430 | | SJMP IC_RET | |
| | 1431 | ; | | |
| | 1432 | IC_XMIT_DAT: | | |
| 0502 BA010F | 1433 | | CJNE IC_DAT_CNT_REG,#01,IC_XMIT_NOT_LAST_DAT | |
| 0505 E9 | 1434 | | MOV A,IC_DAT_PTR_REG | ;If last message, reset active buf flag |
| 0506 24AF | 1435 | | ADD A,#(NOT BUF2_START_ADR) | ; Calculate which buffer was using |
| 0508 4006 | 1436 | | JC IC_XMIT_LAST_BUF1 | |
| 050A C202 | 1437 | | CLR BUF2_FOR_IC_FLG | |
| 050C C206 | 1438 | | CLR BUF2_ACTIVE_FLG | |
| 050E 8004 | 1439 | | SJMP IC_XMIT_NOT_LAST_DAT | |
| | 1440 | IC_XMIT_LAST_BUF1: | | |
| 0510 C201 | 1441 | | CLR BUF1_FOR_IC_FLG | |
| 0512 C205 | 1442 | | CLR BUF1_ACTIVE_FLG | |
| | 1443 | IC_XMIT_NOT_LAST_DAT: | | |
| 0514 F16F | 1444 | | ACALL IC_SET_TO_WRITE_DAT_SUB | ;Set INCOM to write mode |
| 0516 E7 | 1445 | | MOV A,@IC_DAT_PTR_REG | ;Info pointed to by this register |
| | 1446 | IC_XMIT_2OF3_DAT: | | |
| 0517 D188 | 1447 | | ACALL IC_8_DATBIT_OUT_SUB | |
| 0519 19 | 1448 | | DEC IC_DAT_PTR_REG | |
| 051A E7 | 1449 | | MOV A,@IC_DAT_PTR_REG | |
| 051B D188 | 1450 | | ACALL IC_8_DATBIT_OUT_SUB | |
| 051D 19 | 1451 | | DEC IC_DAT_PTR_REG | |
| 051E E7 | 1452 | | MOV A,@IC_DAT_PTR_REG | |
| 051F D188 | 1453 | | ACALL IC_8_DATBIT_OUT_SUB | |
| 0521 19 | 1454 | | DEC IC_DAT_PTR_REG | |
| 0522 80C2 | 1455 | | SJMP IC_RET | |
| | 1456 | ; | | |
| | 1457 | IC_REC: | | |
| | 1458 | ; | SETB IC_RW | ;IC_RW is normally in SETB (read) mode |
| 0524 300712 | 1459 | | JNB IC_IS_OUT_FLG,IC_REC_BCH_CHK | |
| | 1460 | IC_REC_ERR: | | |
| 0527 D2F2 | 1461 | | SETB IC_HARD_ERR | ;Set INCOM hardware error status |
| 0529 C20E | 1462 | | CLR IC_EXP_DATIN_FLG | |
| 052B 7E18 | 1463 | | MOV IC_WRK_REG,#27 | ; Throw away data, due to error |

:S-51 MACRO ASSEMBLER     MEI EXPANDED MODE SLAVE, Version 0.5

```
XC  OBJ          LINE     SOURCE

520 C207         1464              CLR    IC_IS_OUT_FLG           ; Said rec interrupt,
52F D103         1465              ACALL  IC_BUF_RES_SUB          ; But thought INCOM was xmitting
                 1466                                              ;    Thus kill this output xmission
                 1467     IC_REC_ERR_LOOP:                         ;    and try to receive again.
531 D295         1468              SETB   IC_CLK
533 C295         1469              CLR    IC_CLK
535 DEFA         1470              DJNZ   IC_WRK_REG,IC_REC_ERR_LOOP
537 80AD         1471              SJMP   IC_RET
                 1472     IC_REC_BCH_CHK:
539 D295         1473              SETB   IC_CLK
53B C295         1474              CLR    IC_CLK
53D 30940F       1475              JNB    IC_DAT,IC_NO_BCH_ERR
540 D2F0         1476              SETB   IC_BCH_IN_ERR           ;BCH error
542 7E1A         1477              MOV    IC_WRK_REG,#26          ; If not expecting data, then extract
544 300EEA       1478              JNB    IC_EXP_DATIN_FLG,IC_REC_ERR_LOOP ; throw away
547 D20F         1479              SETB   IC_DATIN_ERR_FLG        ; If expecting data, set present seq
549 D295         1480              SETB   IC_CLK                  ;    error indicator then get data (just
54B C295         1481              CLR    IC_CLK                  ;    to get rid cont/data bit and buffer
54D 8010         1482              SJMP   IC_REC_DAT_WANT         ;    in INCOM IC
                 1483     IC_NO_BCH_ERR:
54F D295         1484              SETB   IC_CLK
551 C295         1485              CLR    IC_CLK                  ;Control Bit (0 = data message)
553 209456       1486              JB     IC_DAT,IC_REC_CONT
                 1487     IC_REC_DAT:                              ;Received data message is OK
556 200E06       1488              JB     IC_EXP_DATIN_FLG,IC_REC_DAT_WANT ; Am I expecting data ?
559 D2F1         1489              SETB   IC_INTFCE_ERR           ;    No, not expecting --
55B 7E19         1490              MOV    IC_WRK_REG,#25          ;    set error, extract and
55D 8002         1491              SJMP   IC_REC_ERR_LOOP         ;    throw away
                 1492     IC_REC_DAT_WANT:                         ; Data is expected, get it and
55F D295         1493              SETB   IC_CLK                  ;    place in buffer pnted to by
561 C295         1494              CLR    IC_CLK                  ;    IC_DAT_PTR_REG
563 D1C5         1495              ACALL  IC_8_DATBIT_IN_SUB
565 B90704       1496              CJNE   IC_DAT_PTR_REG,#(BUF1_LOC1_ADR - 1),$ + 3 + 4
568 797F         1497              MOV    IC_DAT_PTR_REG,#(BUF1_START_ADR)
56A 8005         1498              SJMP   $ + 2 + 5
56C B90802       1499              CJNE   IC_DAT_PTR_REG,#(BUF2_LOC1_ADR - 1),$ + 3 + 2
56F 7950         1500              MOV    IC_DAT_PTR_REG,#(BUF2_START_ADR)
571 D1C5         1501              ACALL  IC_8_DATBIT_IN_SUB
573 D1C5         1502              ACALL  IC_8_DATBIT_IN_SUB
575 309408       1503              JNB    IC_DAT,IC_REC_DAT_CNT_TEST ;Last bit out must be 0
                 1504     IC_FATAL_ERR:
578 D2F2         1505              SETB   IC_HARD_ERR             ; This is INCOM hardware error
57A C20E         1506              CLR    IC_EXP_DATIN_FLG        ;    Abandon ship !!
57C D103         1507              ACALL  IC_BUF_RES_SUB
                 1508     IC_RET_EJMP:
57E 81E6         1509              AJMP   IC_RET
                 1510     IC_REC_DAT_CNT_TEST:                     ;Check if data input count is done
580 DAFC         1511              DJNZ   IC_DAT_CNT_REG,IC_RET_EJMP ; Count not done, return
582 C20E         1512              CLR    IC_EXP_DATIN_FLG        ; Done, message was rec OK ?
584 100F1F       1513              JBC    IC_DATIN_ERR_FLG,IC_XMIT_BCH_CONT
587 200106       1514              JB     BUF1_FOR_IC_FLG,IC_BUF1_IN_RDY ;Yes,
58A D204         1515              SETB   BUF2_VALID_FLG          ;    Set buffer #2 flag
58C C206         1516              CLR    BUF2_ACTIVE_FLG
58E 8004         1517              SJMP   IC_BUF2_IN_RDY
```

MCS-51 MACRO ASSEMBLER    MEI EXPANDED MODE SLAVE, Version 0.5

```
LOC  OBJ         LINE    SOURCE

1518    IC_BUF1_IN_RDY:
0590 D203        1519         SETB    BUF1_VALID_FLG          ;       Set buffer #1 flags
0592 C205        1520         CLR     BUF1_ACTIVE_FLG
                 1521    IC_BUF2_IN_RDY:
0594 E502        1522         MOV     A,PROD_QUEUE_NXT_ADR    ;       Update prod queue
0596 B41703      1523         CJNE    A,#PROD_QUEUE_END_ADR,$ + 3 + 3
0599 750213      1524         MOV     PROD_QUEUE_NXT_ADR,#(PROD_QUEUE_START_ADR - 1)
059C 0502        1525         INC     PROD_QUEUE_NXT_ADR
059E ED          1526         MOV     A,IC_REC_CONT1_REG      ;       Is it a direct response cmd
059F B4E302      1527         CJNE    A,#((RPOR_ICMD * 100000B) OR EN_INTFCE),$ + 3 + 2
05A2 81EC        1528         AJMP    IC_RET_WITH_WAIT        ;              Yes, wait for reply
05A4 81CA        1529         AJMP    IC_XMIT_ACK_CONT        ;                   else send ACK
                 1530    IC_XMIT_BCN_CONT:                   ;       No, send BCN_ERR
05A6 D1D3        1531         ACALL   IC_BUF_RES_SUB          ;                   and reset buffer
05A8 7431        1532         MOV     A,#(CAEF_ICMD OR (CAEF_BCN_ERR * 100000B))
05AA 81CC        1533         AJMP    IC_XMIT_LAST_CONT
                 1534    ;
                 1535    IC_REC_CONT:
05AC D295        1536         SETB    IC_CLK
05AE C295        1537         CLR     IC_CLK
05B0 7910        1538         MOV     IC_DAT_PTR_REG,#IC_REC_CONT1_ADR  ;control message
05B2 01C5        1539         ACALL   IC_8_DATBIT_IN_SUB                ; to registers
05B4 01C5        1540         ACALL   IC_8_DATBIT_IN_SUB
05B6 01C5        1541         ACALL   IC_8_DATBIT_IN_SUB
05B8 2094BD      1542         JB      IC_DAT,IC_FATAL_ERR     ;Last bit out must be 0
05BB ED          1543         MOV     A,IC_REC_CONT1_REG      ;INCOM instruction field must be
05BC 540F        1544         ANL     A,#00001111B            ; enable interface, or disregard
05BE B40360      1545         CJNE    A,#EN_INTFCE,IC_CMD_NOT_EN_INTFCE
05C1 ED          1546         MOV     A,IC_REC_CONT1_REG      ;Check cmd
                 1547    IC_SSAT:
05C2 B40360      1548         CJNE    A,#((SSAT_ICMD * 100000B) OR EN_INTFCE),IC_SSBS
05C5 EB          1549         MOV     A,IC_REC_CONT3_REG      ;Check subcmd
05C6 C4          1550         SWAP    A
05C7 540F        1551         ANL     A,#00001111B
05C9 B40013      1552         CJNE    A,#SSAT_PROD_2BIT_STAT,IC_SSAT_DC_PCS
                 1553    IC_SSAT_PROD_2BIT_STAT:
05CC 7A00        1554         MOV     IC_DAT_CNT_REG,#00      ;Check product buffer is at least
05CE D1EA        1555         ACALL   IC_PROD_BUF_VALID_SUB   ; one message in length
05D0 200504      1556         JB      F0,$ + 3 + 4
05D3 E57E        1557         MOV     A,(BUF1_START_ADR - 1)  ; Get two status bits from
05D5 8002        1558         SJMP    $ + 2 + 2               ; the valid buffer
05D7 E54F        1559         MOV     A,(BUF2_START_ADR - 1)
05D9 54C0        1560         ANL     A,#11000000B
05DB 4400        1561         ORL     A,#SMSS_ICMD            ; and mask cmd, then output
05DD 81CC        1562         AJMP    IC_XMIT_LAST_CONT
                 1563    IC_SSAT_DC_PCS:
05DF B40117      1564         CJNE    A,#SSAT_DC_PCS,IC_SSAT_FULL_BUF
05E2 7A00        1565         MOV     IC_DAT_CNT_REG,#00      ;Check product buffer is at least
05E4 D1EA        1566         ACALL   IC_PROD_BUF_VALID_SUB   ; one message in length
                 1567    IC_SEND_ONLY_ONE_BUF_MESS:
05E6 7A01        1568         MOV     IC_DAT_CNT_REG,#1
                 1569    IC_SEND_1ST_BUF_MESS:
05E8 F16F        1570         ACALL   IC_SET_TO_WRITE_DAT_SUB ;Set INCOM to write mode
05EA 200506      1571         JB      F0,IC_SEND_1ST_BUF2_MESS
```

:S-51 MACRO ASSEMBLER    MEI EXPANDED MODE SLAVE, Version 0.5

| IC OBJ | LINE | SOURCE | | | |
|---|---|---|---|---|---|
| 5ED E508 | 1572 | | MOV | A,BUF1_LOC1_ADR | |
| 5EF 7980 | 1573 | | MOV | IC_DAT_PTR_REG,#(BUF1_START_ADR + 1) | |
| 5F1 A117 | 1574 | | AJMP | IC_XMIT_2OF3_DAT | |
| | 1575 | IC_SEND_1ST_BUF2_MESS: | | | |
| 5F3 E509 | 1576 | | MOV | A,BUF2_LOC1_ADR | |
| 5F5 7951 | 1577 | | MOV | IC_DAT_PTR_REG,#(BUF2_START_ADR + 1) | |
| 5F7 A117 | 1578 | | AJMP | IC_XMIT_2OF3_DAT | |
| | 1579 | IC_SSAT_FULL_BUF: | | | |
| 5F9 B4040E | 1580 | | CJNE | A,#SSAT_FULL_BUF,IC_SSAT_MEI_STAT | |
| 5FC 7A00 | 1581 | | MOV | IC_DAT_CNT_REG,#00 | ;Check product buffer is at least |
| 5FE 01E7 | 1582 | | ACALL | IC_PROD_BUF_VALID_PRESUB | ; one message in length |
| 500 AA1E | 1583 | | MOV | IC_DAT_CNT_REG,IC_WRK_ADR | ;Buffer message count size |
| | 1584 | IC_BUF_OUT_START: | | | |
| 502 EA | 1585 | | MOV | A,IC_DAT_CNT_REG | ;If only 1 segment don't ... |
| 503 14 | 1586 | | DEC | A | |
| 504 60E2 | 1587 | | JZ | IC_SEND_1ST_BUF_MESS | |
| 506 F15E | 1588 | | ACALL | IC_BUF_ACT_IC_SUB | ;     set buffer active flag |
| 508 80DE | 1589 | | SJMP | IC_SEND_1ST_BUF_MESS | ;         and INCOM buffer flag |
| | 1590 | IC_SSAT_MEI_STAT: | | | |
| 50A B40816 | 1591 | | CJNE | A,#SSAT_MEI_STAT,IC_SSAT_SOFT_RESET | |
| 50D 7A01 | 1592 | | MOV | IC_DAT_CNT_REG,#1 | |
| 50F F16F | 1593 | | ACALL | IC_SET_TO_WRITE_DAT_SUB | ;Set INCOM to write mode |
| 511 74AA | 1594 | | MOV | A,#MEI_INTFCE_NUM | ;MEI product number |
| 513 D1B8 | 1595 | | ACALL | IC_8_DATBIT_OUT_SUB | |
| 515 7406 | 1596 | | MOV | A,#MEI_SLAVE_VER_NUM | ;MEI software version number |
| 517 D1B8 | 1597 | | ACALL | IC_8_DATBIT_OUT_SUB | |
| 519 E5F0 | 1598 | | MOV | A,B | ;Status register |
| 51B D1B8 | 1599 | | ACALL | IC_8_DATBIT_OUT_SUB | |
| 51D 54E0 | 1600 | | ANL | A,#MEI_STAT_RES_MASK | ; then reset proper status err bits |
| 51F F5F0 | 1601 | | MOV | B,A | |
| 521 81E6 | 1602 | | AJMP | IC_RET | |
| | 1603 | IC_SSAT_SOFT_RESET: | | | ;INCOM network reset function |
| 523 B40920 | 1604 | | CJNE | A,#SSAT_SOFT_RESET,IC_SSAT_ILL_SUBCMD | |
| 526 C2B4 | 1605 | | CLR | DEADMAN | ; Strobe deadman to make sure the |
| 528 D2B4 | 1606 | | SETB | DEADMAN | ;   ACK to master gets there |
| 52A C2AF | 1607 | | CLR | EA | ;Halt processing, deadman will reset |
| 52C 81CA | 1608 | | AJMP | IC_XMIT_ACK_CONT | |
| | 1609 | ; | | | |
| | 1610 | IC_CMD_NOT_EN_INTFCE: | | | |
| 52E D2F1 | 1611 | | SETB | IC_INTFCE_ERR | ;INCOM instruction is not EN_INTFCE |
| 530 81E6 | 1612 | | AJMP | IC_RET | |
| | 1613 | ; | | | |
| | 1614 | IC_SSBS: | | | |
| 532 B41316 | 1615 | | CJNE | A,#((SSBS_ICMD * 10000B) OR EN_INTFCE),IC_SUBS | |
| 535 01E0 | 1616 | | ACALL | IC_PROD_BUF_SEG_VALID_SUB | |
| 537 EA | 1617 | | MOV | A,IC_DAT_CNT_REG | ;If subcmd is 0, output div code |
| 538 60AC | 1618 | | JZ | IC_SEND_ONLY_ONE_BUF_MESS | |
| 53A 2A | 1619 | | ADD | A,IC_DAT_CNT_REG | |
| 53B 2A | 1620 | | ADD | A,IC_DAT_CNT_REG | |
| 53C F4 | 1621 | | CPL | A | |
| 53D 200504 | 1622 | | JB | F0,$ + 3 + 4 | ;Else, setup data pointer to correct |
| 540 2481 | 1623 | | ADD | A,#(BUF1_START_ADR + 2) | ; segment |
| 542 8002 | 1624 | | SJMP | $ + 2 + 2 | |
| 544 2452 | 1625 | | ADD | A,#(BUF2_START_ADR + 2) | |

MCS-51 MACRO ASSEMBLER    MEI EXPANDED MODE SLAVE, Version 0.5

```
LOC  OBJ          LINE     SOURCE

0646 F9           1626          MOV    IC_DAT_PTR_REG,A
0647 7A01         1627          MOV    IC_DAT_CNT_REG,#1        ; and output that one segment
0649 A114         1628          AJMP   IC_XMIT_NOT_LAST_DAT
                  1629     ;
                  1630     IC_SUBS:
064B 842309       1631          CJNE   A,#((SUBS_ICMD * 10000B) OR EN_INTFCE),IC_RPBN
064E 01E0         1632          ACALL  IC_PROD_BUF_SEG_VALID_SUB
0650 0A           1633          INC    IC_DAT_CNT_REG           ; Cnt is from INCOM of 0 - 15
0651 80AF         1634          SJMP   IC_BUF_OUT_START         ;   thus make it 1 - 16
                  1635     ;
                  1636     IC_ILL_ICMD:
                  1637     IC_SSAT_ILL_SUBCMD:
0653 7411         1638          MOV    A,#(CAEF_ICMD OR (CAEF_NACK * 10000B))
0655 81CC         1639          AJMP   IC_XMIT_LAST_CONT
                  1640     ;
                  1641     IC_RPBN:
0657 B48327       1642          CJNE   A,#((RPBN_ICMD * 10000B) OR EN_INTFCE),IC_RPFC
                  1643                                          ;Receive Prod Buffer Number
065A A806         1644          MOV    IC_WRK_PTR_REG,BUF_NUM_ADR
065C 53180F       1645          ANL    IC_WRK_PTR_ADR,#BUF_NUM_MASK
065F EB           1646          MOV    A,IC_REC_CONT3_REG       ; buffer # is in subcmd (msn)
0660 C4           1647          SWAP   A
0661 540F         1648          ANL    A,#BUF_NUM_MASK
0663 B51802       1649          CJNE   A,IC_WRK_PTR_ADR,IC_BUF_CHNG
0666 8015         1650          SJMP   IC_BUF_NOT_CHNG
                  1651     IC_BUF_CHNG:
0668 5306F0       1652          ANL    BUF_NUM_ADR,#(NOT BUF_NUM_MASK)
066B 4206         1653          ORL    BUF_NUM_ADR,A
066D A201         1654          MOV    C,BUF1_FOR_IC_FLG        ; reset valid buffers from product
066F 7205         1655          ORL    C,BUF1_ACTIVE_FLG        ;   if buffer number has changed
0671 4002         1656          JC     $ + 2 + 2
0673 C203         1657          CLR    BUF1_VALID_FLG
0675 A202         1658          MOV    C,BUF2_FOR_IC_FLG
0677 7206         1659          ORL    C,BUF2_ACTIVE_FLG
0679 4002         1660          JC     $ + 2 + 2
067B C204         1661          CLR    BUF2_VALID_FLG
                  1662     IC_BUF_NOT_CHNG:                     ; status that master gave buf #
067D D200         1663          SETB   INIT_BUF_FLG
                  1664     IC_XMIT_ACK_CONT_EJMP:
067F 81CA         1665          AJMP   IC_XMIT_ACK_CONT
                  1666     ;
                  1667     IC_RPFC:
0681 B49304       1668          CJNE   A,#((RPFC_ICMD * 10000B) OR EN_INTFCE),IC_RPDM
0684 7E10         1669          MOV    IC_WRK_REG,#WPCOD_PCMD
0686 800C         1670          SJMP   IC_SETUP_GO_CMD
                  1671     ;
                  1672     IC_RPDM:
0688 B4A304       1673          CJNE   A,#((RPDM_ICMD * 10000B) OR EN_INTFCE),IC_RPFR
068B 7E20         1674          MOV    IC_WRK_REG,#WPDAT_PCMD
068D 8019         1675          SJMP   IC_SETUP_DATIN_CMD
                  1676     ;
                  1677     IC_RPFR:
068F B40311       1678          CJNE   A,#((RPFR_ICMD * 10000B) OR EN_INTFCE),IC_RPDR
0692 7E90         1679          MOV    IC_WRK_REG,#WPCDR_PCMD
```

MCS-51 MACRO ASSEMBLER    MEI EXPANDED MODE SLAVE, Version 0.5

```
LOC  OBJ          LINE     SOURCE
                  1680     IC_SETUP_GO_CMD:
0694 F17A         1681          ACALL  IC_TEST_PROD_QUEUE_SUB   ;Check to see if prod queue is full
```

```
P6 F502        1682          MOV    PROD_QUEUE_NXT_ADR,A      ; No, update prod queue pointer and
P8 EB          1683          MOV    A,IC_REC_CONT3_REG        ;     place WPCDR cmd in prod queue
P9 C4          1684          SWAP   A
PA 540F        1685          ANL    A,#00001111B
PC 4E          1686          ORL    A,IC_WRK_REG
PD F6          1687          MOV    @IC_WRK_PTR_REG,A
PE BE90DE      1688          CJNE   IC_WRK_REG,#WPCDR_PCMD,IC_XMIT_ACK_CONT_EJMP
A1 81EC        1689          AJMP   IC_RET_WITH_WAIT
               1690      ;
               1691      IC_RPOR:
A3 B4E3AD      1692          CJNE   A,#((RPOR_ICMD * 10000B) OR EN_INTFCE),IC_ILL_ICMD
A6 7EA0        1693          MOV    IC_WRK_REG,#WPDTR_PCMD
               1694      IC_SETUP_DATIN_CMD:
A8 F17A        1695          ACALL  IC_TEST_PROD_QUEUE_SUB    ;Check to see if prod queue is full
AA EB          1696          MOV    A,IC_REC_CONT3_REG        ; No, place WPDTR cmd in prod queue
AB C4          1697          SWAP   A                         ;    but don't update queue ptr yet
AC 540F        1698          ANL    A,#00001111B
AE 4E          1699          ORL    A,IC_WRK_REG
AF F6          1700          MOV    @IC_WRK_PTR_REG,A
B0 F142        1701          ACALL  IC_BUF_AVAIL_SUB          ;Check to see if a buffer is available
B2 D20E        1702          SETB   IC_EXP_DATIN_FLG          ;Setup flag to input data
B4 7401        1703          MOV    A,#(CAEF_ICMD OR (CAEF_ACK * 10000B))
B6 81CE        1704          AJMP   IC_XMIT_1ST_CONT          ;Output ACK to INCOM master
               1705 +1   SEJECT
```

S-51 MACRO ASSEMBLER    MEI EXPANDED MODE SLAVE, Version 0.5

```
C  OBJ         LINE     SOURCE

1706     ;SLAVE CONFIGURATION INCOM PROCESSING SUBROUTINES
               1707     ;
               1708     ;Subroutine -- Output byte in A to INCOM IC
               1709     ;
               1710         PUBLIC  IC_8_DATBIT_OUT_SUB
               1711     IC_8_DATBIT_OUT_SUB:
B8 7E08        1712         MOV    IC_WRK_REG,#8
BA 13          1713         RRC    A
BB 9294        1714         MOV    IC_DAT,C                  ;Output data bit
BD D295        1715         SETB   IC_CLK
BF C295        1716         CLR    IC_CLK
C1 DEF7        1717         DJNZ   IC_WRK_REG,IC_8_DATBIT_OUT_SUB + 2
C3 13          1718         RRC    A                         ;(restores Acc)
C4 22          1719         RET
               1720     ;
               1721     ;
               1722     ;Subroutine -- Get byte from INCOM IC and put in register pnted to by @R1
               1723     ;
               1724         PUBLIC  IC_8_DATBIT_IN_SUB
               1725     IC_8_DATBIT_IN_SUB:
C5 7E08        1726         MOV    IC_WRK_REG,#8
C7 A294        1727         MOV    C,IC_DAT                  ;Get data bit
C9 13          1728         RRC    A                         ; and rotate in Acc
CA 0295        1729         SETB   IC_CLK
CC C295        1730         CLR    IC_CLK
CE DEF7        1731         DJNZ   IC_WRK_REG,IC_8_DATBIT_IN_SUB + 2
D0 F7          1732         MOV    @IC_DAT_PTR_REG,A         ;Put byte in RAM
D1 19          1733         DEC    IC_DAT_PTR_REG            ;Setup for next byte
D2 22          1734         RET
               1735     ;
               1736     ;
               1737     ;Subroutine -- Reset the flags of the buffer presently being used by the INCOM
               1738     ;
               1739         PUBLIC  IC_BUF_RES_SUB
```

```
                    1740    IC_BUF_RES_SUB:
0603 100104         1741            JBC     BUF1_FOR_IC_FLG,IC_BUF1_ERR_RES
0606 100204         1742            JBC     BUF2_FOR_IC_FLG,IC_BUF2_ERR_RES
0609 22             1743            RET
                    1744    IC_BUF1_ERR_RES:
060A C205           1745            CLR     BUF1_ACTIVE_FLG
060C 22             1746            RET
                    1747    IC_BUF2_ERR_RES:
060D C206           1748            CLR     BUF2_ACTIVE_FLG
                    1749    IC_SUB_RET:
060F 22             1750            RET
                    1751    ;
                    1752    ;
                    1753    ;Subroutine -- Checks:
                    1754    ;           SEG_VALID_SUB ==> calcluates # of segments buf size should be
                    1755    ;                       If 0, check if one message (only WPSTA need
                    1756    ;                           be valid, thus jump to VALID_SUB), else
                    1757    ;           VALID_PRESUB  ==> check if buffer # has been initialized.
                    1758    ;                       If so,
                    1759    ;           VALID_SUB     ==> check if buffer from product has at least
```

MCS-51 MACRO ASSEMBLER    MEI EXPANDED MODE SLAVE, Version 0.5

LOC  OBJ            LINE    SOURCE

```
                    1760    ;                                   # of messages specified in CNT_REG (0 is
                    1761    ;                                   1 message = 3 bytes). Return F0 flag for
                    1762    ;                                   valid buf #.
                    1763    ;           NOTE: If tests fail, this sub will pop the stack and go
                    1764    ;                 directly to sending error to INCOM.
                    1765    ;
                    1766    PUBLIC  IC_PROD_BUF_SEG_VALID_SUB
                    1767    PUBLIC  IC_PROD_BUF_VALID_SUB
                    1768    IC_PROD_BUF_SEG_VALID_SUB:
06E0 EB             1769            MOV     A,IC_REC_CONT3_REG          ;# of messages here is actually in
06E1 C4             1770            SWAP    A                           ;  subcmd
06E2 540F           1771            ANL     A,#00001111B
06E4 FA             1772            MOV     IC_DAT_CNT_REG,A
06E5 6003           1773            JZ      IC_PROD_BUF_VALID_SUB
                    1774    IC_PROD_BUF_VALID_PRESUB:                   ;Was buf # initialized ?
06E7 300050         1775            JNB     INIT_BUF_FLG,IC_BUF_IS_NOT_INIT
                    1776    IC_PROD_BUF_VALID_SUB:
06EA A201           1777            MOV     C,BUF1_FOR_IC_FLG           ; Is buffer # 1 valid ?
06EC A003           1778            ORL     C,/BUF1_VALID_FLG
06EE 500E           1779            JNC     IC_PROD_BUF1_VALID
06F0 A202           1780            MOV     C,BUF2_FOR_IC_FLG           ; Is buffer # 2 valid ?
06F2 A004           1781            ORL     C,/BUF2_VALID_FLG
06F4 5019           1782            JNC     IC_PROD_BUF2_VALID
06F6 D0E0           1783            POP     ACC                         ; Neither is valid, pop ret adr from
06F8 D0E0           1784            POP     ACC                         ; stack and go directly to out error
06FA 7451           1785            MOV     A,#(CAEF_ICMD OR (CAEF_BUF_NOT_AVAIL * 10000B))
06FC 81CC           1786            AJMP    IC_XMIT_LAST_CONT
                    1787    IC_PROD_BUF1_VALID:
06FE C205           1788            CLR     F0                          ; Buffer pntr from prod is actually
0700 A904           1789            MOV     IC_DAT_PTR_REG,PROD_BUF1_PTR_ADR ; to next byte (look ahead)
0702 7480           1790            MOV     A,#(BUF1_START_ADR + 1)
0704 99             1791            SUBB    A,IC_DAT_PTR_REG            ; (note: C is already reset)
0705 8003           1792            SJMP    $ + 2 + 3
                    1793    IC_PROD_BUF1_ZRO:
0707 7700           1794            MOV     @IC_DAT_PTR_REG,#00         ; If odd # of bytes in messages
0709 19             1795            DEC     IC_DAT_PTR_REG              ; therefore fill bytes w/ 0
070A B950FA         1796            CJNE    IC_DAT_PTR_REG,#BUF2_START_ADR,IC_PROD_BUF1_ZRO
070D 800F           1797            SJMP    IC_PROD_BUF_CALC
```

```
                    1798    IC_PROD_BUF2_VALID:
0F D2D5             1799            SETB    F0
11 A905             1800            MOV     IC_DAT_PTR_REG,PROD_BUF2_PTR_ADR
13 7451             1801            MOV     A,#(BUF2_START_ADR + 1)
15 99               1802            SUBB    A,IC_DAT_PTR_REG         ;  (note: C is already reset)
16 8003             1803            SJMP    $ + 2 + 3
                    1804    IC_PROD_BUF2_ZRO:
18 7700             1805            MOV     @IC_DAT_PTR_REG,#00      ; if odd # of bytes in messages
1A 19               1806            DEC     IC_DAT_PTR_REG           ;    therefore fill bytes w/ 0
1B B921FA           1807            CJNE    IC_DAT_PTR_REG,#(BUF_RAM_END_ADR),IC_PROD_BUF2_ZRO
                    1808    IC_PROD_BUF_CALC:
1E AEF0             1809            MOV     IC_WRK_REG,B             ; save MEI status
720 75F003          1810            MOV     B,#3                     ; # of messages from # of bytes
723 84              1811            DIV     AB
724 C5F0            1812            XCH     A,B
726 6002            1813            JZ      IC_PROD_BUF_DAT_ZERO
```

:S-51 MACRO ASSEMBLER    MEI EXPANDED MODE SLAVE, Version 0.5

```
 C  OBJ              LINE    SOURCE 728 05F0             1814            INC     B
                     1815    IC_PROD_BUF_DAT_ZERO:
72A EE               1816            MOV     A,IC_WRK_REG
72B C5F0             1817            XCH     A,B                      ; return MEI status to Reg B
72D FE               1818            MOV     IC_WRK_REG,A
72E D3               1819            SETB    C                        ; Calculated cnt range is 1 - 16
72F 9A               1820            SUBB    A,IC_DAT_CNT_REG         ; INCOM sent segment is 0 - 15
730 50AD             1821            JNC     IC_SUB_RET
732 D0E0             1822            POP     ACC                      ; Neither is valid, pop ret adr from
734 D0E0             1823            POP     ACC                      ; stack and go directly to out error
736 7461             1824            MOV     A,#(CAEF_ICMD OR (CAEF_BUF_SMALL * 10000B))
738 81CC             1825            AJMP    IC_XMIT_LAST_CONT
                     1826    IC_BUF_IS_NOT_INIT:                      ;Buffer # not initialized !
73A D0E0             1827            POP     ACC                      ; Pop return address from stack
73C D0E0             1828            POP     ACC                      ; and go directly to output error
73E 7441             1829            MOV     A,#(CAEF_ICMD OR (CAEF_NEED_BUF * 10000B))
1740 81CC            1830            AJMP    IC_XMIT_LAST_CONT
                     1831    ;
                     1832    ;
                     1833    ;Subroutine -- Check to see if a buffer is currently available to use for
                     1834    ;              inputting data from the INCOM master. If so return with the
                     1835    ;              PNTER_REG pointing to the proper buffer and the message count
                     1836    ;              in the CNT_REG, else abort by popping the stack and sending
                     1837    ;              an error message to the INCOM master.
                     1838    ;
                     1839            PUBLIC  IC_BUF_AVAIL_SUB
                     1840    IC_BUF_AVAIL_SUB:
0742 A201            1841            MOV     C,BUF1_FOR_IC_FLG        ;Is buffer #1 available
0744 7205            1842            ORL     C,BUF1_ACTIVE_FLG        ; i.e., not active or not INCOM valid
0746 500C            1843            JNC     IC_BUF1_IS_AVAIL
0748 A202            1844            MOV     C,BUF2_FOR_IC_FLG        ;Is buffer #2 available
074A 7206            1845            ORL     C,BUF2_ACTIVE_FLG        ; i.e., not active or not INCOM valid
074C 4038            1846            JC      IC_OUT_REPEAT_ERR
                     1847    IC_BUF2_IS_AVAIL:
074E D2D5            1848            SETB    F0
0750 7909            1849            MOV     IC_DAT_PTR_REG,#BUF2_LOC1_ADR
0752 8004            1850            SJMP    IC_BUF_AVAIL_CNT
                     1851    IC_BUF1_IS_AVAIL:
0754 C2D5            1852            CLR     F0
0756 7908            1853            MOV     IC_DAT_PTR_REG,#BUF1_LOC1_ADR
                     1854    IC_BUF_AVAIL_CNT:
```

```
0758 EB          1855            MOV    A,IC_REC_CONT3_REG
0759 C4          1856            SWAP   A
075A 540F        1857            ANL    A,#00001111B
075C 04          1858            INC    A
075D FA          1859            MOV    IC_DAT_CNT_REG,A        ;Falls into next subroutine ....
                 1860    ;
                 1861    ;
                 1862    ;Subroutine -- Set the buffer pointed to by F0 as ao active INCOM buffer
                 1863    ;
                 1864            PUBLIC IC_BUF_ACT_IC_SUB
                 1865    IC_BUF_ACT_IC_SUB:
075E 200507      1866            JB     F0,IC_BUF2_ACT_IC
0761 D201        1867            SETB   BUF1_FOR_IC_FLG         ;Set buffer #1 INCOM active
```

MCS-51 MACRO ASSEMBLER    MEI EXPANDED MODE SLAVE, Version 0.5

```
LOC  OBJ         LINE    SOURCE
0763 D205        1868            SETB   BUF1_ACTIVE_FLG
0765 C203        1869            CLR    BUF1_VALID_FLG
0767 22          1870            RET
                 1871    IC_BUF2_ACT_IC:
0768 D202        1872            SETB   BUF2_FOR_IC_FLG         ;Set buffer #2 INCOM active
076A D206        1873            SETB   BUF2_ACTIVE_FLG
076C C204        1874            CLR    BUF2_VALID_FLG
076E 22          1875            RET
                 1876    ;
                 1877    ;
                 1878    ;Subroutine -- Setup the INCOM IC to allow loading data bytes for the write
                 1879    ;              mode
                 1880    ;
                 1881            PUBLIC IC_SET_TO_WRITE_DAT_SUB
                 1882            PUBLIC IC_SET_TO_WRITE_CONT_SUB
                 1883    IC_SET_TO_WRITE_DAT_SUB:
076F C294        1884            CLR    IC_DAT                  ;INCOM data message to xmit
                 1885    IC_SET_TO_WRITE_CONT_SUB:
0771 C296        1886            CLR    IC_RW                   ;Set INCOM to write mode
0773 D207        1887            SETB   IC_IS_OUT_FLG           ;Set INCOM to xmit flag
0775 D295        1888            SETB   IC_CLK
0777 C295        1889            CLR    IC_CLK
                 1890    IC_TEST_PROD_QUEUE_MT:
0779 22          1891            RET
                 1892    ;
                 1893    ;
                 1894    ;Subroutine -- Check to see if the product queue is full.  Return if not full
                 1895    ;              while returning new QUEUE_NXT_ADR in ACC & IC_WRK_PTR_REG.
                 1896    ;              However, if full, will abort by popping the stack and sending
                 1897    ;              an error to INCOM master.
                 1898    ;
                 1899            PUBLIC IC_TEST_PROD_QUEUE_SUB
                 1900    IC_TEST_PROD_QUEUE_SUB:
077A E502        1901            MOV    A,PROD_QUEUE_NXT_ADR
077C B41702      1902            CJNE   A,#PROD_QUEUE_END_ADR,IC_TEST_PROD_QUEUE_WRAP
077F 7413        1903            MOV    A,#(PROD_QUEUE_START_ADR - 1)
                 1904    IC_TEST_PROD_QUEUE_WRAP:
0781 04          1905            INC    A
0782 FB          1906            MOV    IC_WRK_PTR_REG,A
0783 B501F3      1907            CJNE   A,PROD_QUEUE_PTR_ADR,IC_TEST_PROD_QUEUE_MT
                 1908    IC_OUT_REPEAT_ERR:
0786 D0E0        1909            POP    ACC                     ; Neither is available, pop ret adr
0788 D0E0        1910            POP    ACC                     ; from stack & go directly to out err
078A 7421        1911            MOV    A,#(CAEF_ICMD OR (CAEF_REPEAT * 10000B))
078C 81CC        1912            AJMP   IC_XMIT_LAST_CONT
                 1913    ;
                 1914            END
```

What is claimed and desired to be secured by Letters Patent is:

1. In a bidirectional communication and control network which includes a common link and a plurality of hardware based digital ICs coupled to said common link to receive a network message transmitted over said link from a network master and to store said received network message, the combination of, a programmable microcontroller controller to one of said digital ICs and having means for reading said received network message stored in said one digital IC and storing said network message, a controlled product connected to said microcontroller through a parallel data bus such that the microcontroller is disposed between said one digital IC and said controlled product, and means for supplying said network message stored in said microcontroller to said controlled product over said parallel data bus, a group of control lines interconnecting said microcontroller and said controlled product, and means in said microcontroller for placing a predetermined segment of said network message stored in said microcontroller on said parallel data bus and producing an output strobe signal on a first one of said control lines, said controlled product producing an output acknowledge signal indicating the completion of a transfer of said predetermined segment thereto, said microcontroller including means responsive to said output acknowledge signal for deactivating said output strobe signal, said controlled product deactivating said output acknowledge signal when said output strobe signal is deactivated, said microcontroller including means responsive to said deactivation of said output acknowledge signal for placing another predetermined segment of said network message on said parallel data bus and producing an output strobe signal on said one control line.

2. In a bidirectional communication and control network which includes a common link and a plurality of hardware based digital ICs coupled to said common link to receive a network message transmitted over said link from a network master and to store said received network message, the combination of, a programmable microcontroller connected to one of said digital ICs and having means for reading said received network message stored in said one digital IC and storing said network message, a controlled product connected to said microcontroller through a parallel data bus such that the microcontroller is disposed between said one digital IC and said controlled product, and means for supplying said network message stored in said microcontroller to said controlled product over said parallel data bus, a group of control lines interconnecting said microcontroller and said controlled product, and means in said microcontroller for placing a predetermined segment of said network message stored in said microcontroller on said parallel data bus and producing an output strobe signal on one of said control lines, said controlled product producing an output acknowledge signal indicating the completion of a transfer of said predetermined segment thereto, said microcontroller including means responsive to said output acknowledge signal for deactivating said output store signal, means in said microcontroller for placing the lines of said parallel data bus at a high impedance prior to deactivating said output strobe signal, thereby to indicate to said controlled product that data is to be transferred from said controlled product to said microcontroller in accordance with said received network message, said controlled product deactivating said output acknowledge signal after said lines are placed at a high impedance, said microcontroller including means responsive to the deactivation of said output acknowledge signal after said parallel data bus has been placed at high impedance for enabling said microcontroller to receive data from said controlled product over said parallel data bus.

3. In a bidirectional communication and control network which includes a common link and a plurality of hardware based digital ICs coupled to said common link to receive a network message transmitted over said link from a network master and to store said received network message, the combination of, a programmable microcontroller connected to one of said digital ICs and having means for reading said received network message stored in said one digital IC and storing said network message, a controlled product connected to said microcontroller through a parallel data bus such that the microcontroller is disposed between said one digital IC and said controlled product, and means for supplying said network message stored in said microcontroller to said controlled product over said parallel data bus, a group of control lines interconnecting said microcontroller and said controlled product, said parallel data bus carrying data from said controlled product to said microcontroller and one of said control lines carrying an input strobe signal from said controlled product to said microcontroller, means in said microcontroller for reading said parallel data bus and producing an input acknowledge signal on a read one of said control lines, thereby indicating to said controlled product that the transfer of said data to said microcontroller is complete, said controlled product deactivating said input strobe signal in response to said input acknowledge signal, said microcontroller inducing means responsive to the deactivation of said input strobe signal for deactivating said input acknowledge signal, said lines of said parallel data bus being placed at a high impedance by said controlled product prior to the deactivation of said input strobe signal, said microcontroller including means responsive to said change in impedance of said parallel data bus for deactivating said input acknowledge signal.

* * * * *